(12) United States Patent
Bakke et al.

(10) Patent No.: US 11,682,085 B2
(45) Date of Patent: *Jun. 20, 2023

(54) COLLECTING DATA TO GENERATE AN AGRICULTURAL PRESCRIPTION

(71) Applicant: CLIMATE LLC, Saint Louis, MO (US)

(72) Inventors: Brad B. Bakke, Huntley, IL (US); Craig Eugene Rupp, Ames, IA (US); A. Corbett S. Kull, Palatine, IL (US); Austin Brock Atchison, Lake Zurich, IL (US)

(73) Assignee: CLIMATE LLC, Saint Louis, MO (US)

( * ) Notice: Subject to any disclaimer, the term of this patent is extended or adjusted under 35 U.S.C. 154(b) by 1075 days.

This patent is subject to a terminal disclaimer.

(21) Appl. No.: 16/168,371

(22) Filed: Oct. 23, 2018

(65) Prior Publication Data
US 2019/0057462 A1    Feb. 21, 2019

Related U.S. Application Data

(63) Continuation of application No. 14/739,823, filed on Jun. 15, 2015, now Pat. No. 10,109,024.
(Continued)

(51) Int. Cl.
*G06Q 50/02* (2012.01)
*H04W 4/70* (2018.01)
(Continued)

(52) U.S. Cl.
CPC ......... *G06Q 50/02* (2013.01); *A01D 41/1274* (2013.01); *G05B 15/02* (2013.01);
(Continued)

(58) Field of Classification Search
CPC ....... H04W 4/70; G06N 5/04; G06F 16/9535; G06Q 10/04
(Continued)

(56) References Cited

U.S. PATENT DOCUMENTS 6,070,539 A * 6/2000 Flamme .............. A01M 7/0089
701/50
6,199,000 B1    3/2001 Keller et al.
(Continued)

FOREIGN PATENT DOCUMENTS

CN    1713198 A    12/2005
CN    102081384 A    6/2011
(Continued)

OTHER PUBLICATIONS

U.S. Appl. No. 14/739,823 (now U.S. Pat. No. 10,109,024), filed Jun. 15, 2015, Bakke et al.
(Continued)

*Primary Examiner* — Tauqir Hussain
(74) *Attorney, Agent, or Firm* — Harness, Dickey & Pierce, P.L.C.

(57) ABSTRACT

A method begins by a drive unit affiliated with farm equipment receiving data from the farm equipment to produce agricultural data. The method continues with the drive unit determining a filtering constraint based on one or more parameters selected from a plurality of lists of agricultural parameters and filtering the agricultural data based on the filtering constraint to produce filtered agricultural data. The method continues with the drive unit determining processing of the filtered agricultural data and executing the processing of the filtered agricultural data.

18 Claims, 50 Drawing Sheets

Related U.S. Application Data

(60) Provisional application No. 62/052,034, filed on Sep. 18, 2014, provisional application No. 62/046,346, filed on Sep. 5, 2014.

(51) Int. Cl.
  G06F 16/9535 (2019.01)
  G05B 15/02 (2006.01)
  G06Q 10/04 (2012.01)
  G06Q 10/063 (2023.01)
  G08G 1/00 (2006.01)
  A01D 41/127 (2006.01)

(52) U.S. Cl.
  CPC ......... *G06F 16/9535* (2019.01); *G06Q 10/04* (2013.01); *G06Q 10/063* (2013.01); *G08G 1/00* (2013.01); *H04W 4/70* (2018.02)

(58) Field of Classification Search
  USPC ............................................. 709/204; 702/19
  See application file for complete search history.

(56) References Cited

U.S. PATENT DOCUMENTS

| | | | |
|---|---|---|---|
| 6,347,253 B1 | 2/2002 | Fujita et al. | |
| 6,470,394 B1 | 10/2002 | Bamforth et al. | |
| 6,701,857 B1 * | 3/2004 | Jensen | A01C 7/006 |
| | | | 111/900 |
| 6,762,857 B1 | 7/2004 | Salgado et al. | |
| 6,999,877 B1 | 2/2006 | Dyer et al. | |
| 7,184,892 B1 | 2/2007 | Dyer et al. | |
| 8,019,633 B2 | 9/2011 | Stroman et al. | |
| 8,032,389 B2 | 10/2011 | Avey et al. | |
| 8,078,367 B2 * | 12/2011 | Sauder | A01C 7/105 |
| | | | 715/965 |
| 8,429,660 B2 | 4/2013 | Dweck et al. | |
| 8,437,879 B2 | 5/2013 | Anderson | |
| 8,443,822 B2 | 5/2013 | Ivans | |
| 8,738,213 B1 | 5/2014 | Szybalski et al. | |
| 8,738,243 B2 * | 5/2014 | Sauder | A01B 79/005 |
| | | | 715/965 |
| 9,008,839 B1 | 4/2015 | Kuffner, Jr. et al. | |
| 9,076,118 B1 | 7/2015 | Mewes et al. | |
| 9,140,824 B1 | 9/2015 | Mewes et al. | |
| 9,152,938 B2 | 10/2015 | Lang et al. | |
| 9,265,187 B2 | 2/2016 | Cavender-Bares et al. | |
| 9,375,746 B2 | 6/2016 | Heldt et al. | |
| 9,820,431 B2 * | 11/2017 | Conrad | A01M 9/0092 |
| 9,904,963 B2 * | 2/2018 | Rupp | H04W 4/70 |
| 10,109,024 B2 * | 10/2018 | Bakke | G08G 1/00 |
| 10,251,337 B2 * | 4/2019 | Conrad | A01C 5/068 |
| 10,438,343 B2 * | 10/2019 | Baurer | G06F 16/5866 |
| 10,470,356 B2 * | 11/2019 | Rice | A01M 7/0092 |
| 10,492,357 B2 * | 12/2019 | Conrad | A01C 7/128 |
| 10,517,206 B2 * | 12/2019 | Wintemute | G06K 7/10366 |
| 10,754,063 B2 * | 8/2020 | Lakshmanan | G01W 1/10 |
| 10,761,075 B2 * | 9/2020 | Gui | G06V 20/38 |
| 10,853,894 B2 | 12/2020 | Rupp et al. | |
| 11,058,046 B2 * | 7/2021 | Conrad | A01C 23/028 |
| D942,070 S * | 1/2022 | Woodruff | D27/183 |
| 2002/0013350 A1 | 1/2002 | Nishiguchi et al. | |
| 2002/0103688 A1 | 8/2002 | Schneider | |
| 2002/0133505 A1 | 9/2002 | Kuji | |
| 2003/0158887 A1 | 8/2003 | Megiddo | |
| 2004/0122561 A1 | 6/2004 | Fujinuma et al. | |
| 2005/0015606 A1 | 1/2005 | Blamires et al. | |
| 2005/0156067 A1 | 7/2005 | Ivans | |
| 2006/0212875 A1 | 9/2006 | Haller et al. | |
| 2006/0282467 A1 | 12/2006 | Peterson et al. | |
| 2007/0124000 A1 | 5/2007 | Moughler et al. | |
| 2009/0304940 A1 | 12/2009 | Heldt et al. | |
| 2009/0313215 A1 | 12/2009 | Maizel et al. | |
| 2010/0036696 A1 | 2/2010 | Lang et al. | |
| 2010/0094481 A1 | 4/2010 | Anderson | |
| 2011/0027633 A1 | 2/2011 | Deane et al. | |
| 2011/0144823 A1 | 6/2011 | Muller et al. | |
| 2011/0270724 A1 | 11/2011 | O'Neil et al. | |
| 2011/0276336 A1 | 11/2011 | Sweely | |
| 2012/0253744 A1 | 10/2012 | Schmidt | |
| 2012/0309455 A1 | 12/2012 | Klose et al. | |
| 2013/0018510 A1 | 1/2013 | Cvek et al. | |
| 2013/0173321 A1 | 7/2013 | Johnson | |
| 2013/0174040 A1 | 7/2013 | Johnson | |
| 2013/0185104 A1 | 7/2013 | Klavins | |
| 2013/0317872 A1 | 11/2013 | Nakamichi | |
| 2014/0001273 A1 | 1/2014 | Cattaneo et al. | |
| 2014/0012732 A1 | 1/2014 | Lindores | |
| 2014/0025228 A1 | 1/2014 | Jang et al. | |
| 2014/0108080 A1 | 4/2014 | Mitchell | |
| 2014/0122147 A1 | 5/2014 | Christie et al. | |
| 2014/0180741 A1 | 6/2014 | Franke et al. | |
| 2014/0249893 A1 | 9/2014 | McClure et al. | |
| 2014/0303814 A1 | 10/2014 | Burema et al. | |
| 2014/0336818 A1 | 11/2014 | Posselius et al. | |
| 2015/0009491 A1 | 1/2015 | Feng | |
| 2015/0020625 A1 | 1/2015 | Hause et al. | |
| 2015/0023476 A1 | 1/2015 | Muller et al. | |
| 2015/0094916 A1 * | 4/2015 | Bauerer | G01V 8/20 |
| | | | 701/50 |
| 2015/0206255 A1 | 7/2015 | Groeneveld | |
| 2015/0234767 A1 | 8/2015 | Tatge et al. | |
| 2015/0254800 A1 | 9/2015 | Johnson et al. | |
| 2015/0314889 A1 | 11/2015 | Day et al. | |
| 2015/0348419 A1 | 12/2015 | Matthews | |
| 2016/0024708 A1 | 1/2016 | McGill et al. | |
| 2016/0026940 A1 | 1/2016 | Johnson | |
| 2016/0071410 A1 | 3/2016 | Rupp et al. | |
| 2016/0109569 A1 | 4/2016 | Chan et al. | |
| 2016/0155339 A1 | 6/2016 | Saad et al. | |
| 2016/0225263 A1 | 8/2016 | Salentiny et al. | |
| 2016/0232621 A1 | 8/2016 | Ethington et al. | |
| 2016/0247082 A1 | 8/2016 | Stehling et al. | |
| 2019/0005746 A1 | 1/2019 | Zsombory et al. | |

FOREIGN PATENT DOCUMENTS

| | | |
|---|---|---|
| CN | 103345246 A | 10/2013 |
| CN | 103886409 A | 6/2014 |
| WO | WO2014026183 A2 | 2/2014 |
| WO | WO-2014026183 A2 | 2/2014 |

OTHER PUBLICATIONS

U.S. Appl. No. 14/810,809 (now U.S. Pat. No. 9,904,963), filed Jul. 28, 2015, Rupp et al.
U.S. Appl. No. 14/842,016 (Abandoned), filed Sep. 1, 2015, Rupp et al.
U.S. Appl. No. 15/875,993 (now U.S. Pat. No. 10,853,894), filed Jan. 19, 2018, Rupp et al.
U.S. Appl. No. 17/106,300, filed Nov. 30, 2020, Rupp et al.
U.S. Appl. No. 14/739,823: (a) Office Action dated Sep. 7, 2017; (b) Office Action. dated Apr. 11, 2018; and (c) Notice of Allowance dated Jun. 20, 2018. The instant application is a continuation of U.S. Appl. No. 14/739,823.
U.S. Appl. No. 14/810,809: (a) Office Action dated Oct. 7, 2016; (b) Office Action dated. Jan. 30, 2017; and (c) Office Action dated Mar. 24, 2017; (d) Office Action dated Jun. 16, 2017; and (e) Notice of Abandonment dated Nov. 13, 2017. The instant application has a priority claim in common with U.S. Appl. No. 14/810,809.
U.S. Appl. No. 14/842,016: (a) Office Action dated Mar. 8, 2018; (b) Office Action dated Jun. 11, 2018; (c) Office Action dated Sep. 28, 2018; and (b) Notice of Abandonment dated Jun. 7, 2019. The instant application has a priority claim in common with U.S. Appl. No. 14/842,016.
U.S. Appl. No. 15/875,993: (a) Office Action dated Mar. 13, 2020; and (b) Notice of Allowance dated Sep. 4, 2020. The instant application has a priority claim in common with U.S. Appl. No. 15/875,993.

(56) References Cited

OTHER PUBLICATIONS

PCT/US2015/048639: (a) International Search Report and Written Opinion dated Dec. 4, 2015. The instant application has a priority claim in common with International Application No. PCT/US2015/048639.

AU 2015311729: (a) Office Action dated Mar. 18, 2020; Office Action dated May 5, 2020; and (c) Office Action dated Jul. 16, 2020. The instant application has a priority claim in common with AU 2015311729.

AU 2021204029: (a) Office Action dated Aug. 29, 2022. The instant application has a priority claim in common with AU 2021204029.

CA 2 959 764: (a) Office Action dated Sep. 28, 2021. The instant application has a priority claim in common with CA 2,959,764.

CN 2015800539306: (a) Office Action dated Apr. 16, 2020; (b) Office Action dated Oct. 30, 2020; and (c) Office Action dated Feb. 2, 2020. The instant application has a priority claim in common with CN 2015800539306.

EP 158389460: (a) Search Report dated Oct. 10, 2017; (b) Office Action dated Oct. 24, 2017; (c) Office Action dated Jan. 20, 2020; (d) Summons to Oral Proceedings dated Oct. 2, 2020; and (e) Decision to Refuse dated Apr. 8, 2021. The instant application has a priority claim in common with EP 158389460.

EP 211675640: (a) Office Action dated Jun. 30, 2021. The instant application has a priority claim in common with EP 211675640.

Nemenyi et al. "The role of GIS and GPS in precision farming", Computers and Electronics in Agriculture, vol. 40, Issues 1-3, Oct. 2003, p. 45-55 (Year: 2003). (16 pages).

Steinberger et al., "Mobile farm equipment as a data source in an agricultural service architecture", Computers and Electronics in Agriculture, vol. 65, 2009, p. 238-246 (Year: 2009).(9 pages).

Zhang et al., "A PDA-based system for Farmland data collection and transmission", Proceedings of the International Symposium on Intelligent Information Systems and Applications, Oct. 28-30, 2009, p. 162-165 (Year: 2009). (5 pages).

Iftikhar et al. "Flexible exchange of farming device data", Computers and Electronics in Agriculture, vol. 75, Issue 1, Jan. 2011, p. 52-63 (Year: 2011). (34 pages).

Zheng et al., "Development of a smart mobile farming service system", Mathematical and Computer Modelling, vol. 54, Issues 3-4, Aug. 2011, p. 1194-1203 (Year: 2011) (20 pages).

Bakke, U.S. Appl. No. 14/739,823, filed Jun. 15, 2015, Notice of Allowance, dated Jun. 20, 2018.

Bakke, U.S. Appl. No. 14/739,823, filed Jun. 15, 2015, Final Office Action, dated Apr. 11, 2018.

Bakke, U.S. Appl. No. 14/739,823, filed Jun. 15, 2015, Decision on Appeal, dated Sep. 7, 2017.

Mulder, V.L. et al., "The use of remote sensing in soil and terrain mapping—A review" Geoderma 162, 2011, pp. 1-19. (19 pages).

\* cited by examiner

| geographic region 1 | geographic region 2 | geographic region 3 | geographic region 4 | geographic region 5 | geographic region 6 |
|---|---|---|---|---|---|
| geographic region 7 | geographic region 8 | geographic region 9 | geographic region 10 | geographic region 11 | geographic region 12 |
| geographic region 13 | geographic region 14 | geographic region 15 | geographic region 16 | geographic region 17 | geographic region 18 |
| geographic region 19 | geographic region 20 | geographic region 21 | geographic region 22 | geographic region 23 | geographic region 24 |
| geographic region 25 | | | | | |

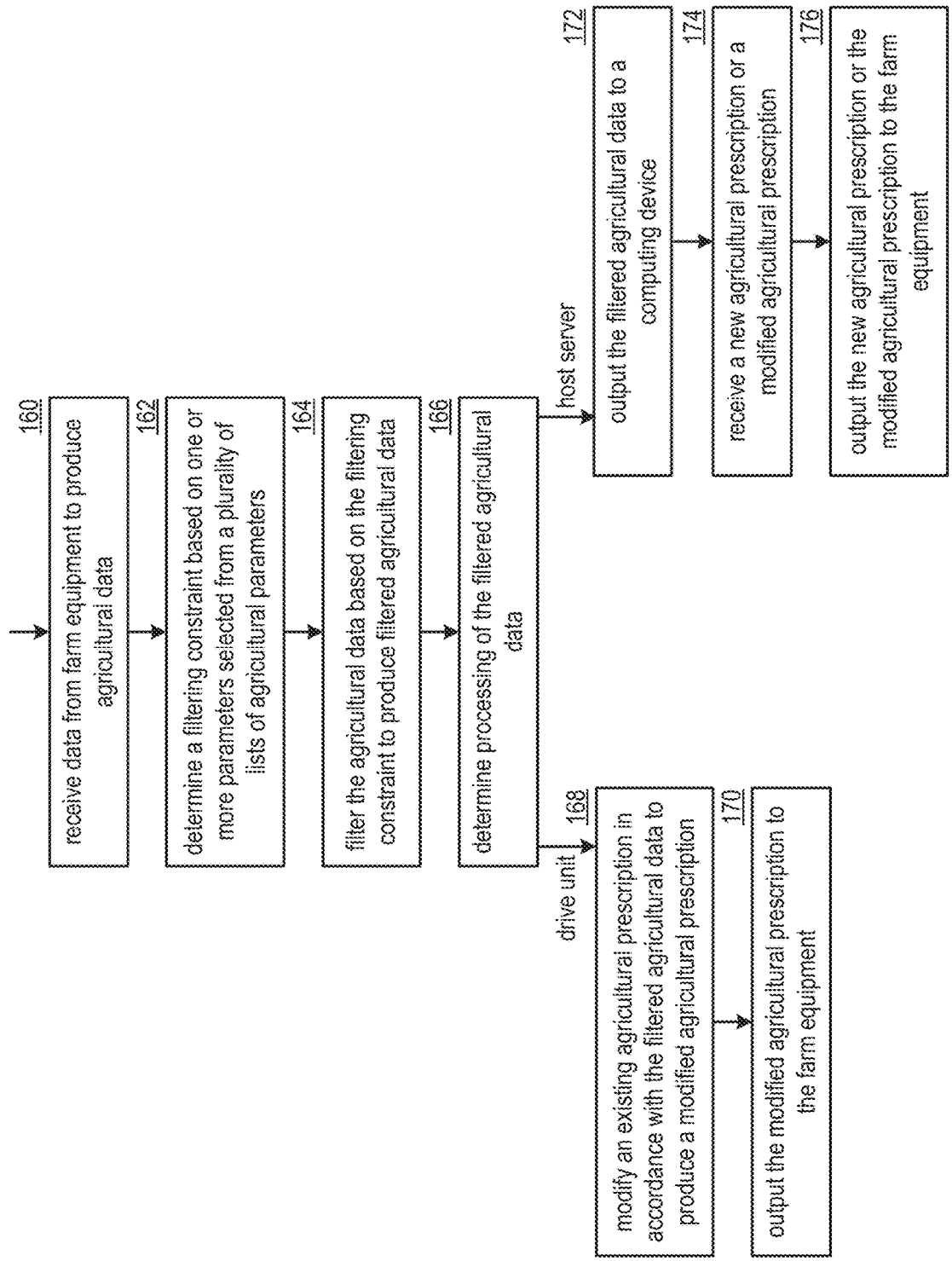

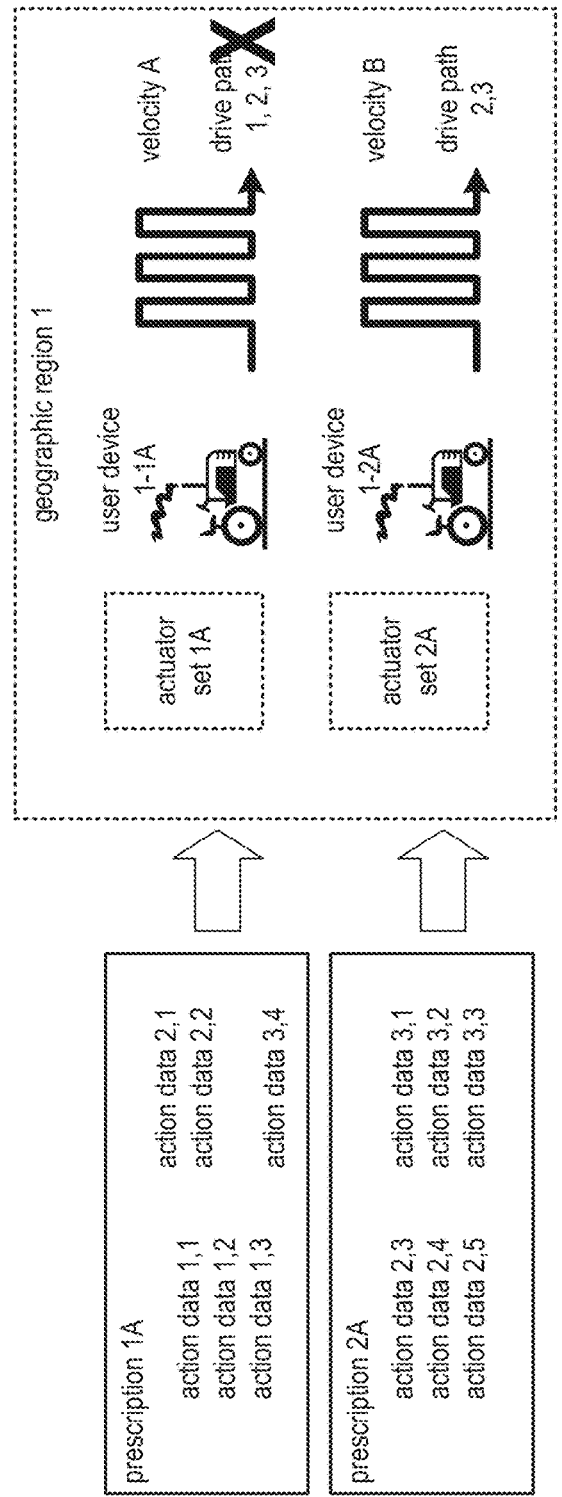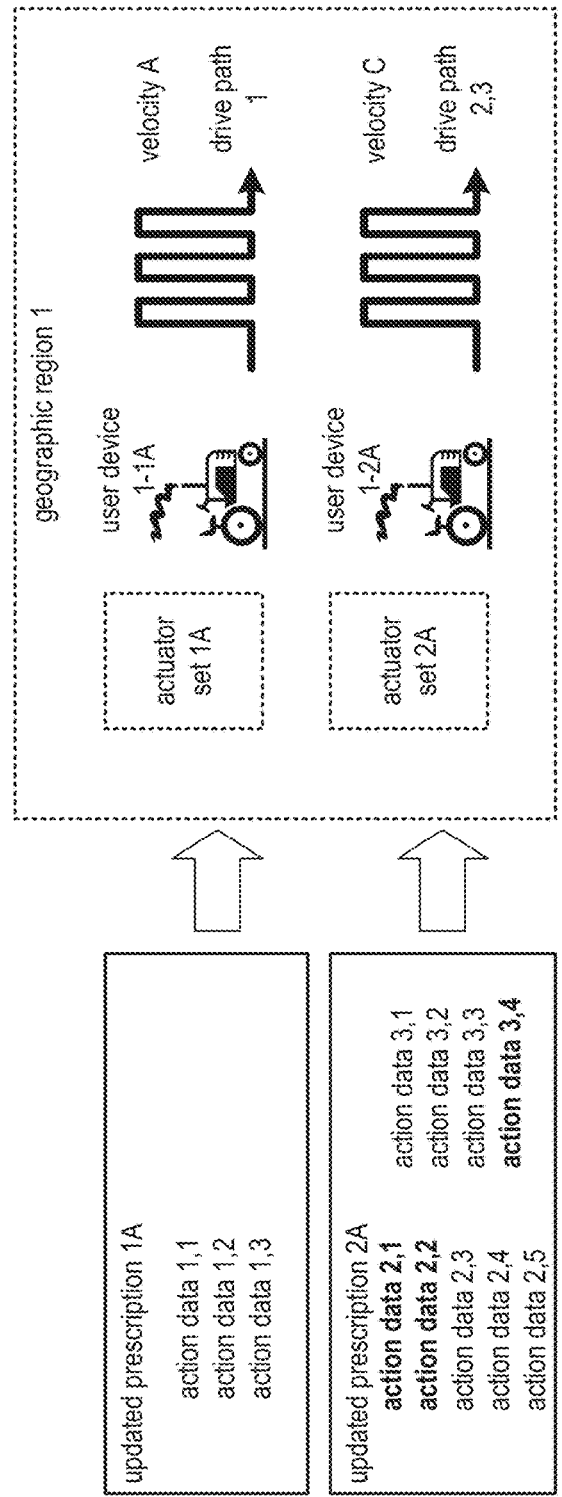

COLLECTING DATA TO GENERATE AN AGRICULTURAL PRESCRIPTION

BENEFIT CLAIM

This application claims the benefit under 35 U.S.C. 120 as a continuation of application Ser. No. 14/739,823, filed Jun. 15, 2015, now U.S. Pat. No. 10,109,024, which claims priority pursuant to 35 U.S.C. § 119(e) to provisional application 62/046,346, filed Sep. 5, 2014 and to provisional application 62/052,034, filed Sep. 18, 2014, the entire contents of which are hereby incorporated by reference for all purposes as if fully set forth herein.

BACKGROUND

Technical Field

This invention relates generally to computing systems utilized in agriculture and more particularly to utilization of computing systems to prescribe aspects of an agriculture life cycle to provide improved results of the agriculture life cycle.

Description of Related Art

Agriculture is known to include cultivation of plants to sustain and enhance human life. The cultivation of plants includes executing numerous steps of the agriculture lifecycle, such as, land management, irrigation, fertilization, planting, and harvesting. Effectiveness of the agriculture lifecycle may depend upon process control of the execution of the numerous steps and further depend upon numerous conditions, such as, available sunlight, water availability, temperature ranges, wind speeds, soil type, soil nutrients, and other factors.

Computing devices are known to gather data, store the data, process the data, and communicate the data. Examples of a computing device includes embedded farming equipment electronics, a smart phone, a tablet computer, a laptop computer, a personal computer, a storage server, and/or a data processing server. Basically, any device that includes a computing unit, one or more interfaces, and a memory system may be deemed a computing device.

As is further known, computing devices may be utilized to gather data associated with the agriculture lifecycle and to process the gathered data. Such processed data may be utilized to understand cause and effect relationships associated with the effectiveness of the agriculture lifecycle.

BRIEF DESCRIPTION OF THE SEVERAL VIEWS OF THE DRAWING(S)

FIG. 2 is a diagram illustrating an embodiment of a plurality of geographic regions in accordance with the present invention;

FIG. 12D is a flowchart illustrating another example of collecting data to generate an agricultural prescription in accordance with the present invention;

Figure 13A:
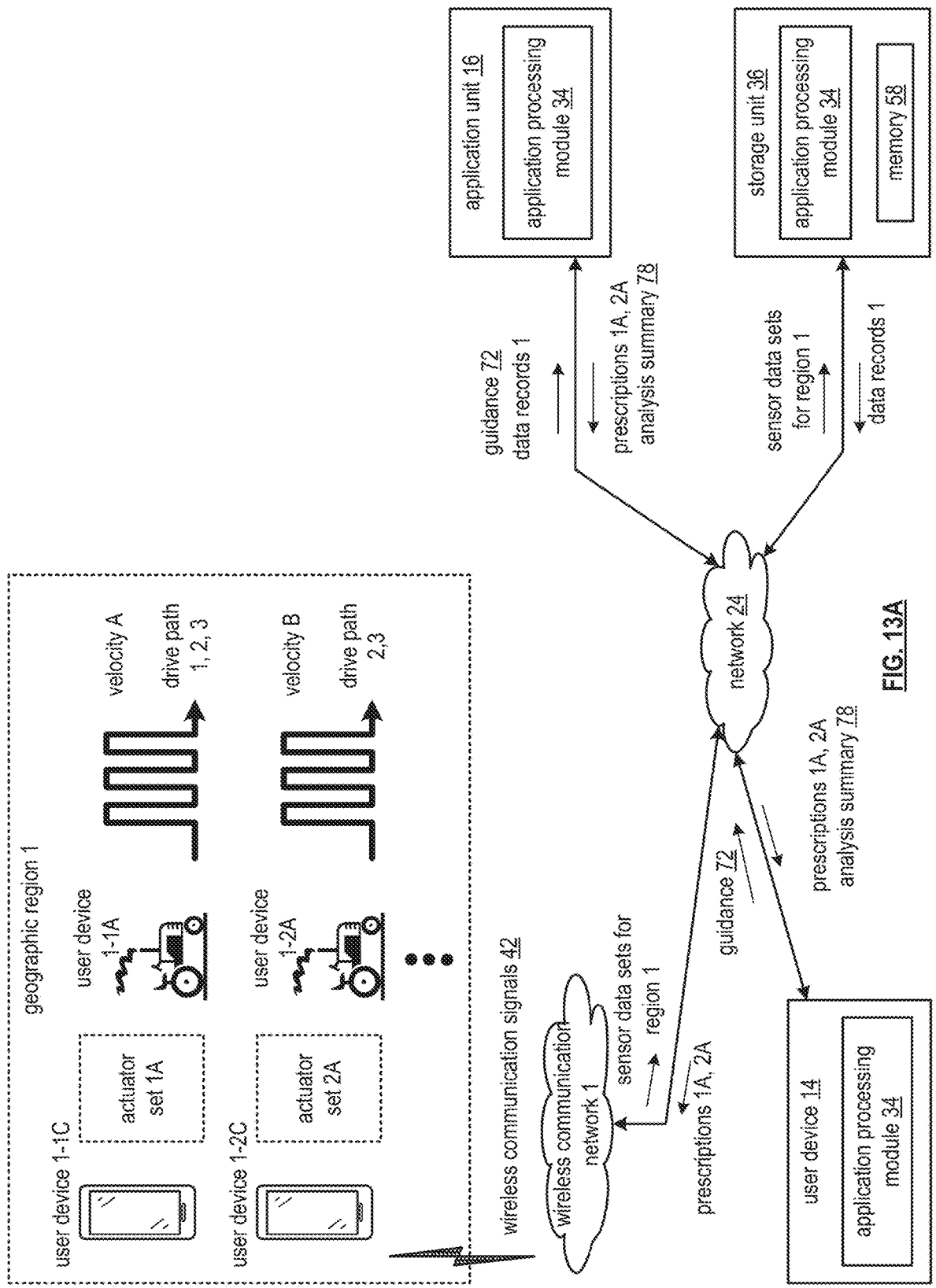
FIG. 13A is a schematic block diagram of another embodiment of a computing system in accordance with the present invention.
Figure 13D:
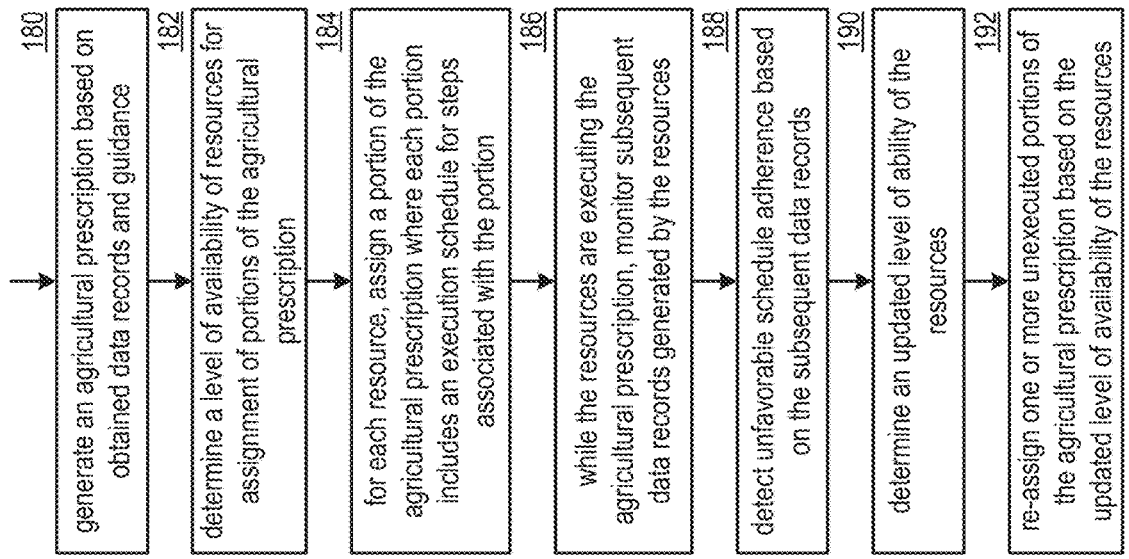
Figure 14A:
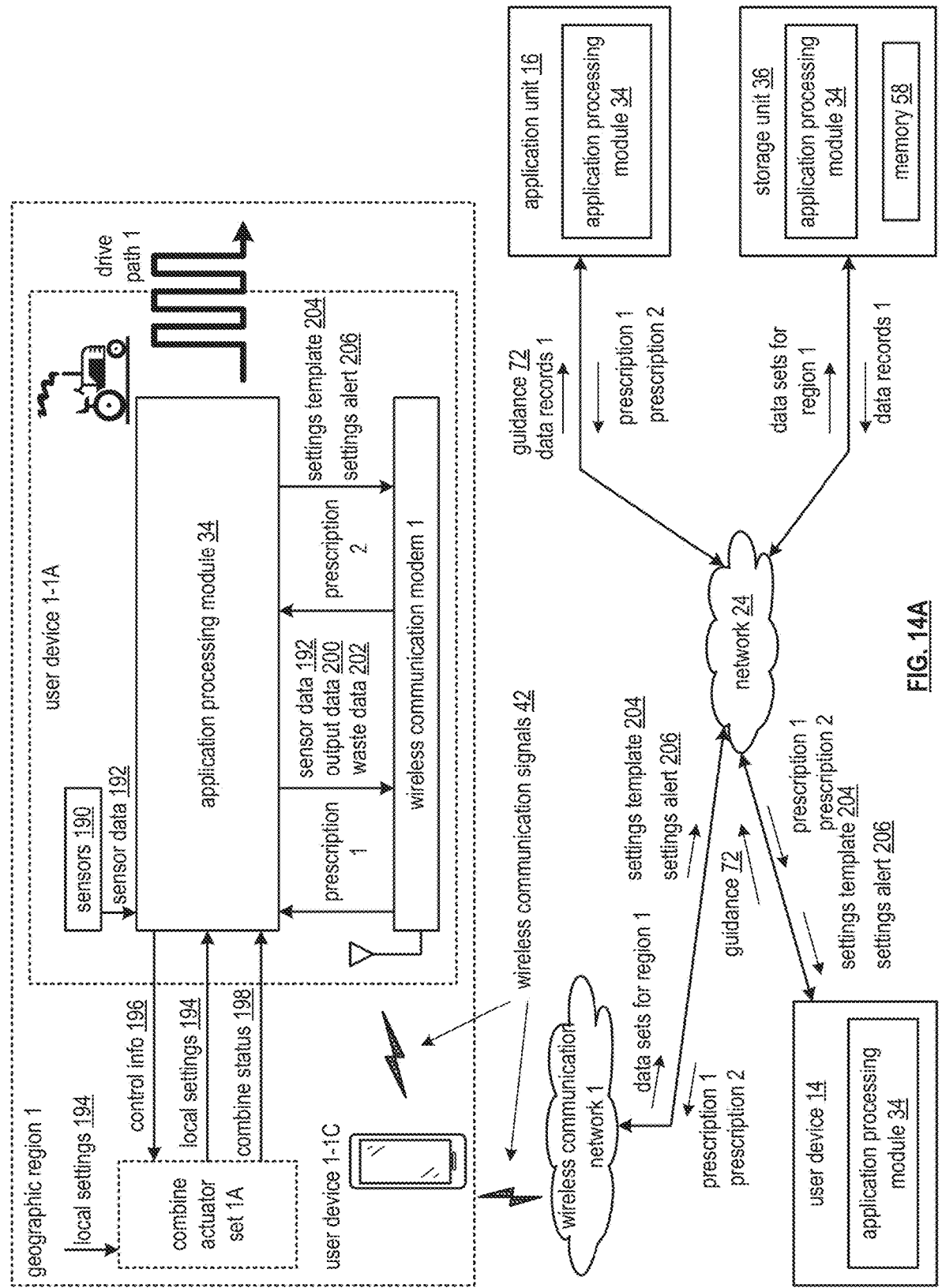
Figure 14B:
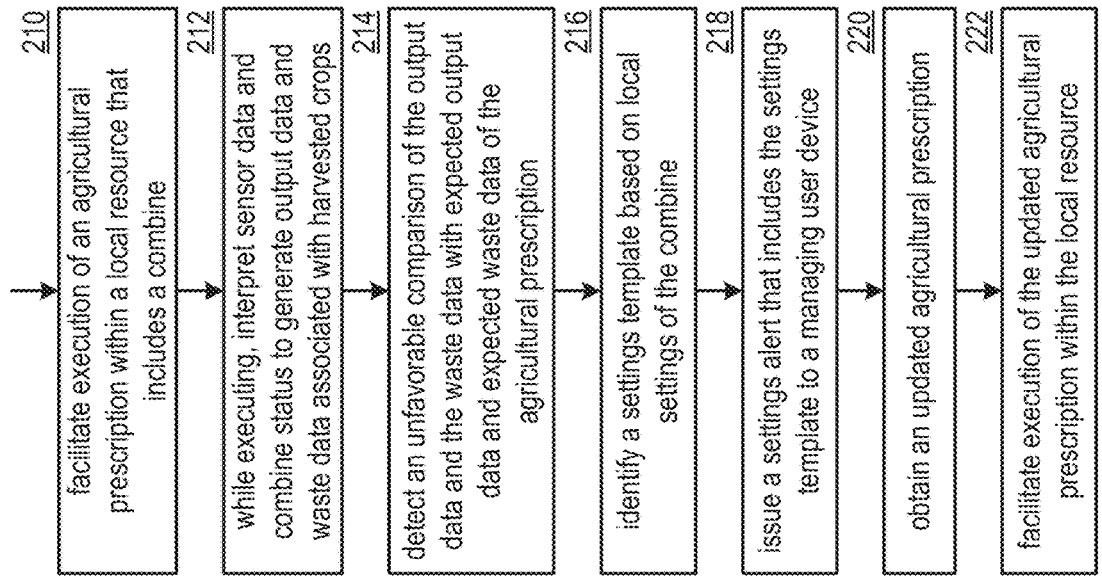
Figure 15A:
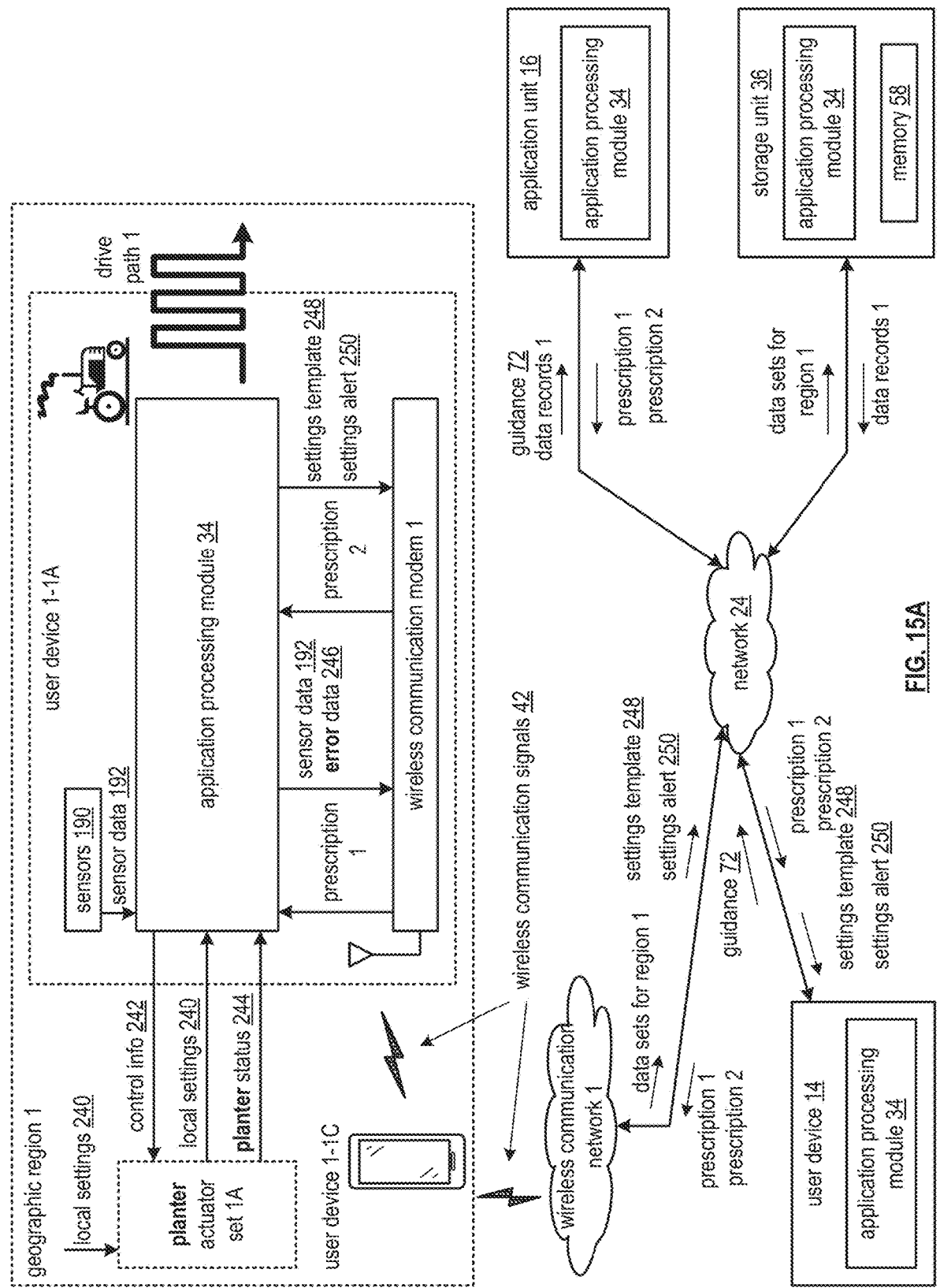
Figure 15B:
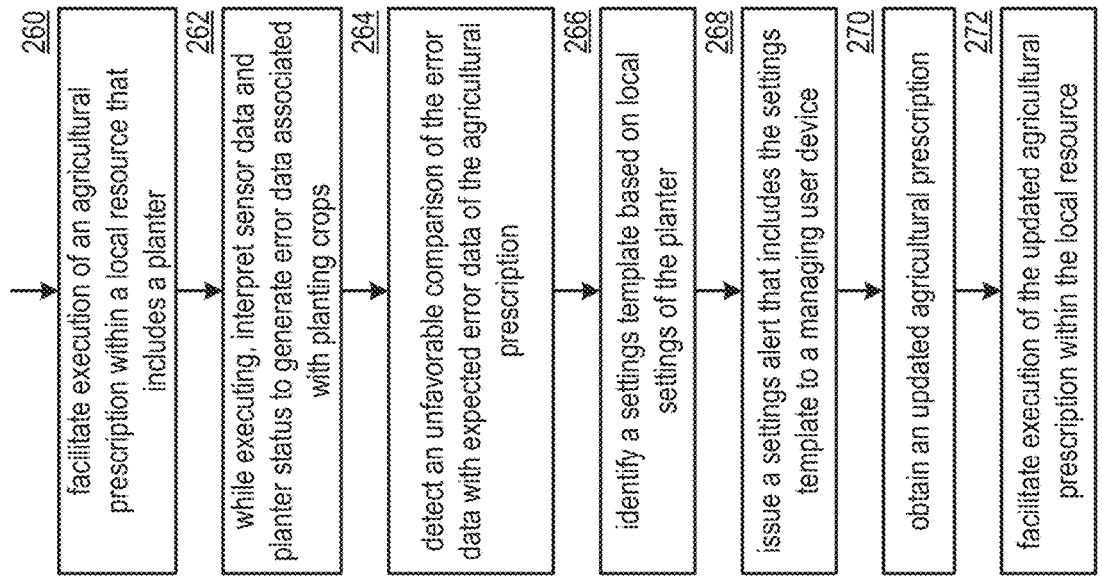
Figure 16A:
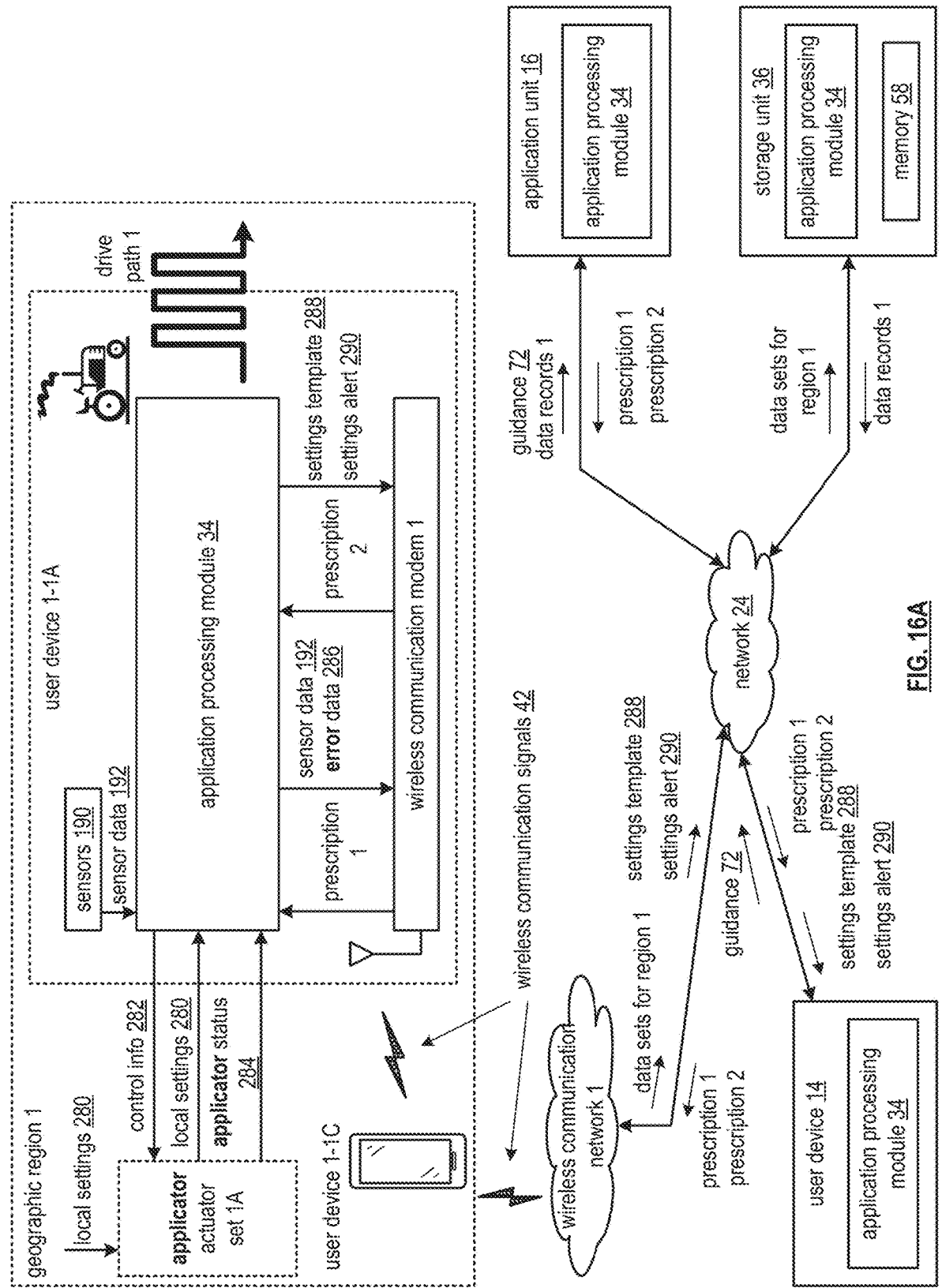
Figure 16B:
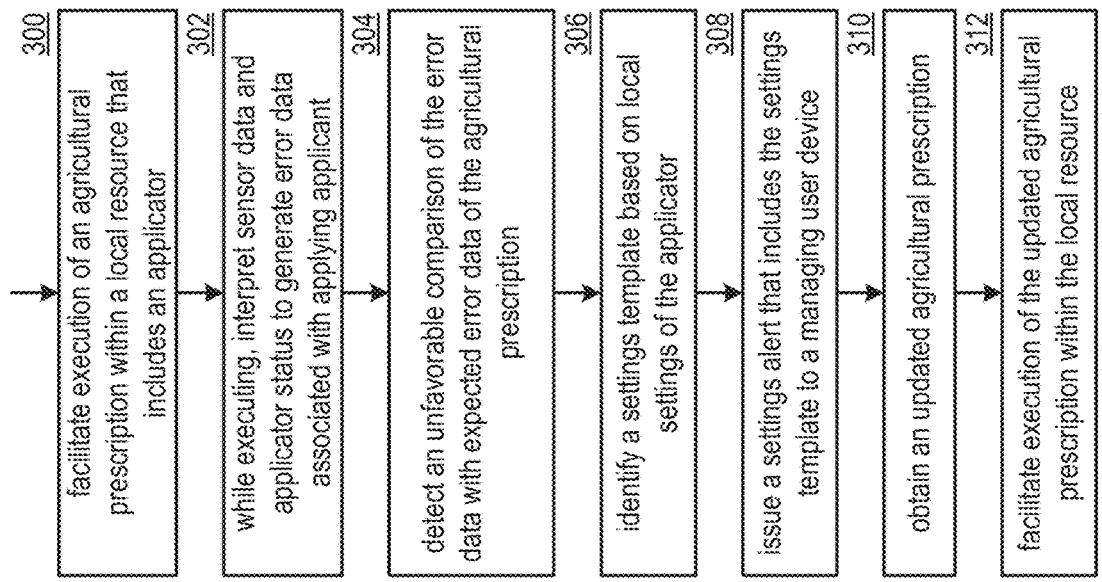
Figure 17A:
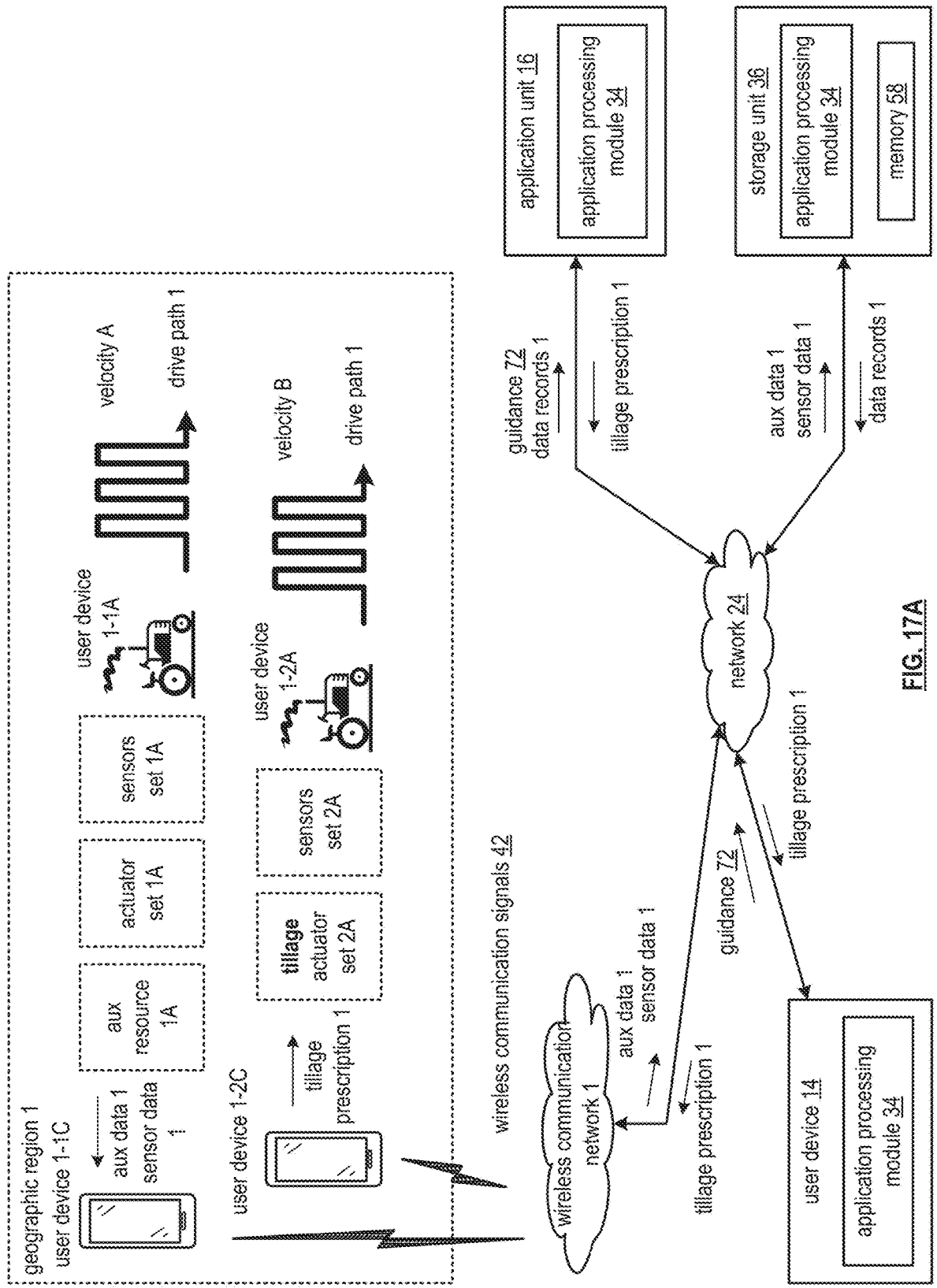
Figure 17B:
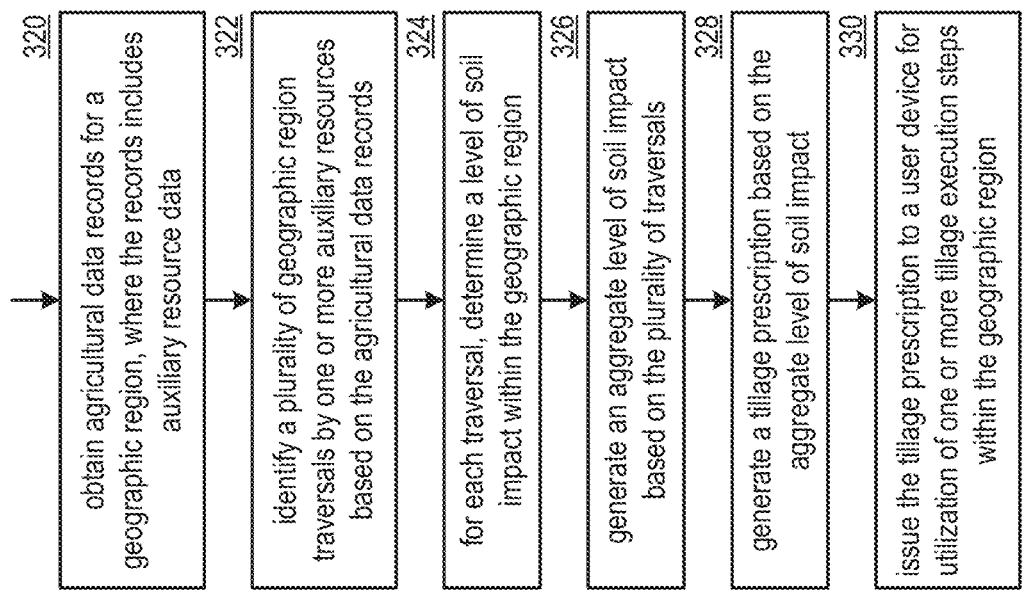
Figure 18A:
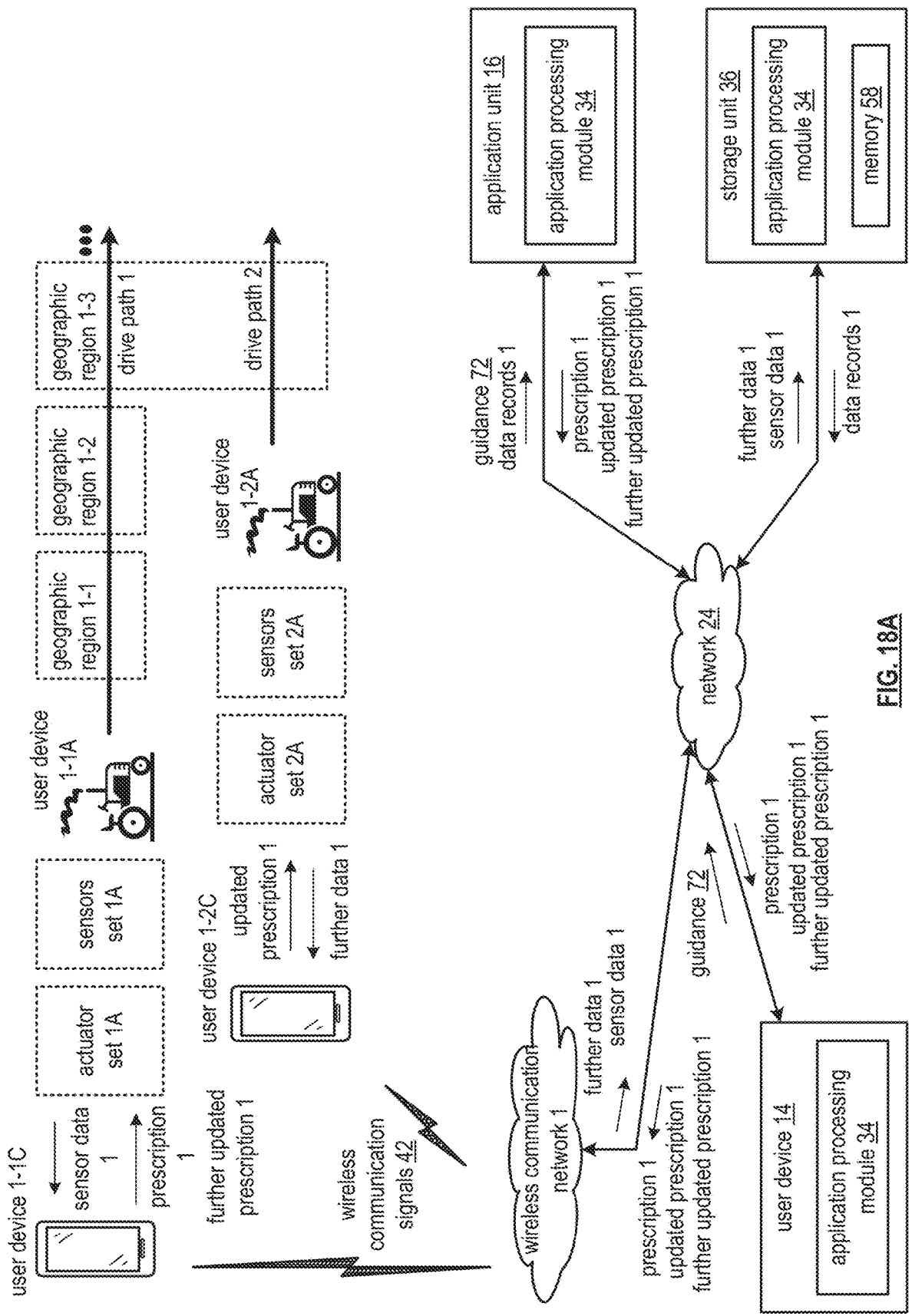
Figure 18B:
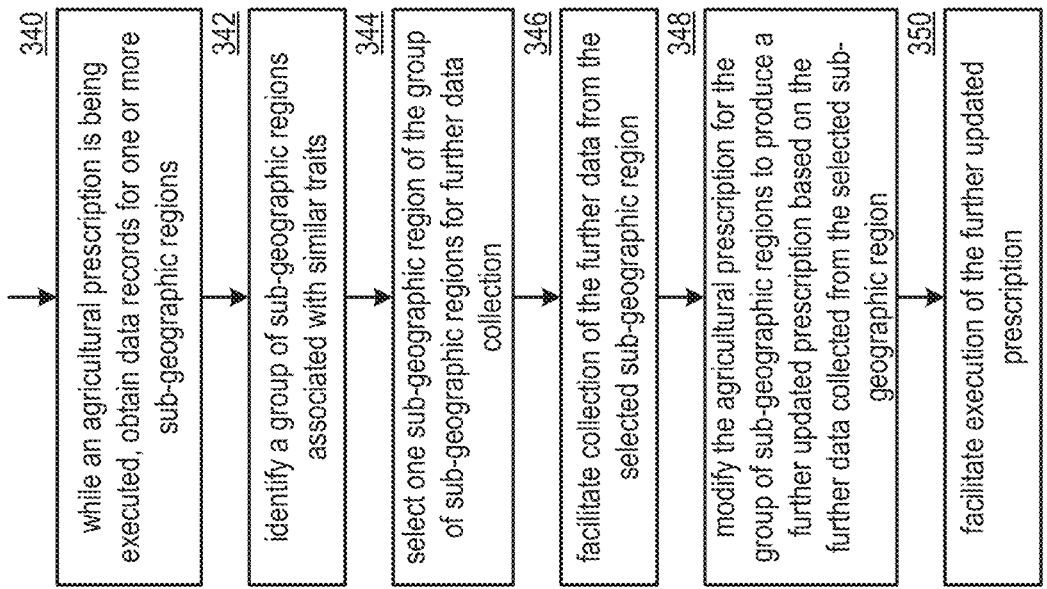
Figure 19A:
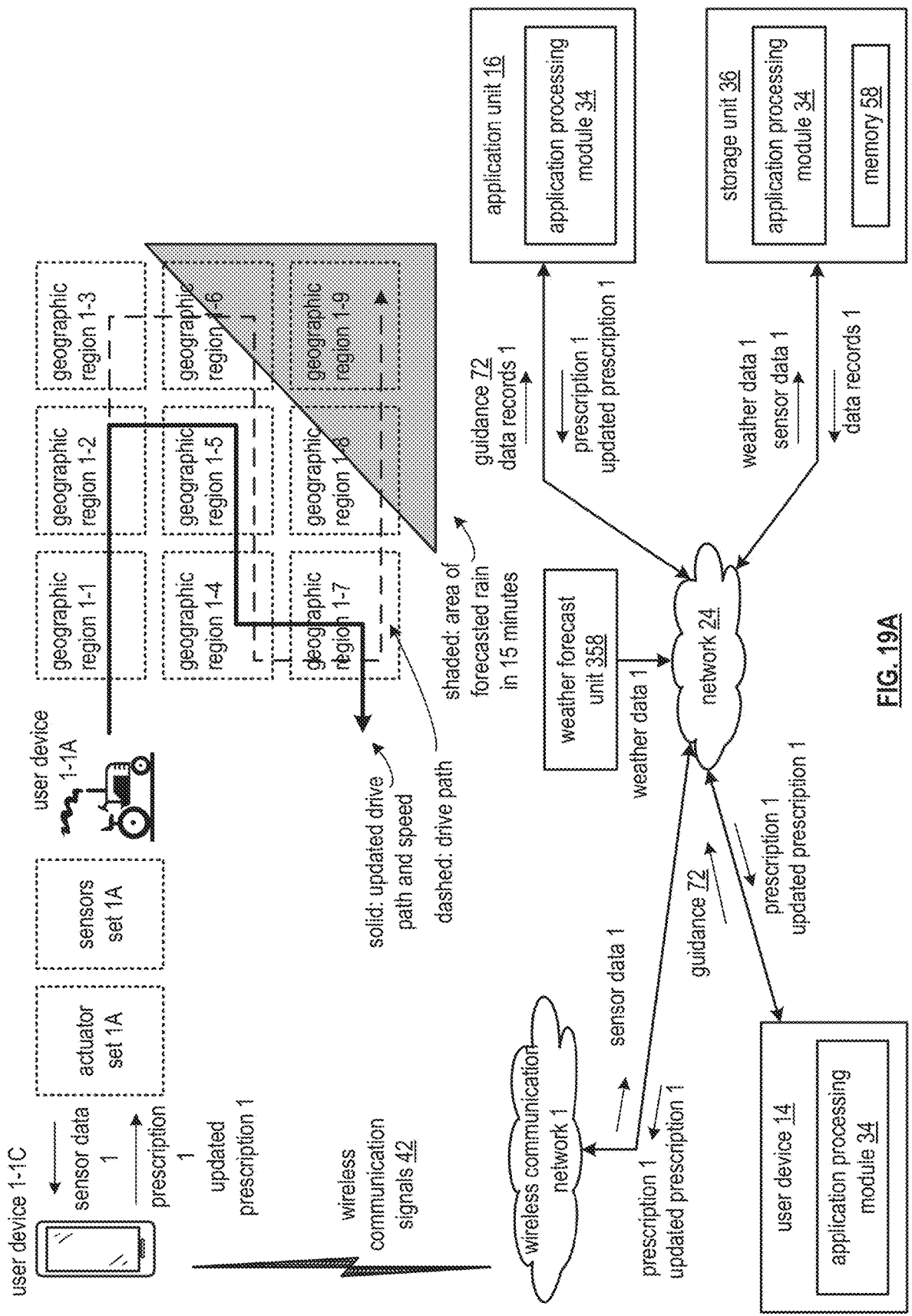
Figure 19B:
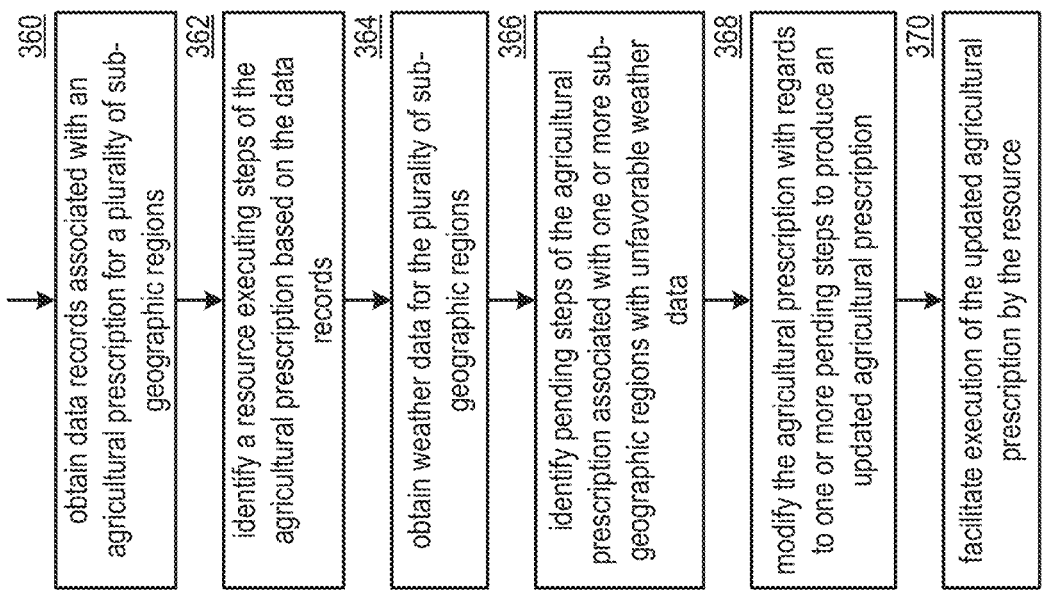
Figure 20A:
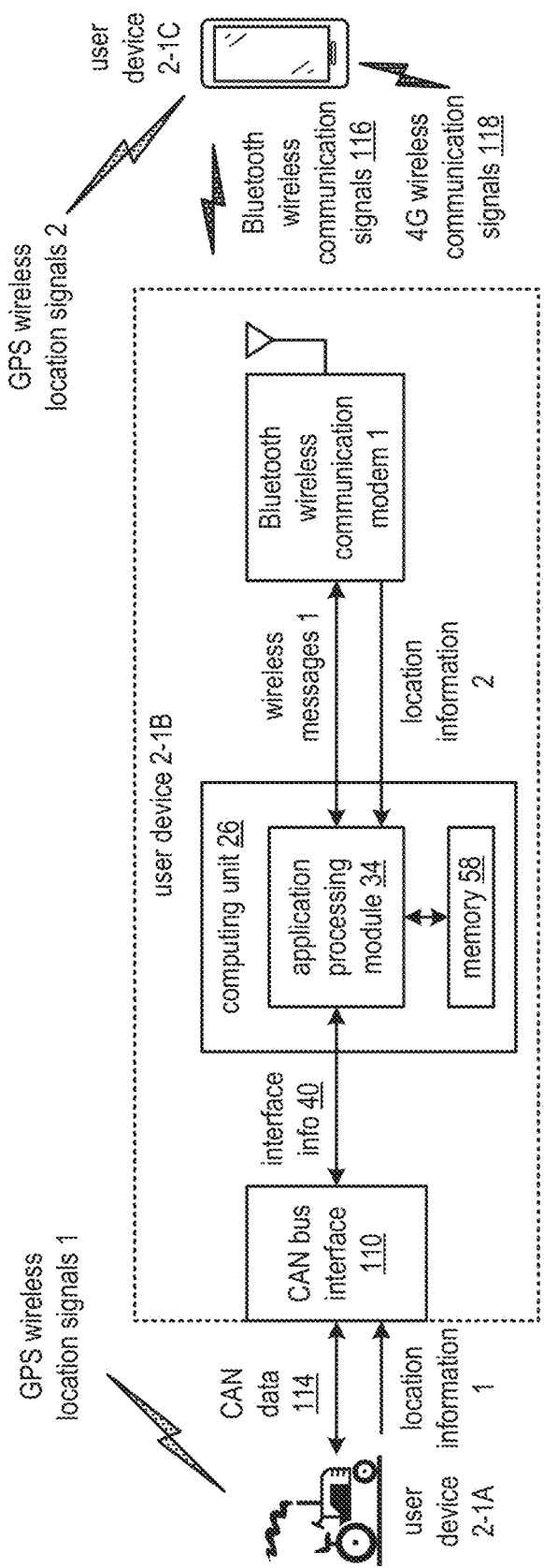
Figure 20B:
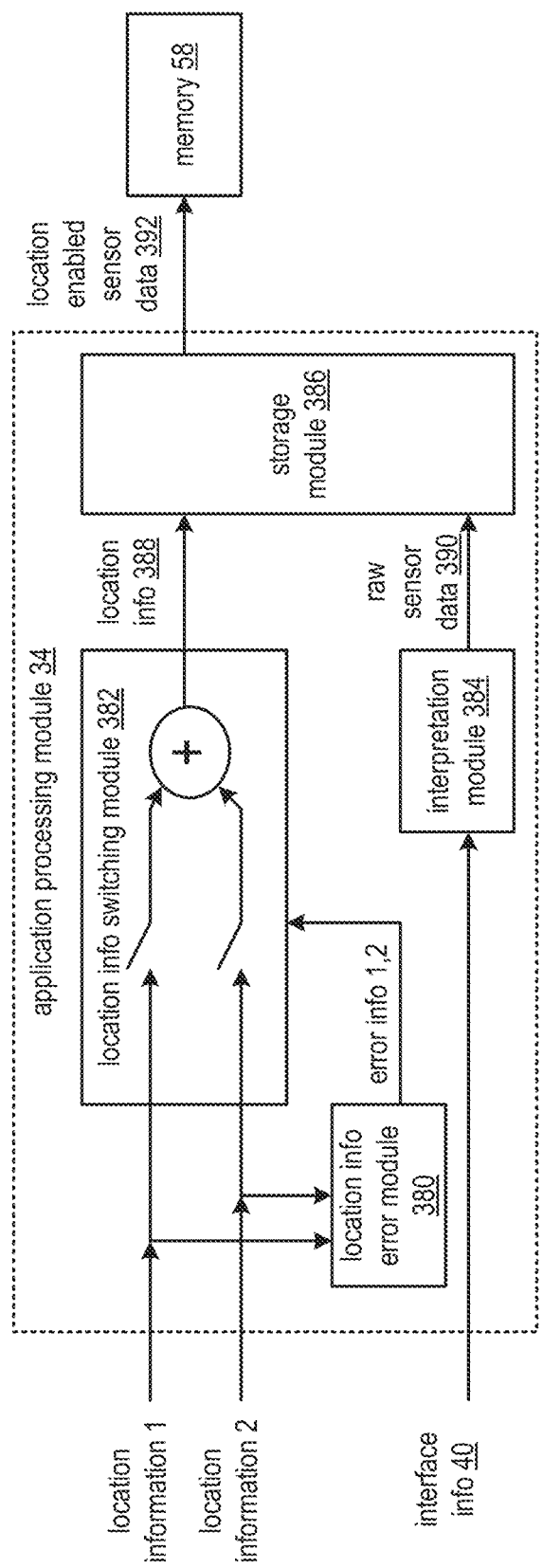
Figure 20C:
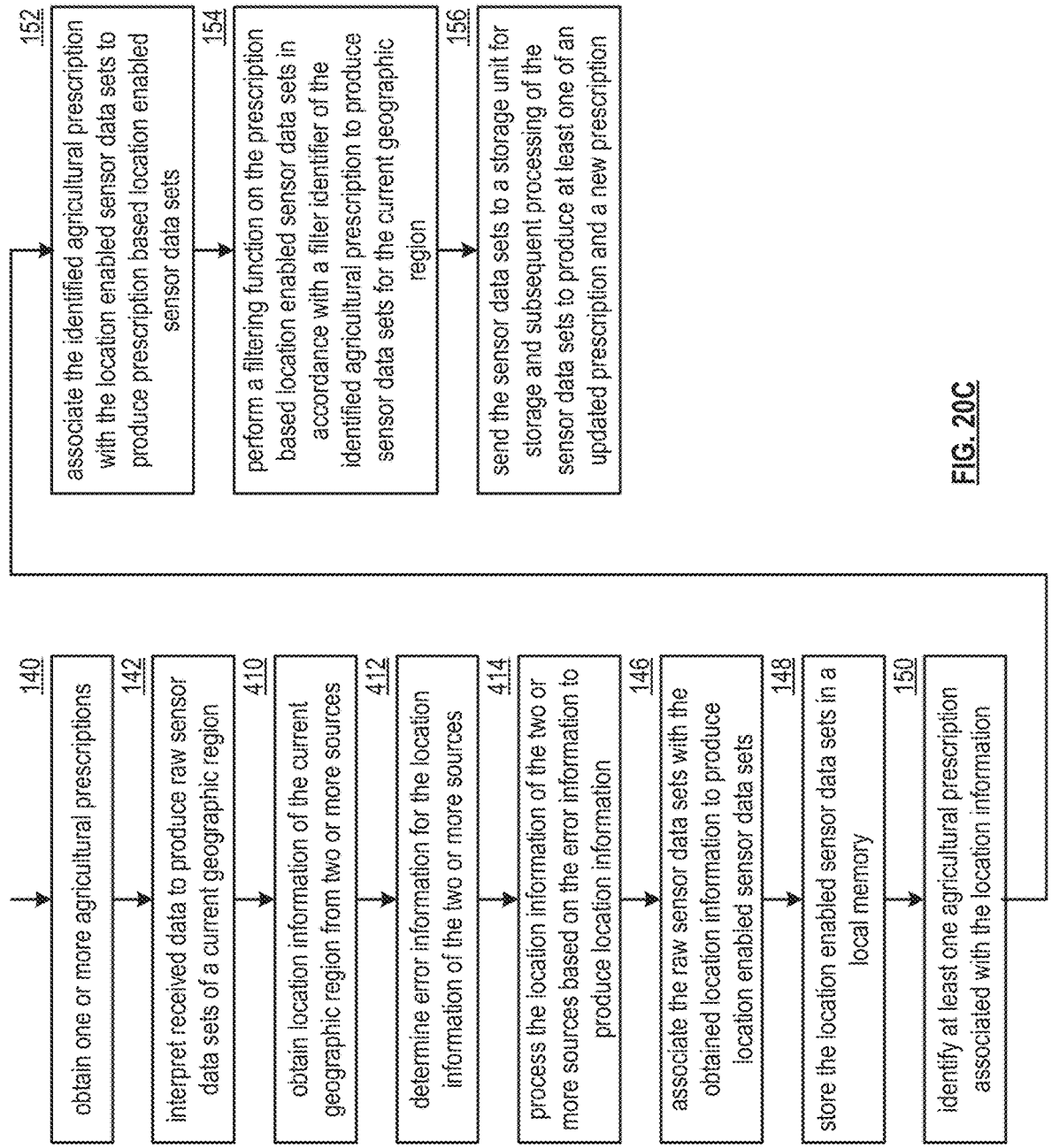
Figure 21A:
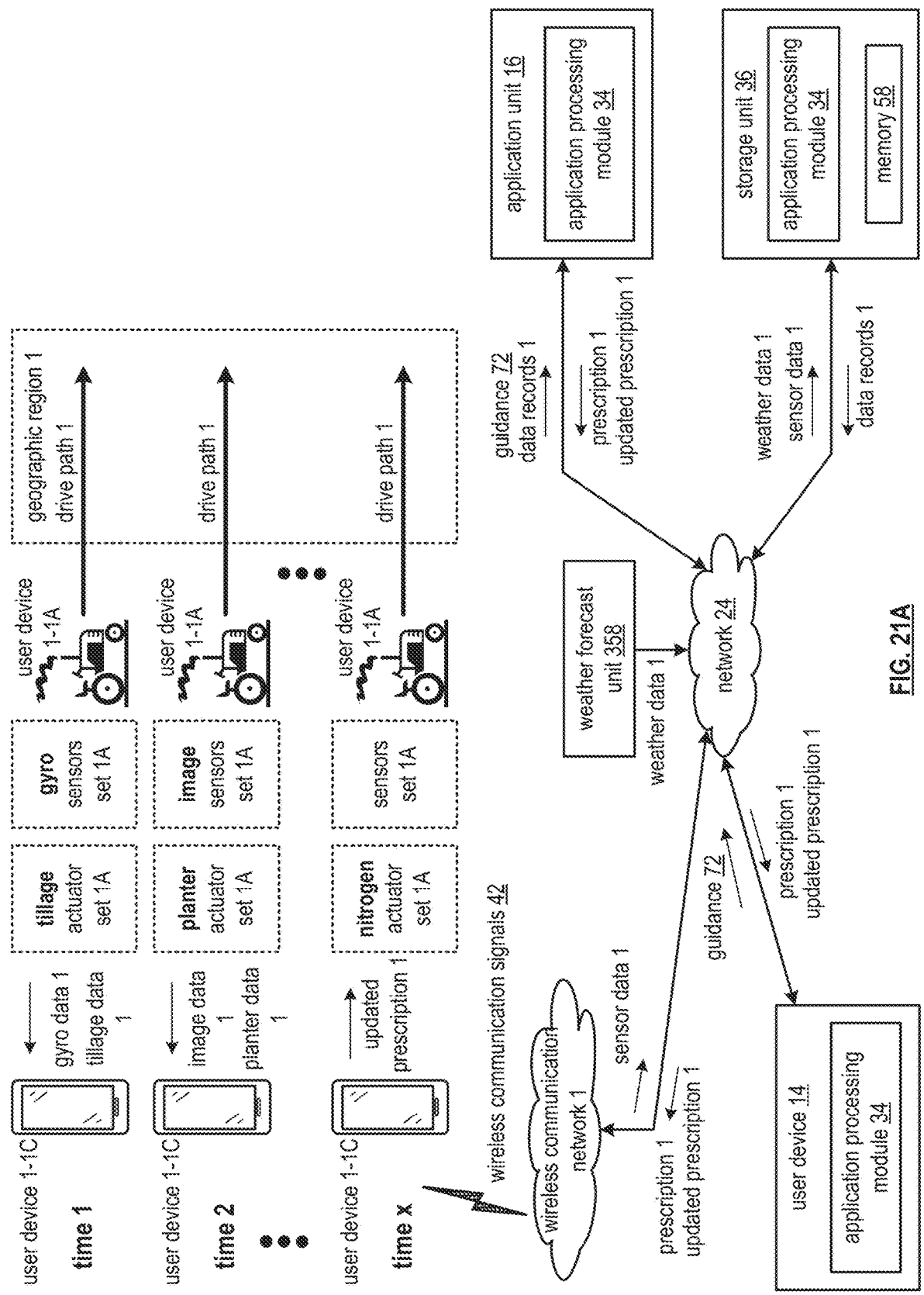
Figure 21B:
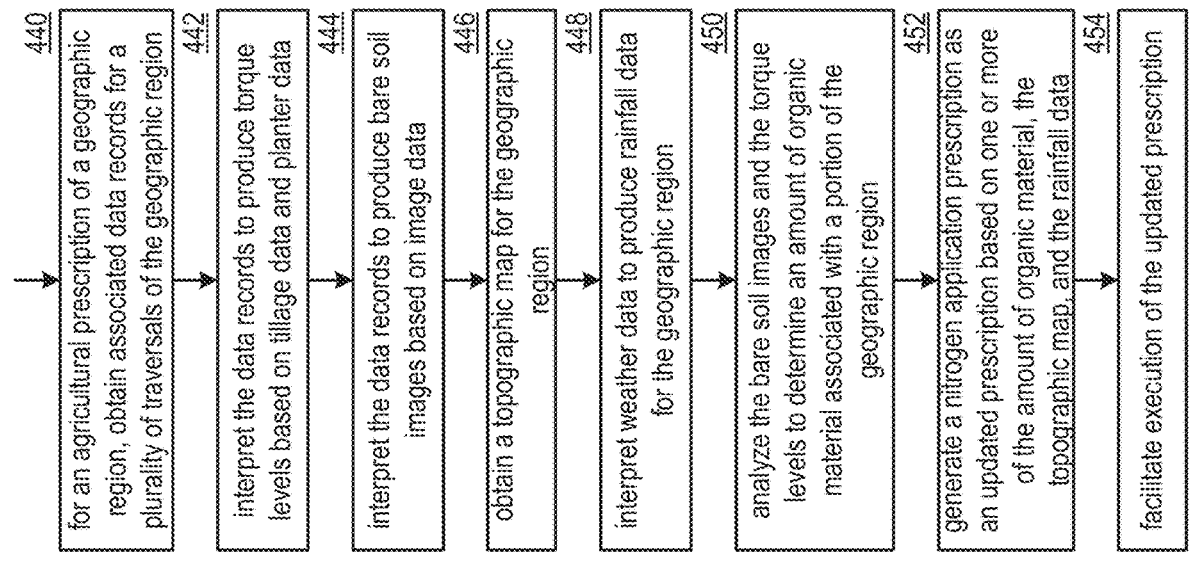
Figure 22A:
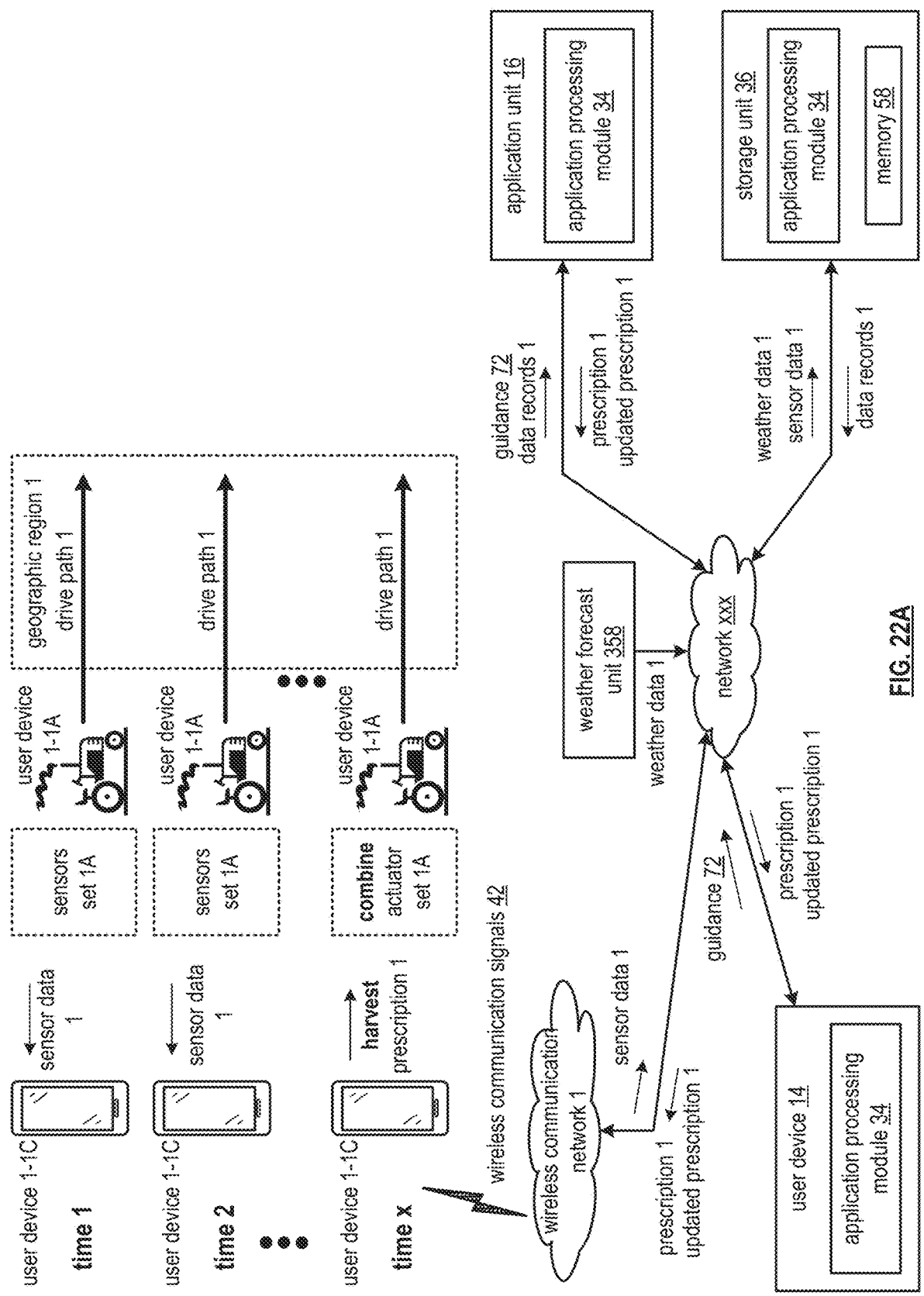
Figure 22B:
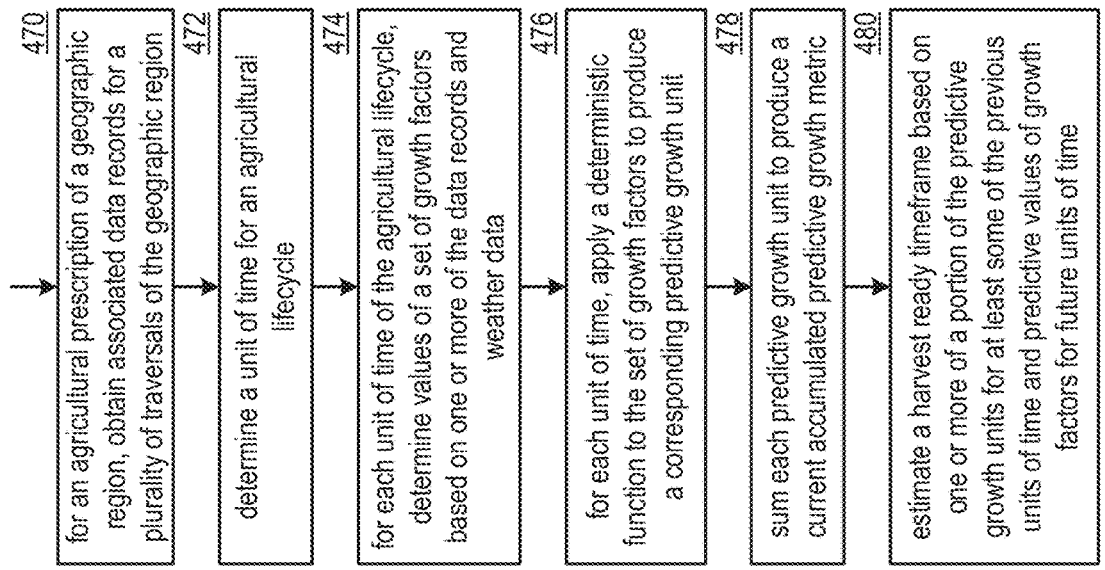
Figure 23A:
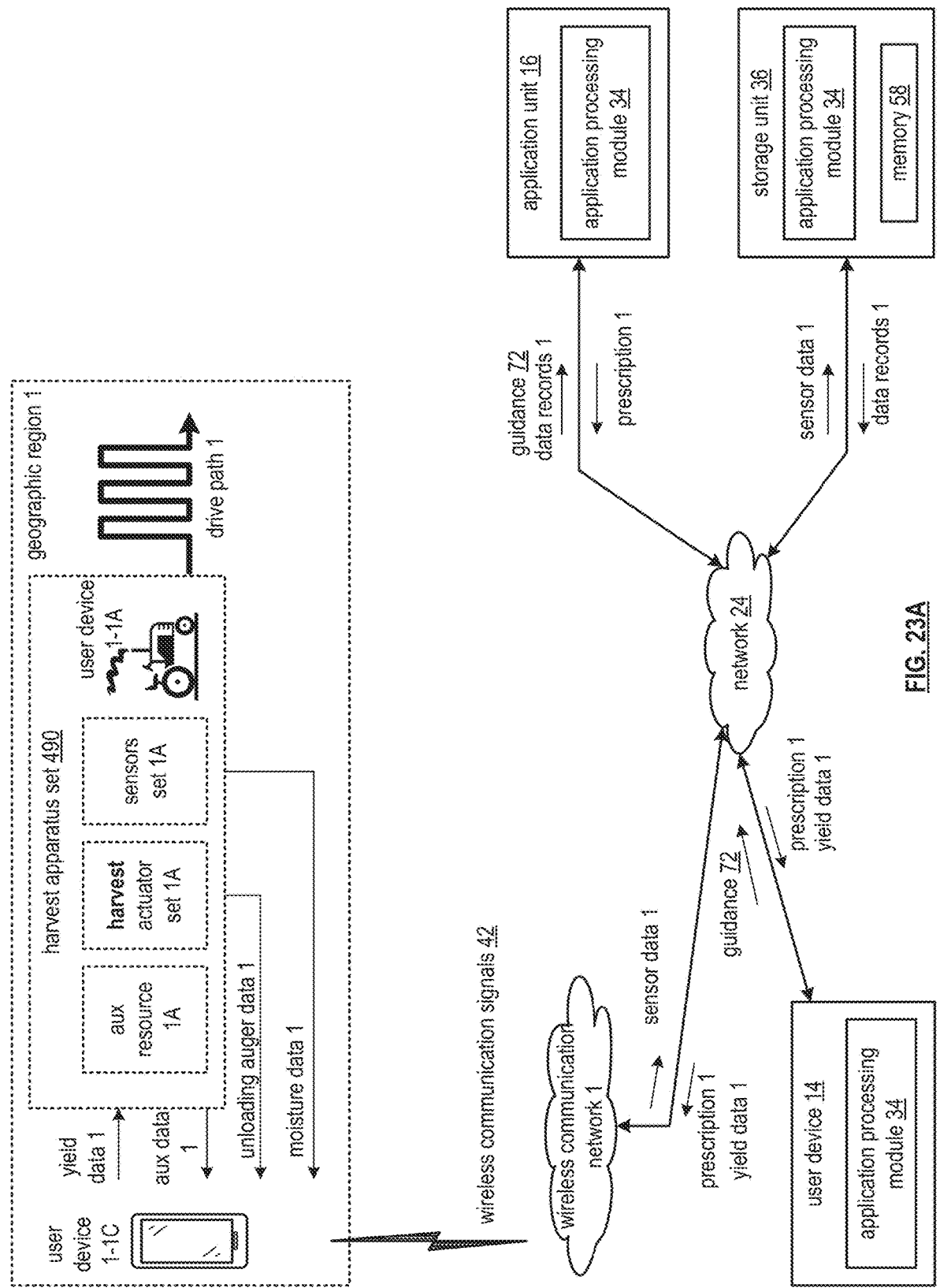
Figure 23B:
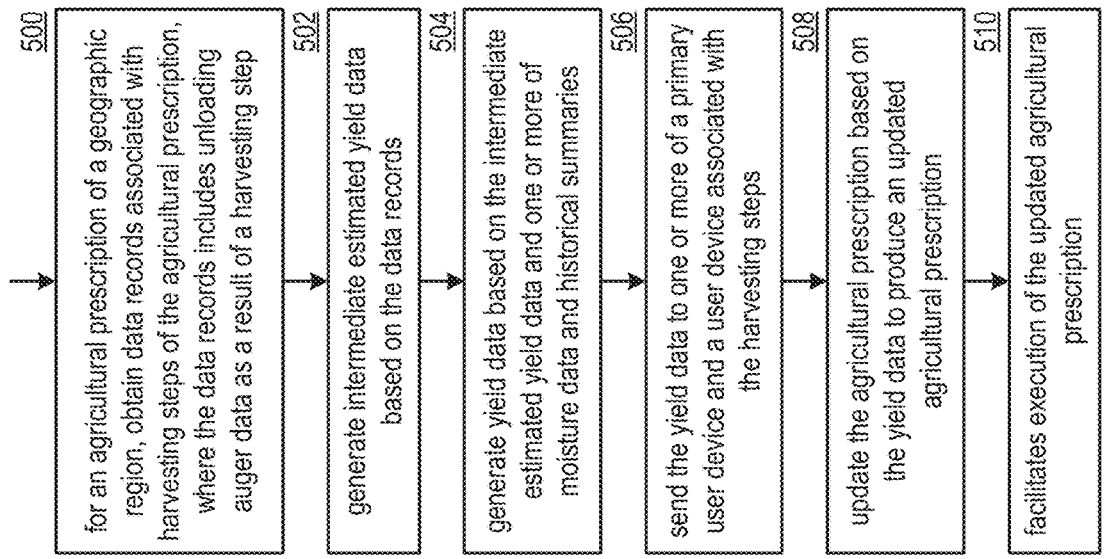
Figure 24A:
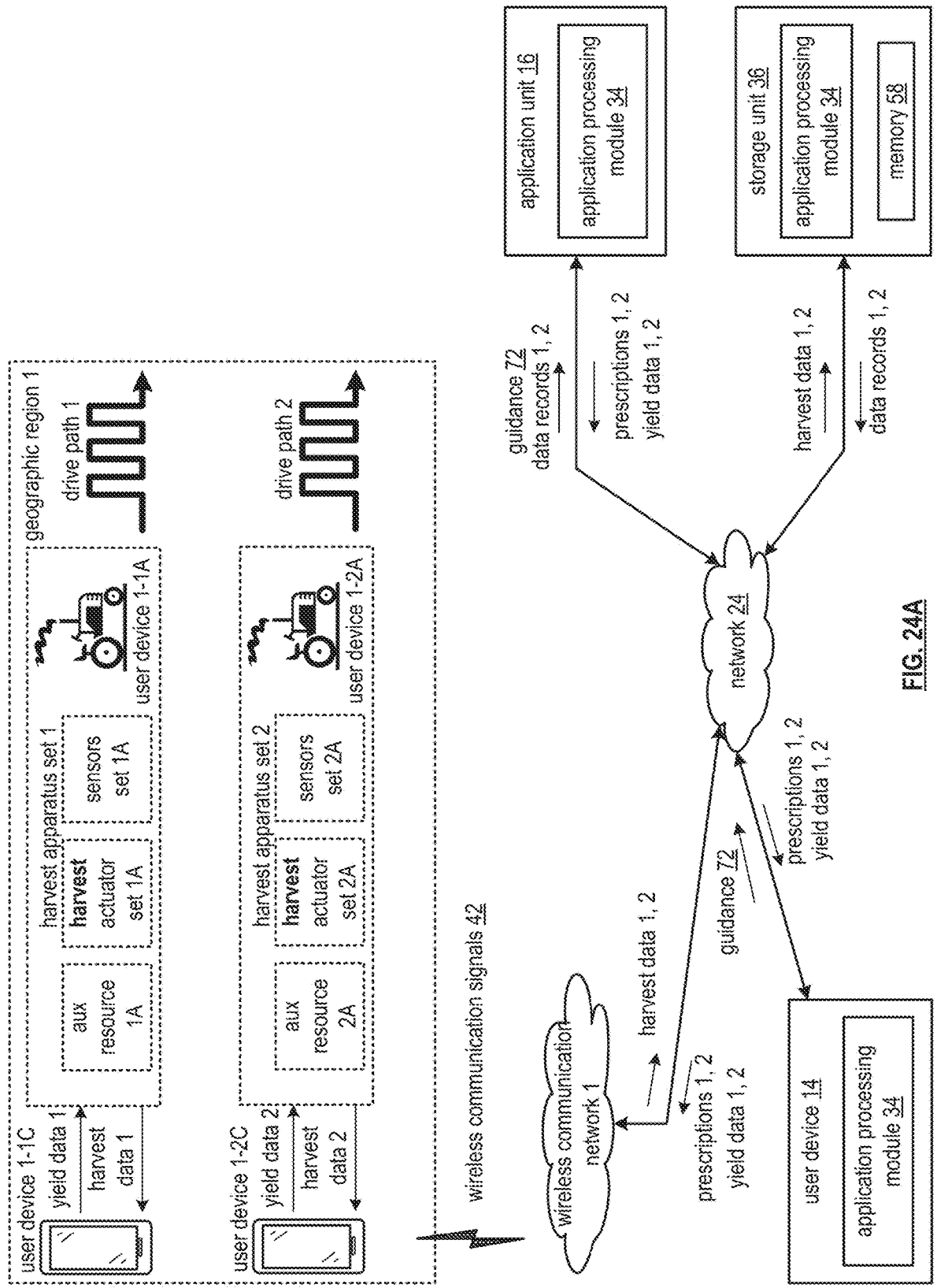
Figure 24B:
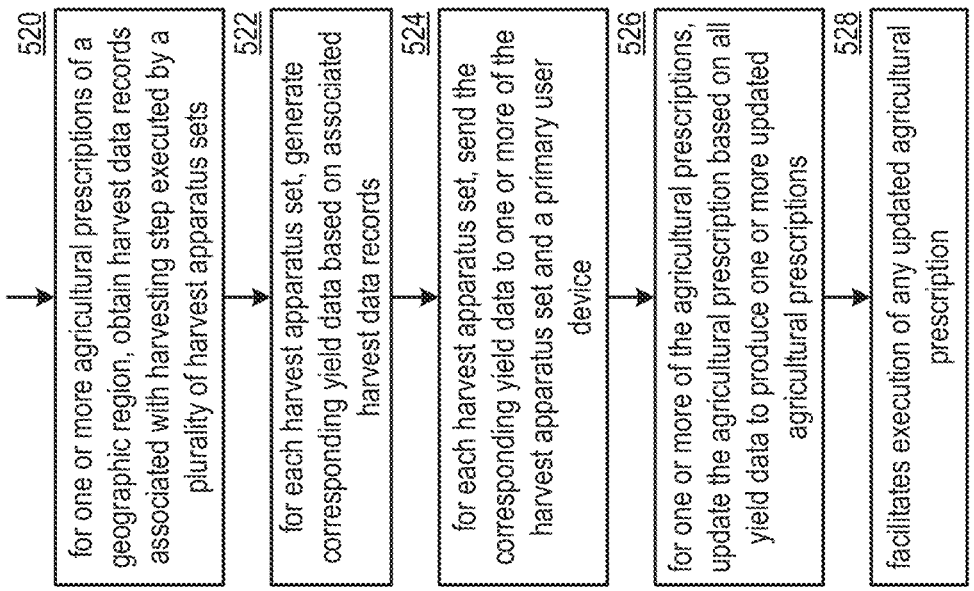
Figure 25A:
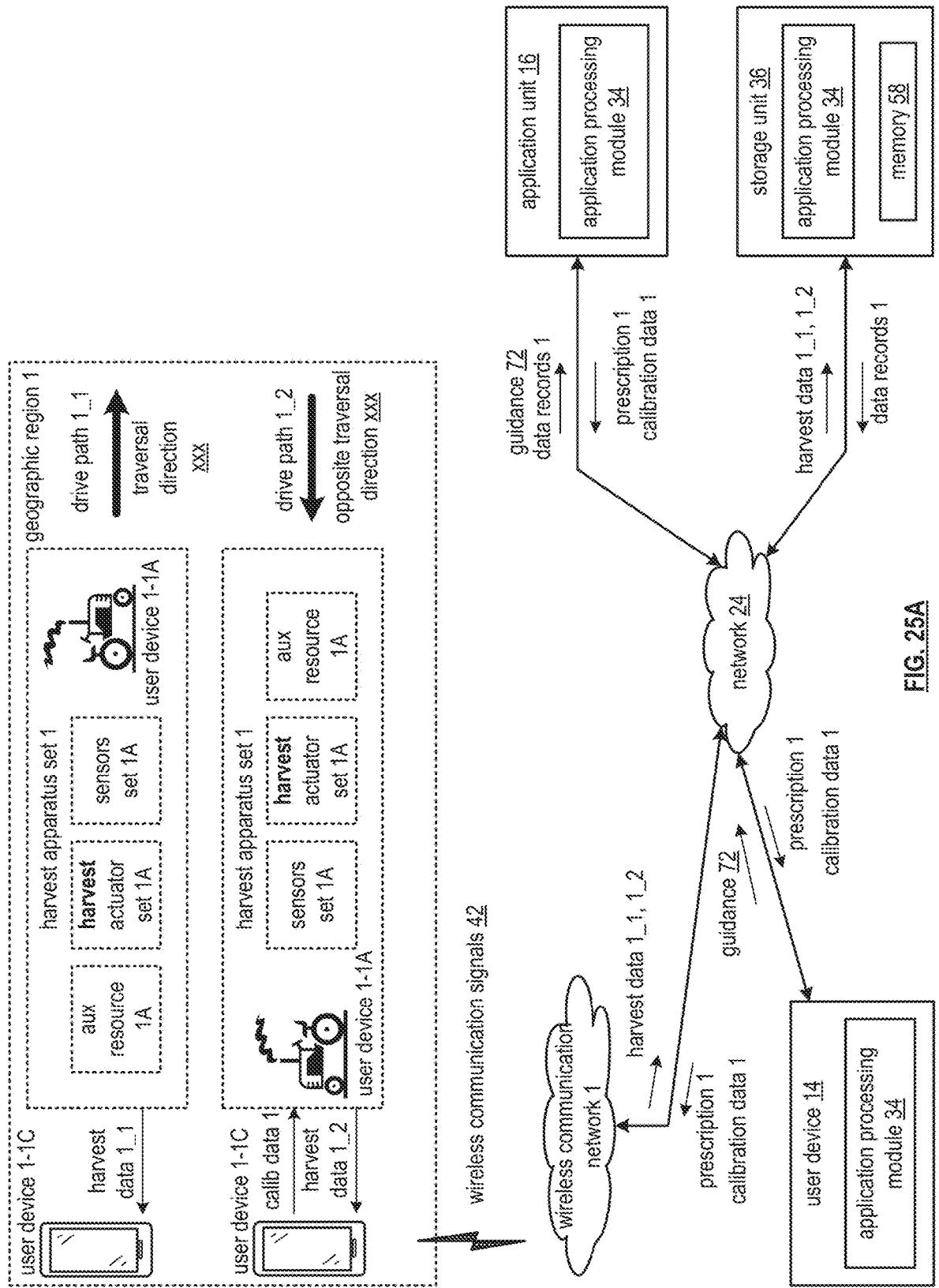
Figure 25B:
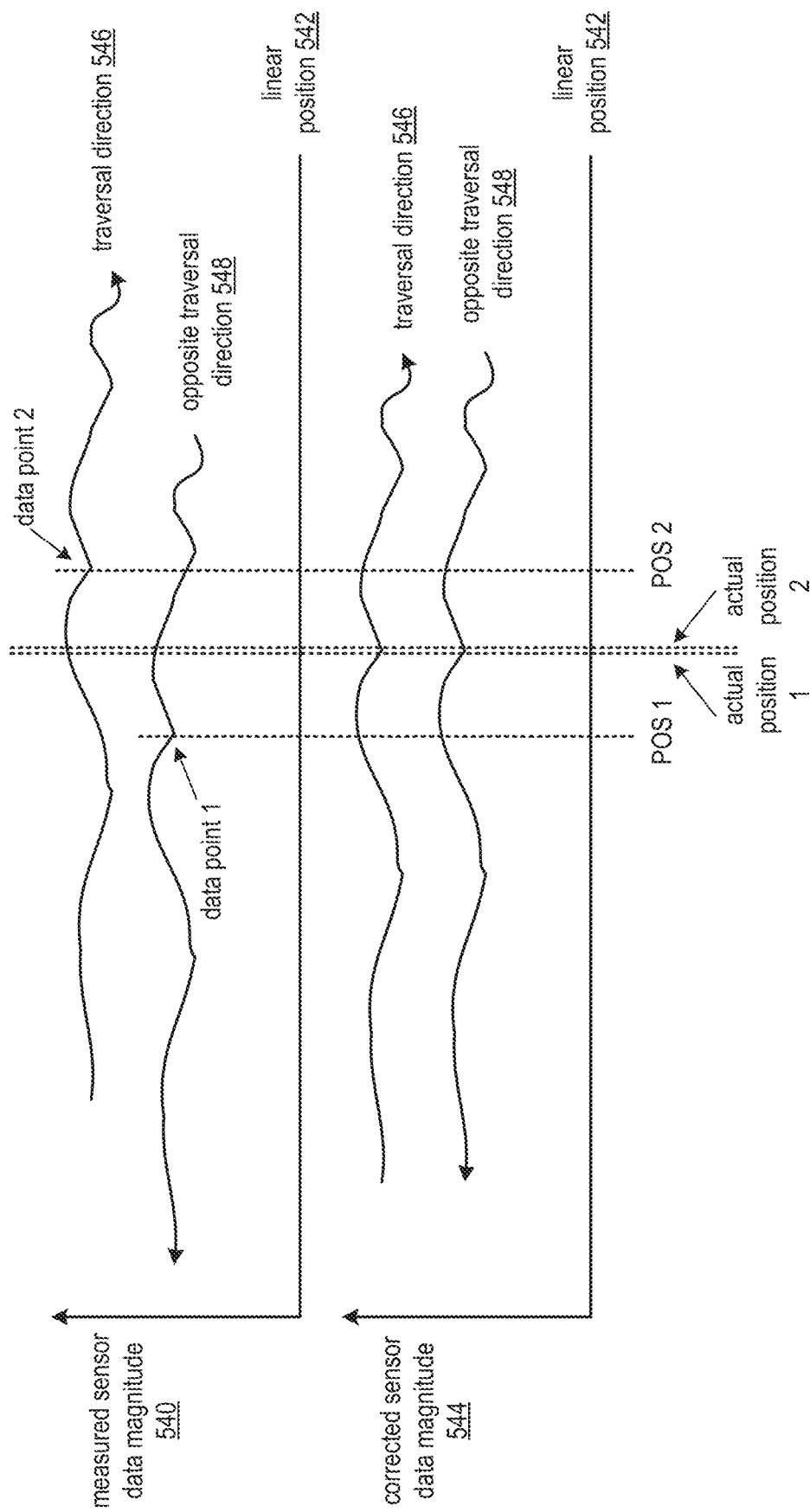
Figure 25C:
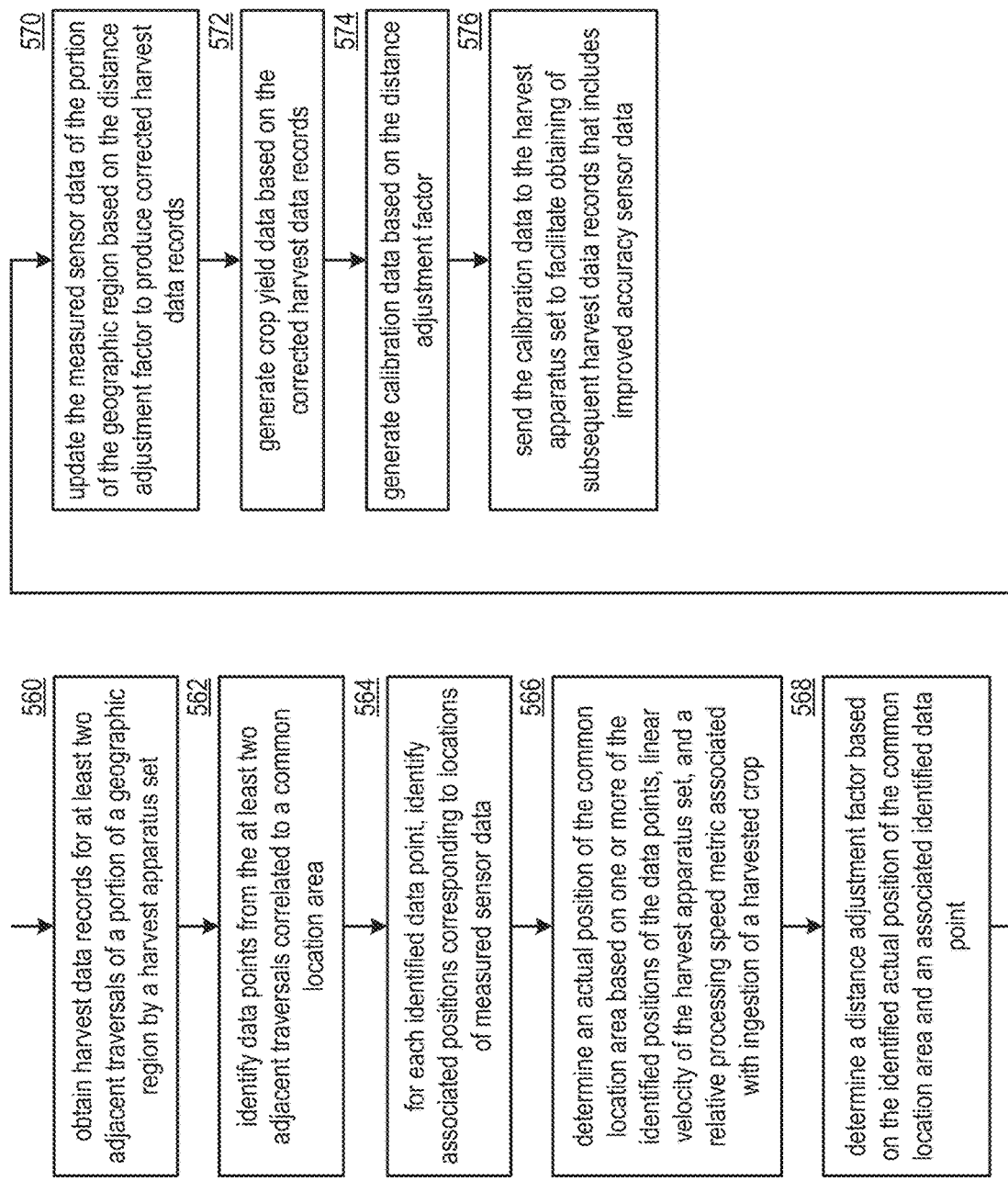
Figure 26A:
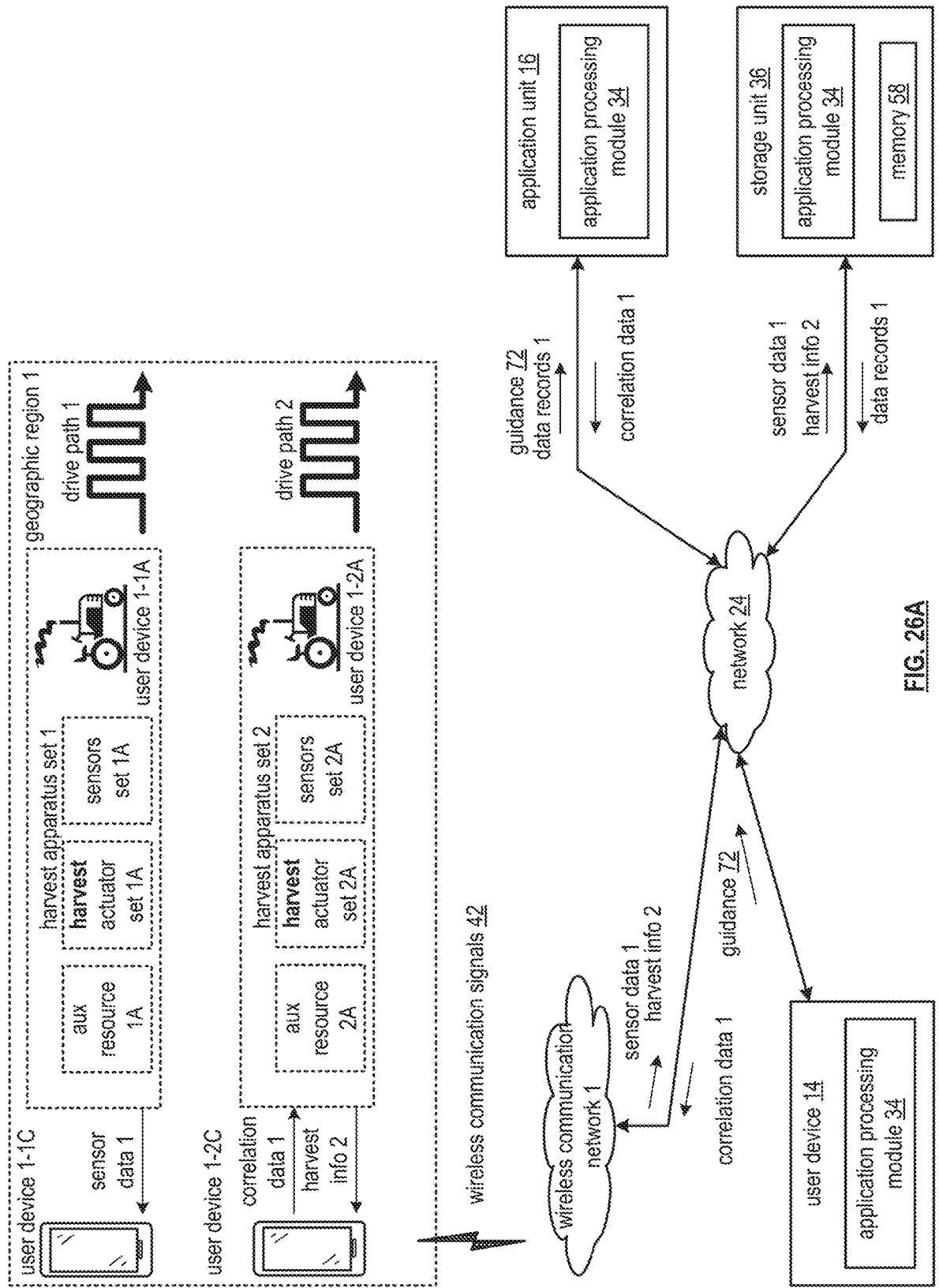
Figure 26B:
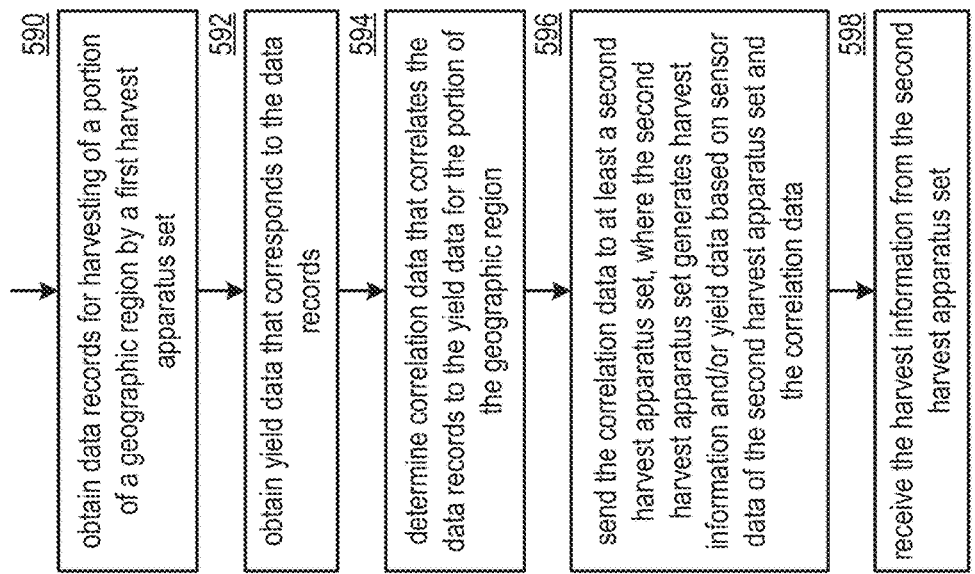
Figure 27A:
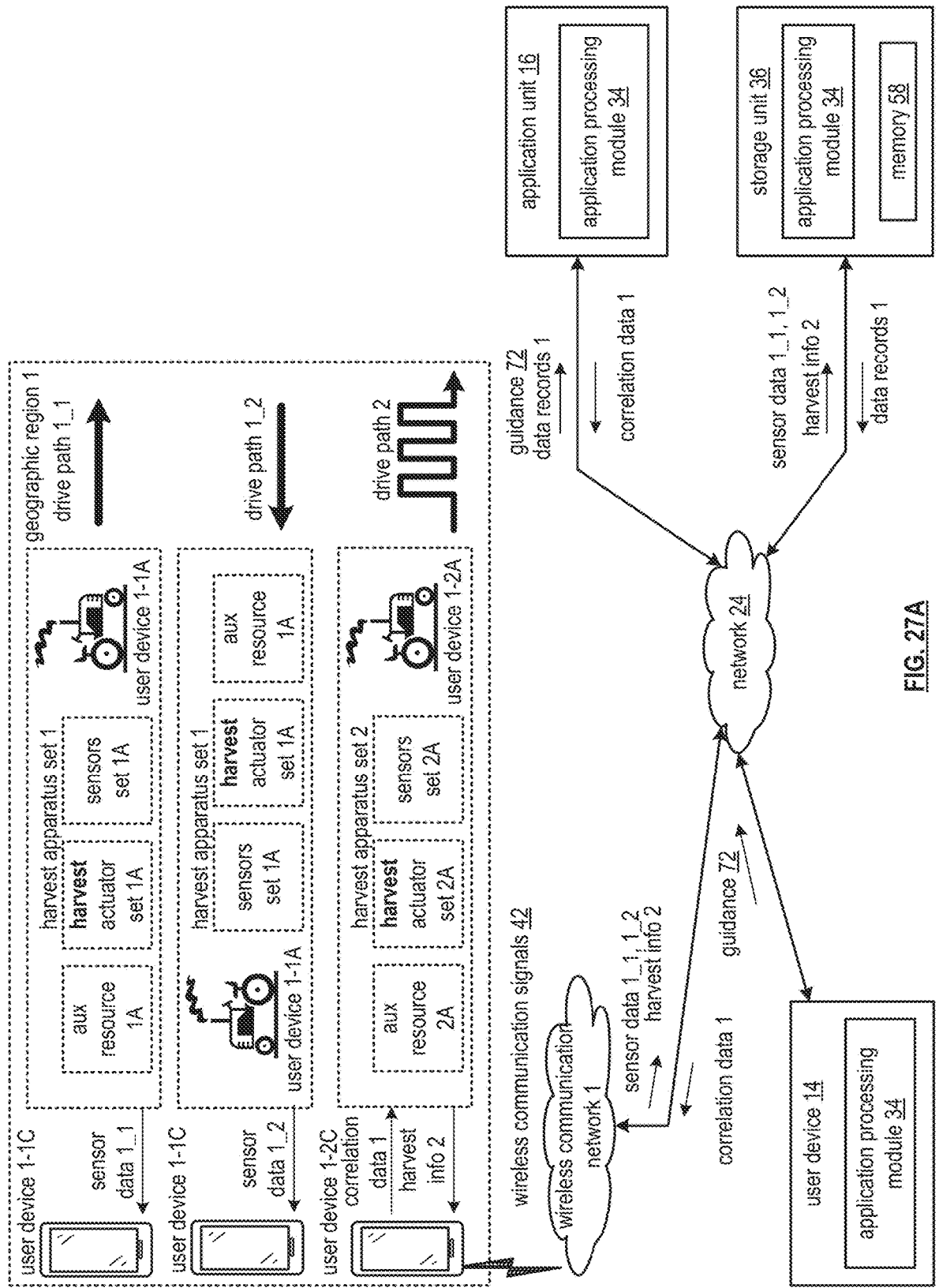
Figure 27B:
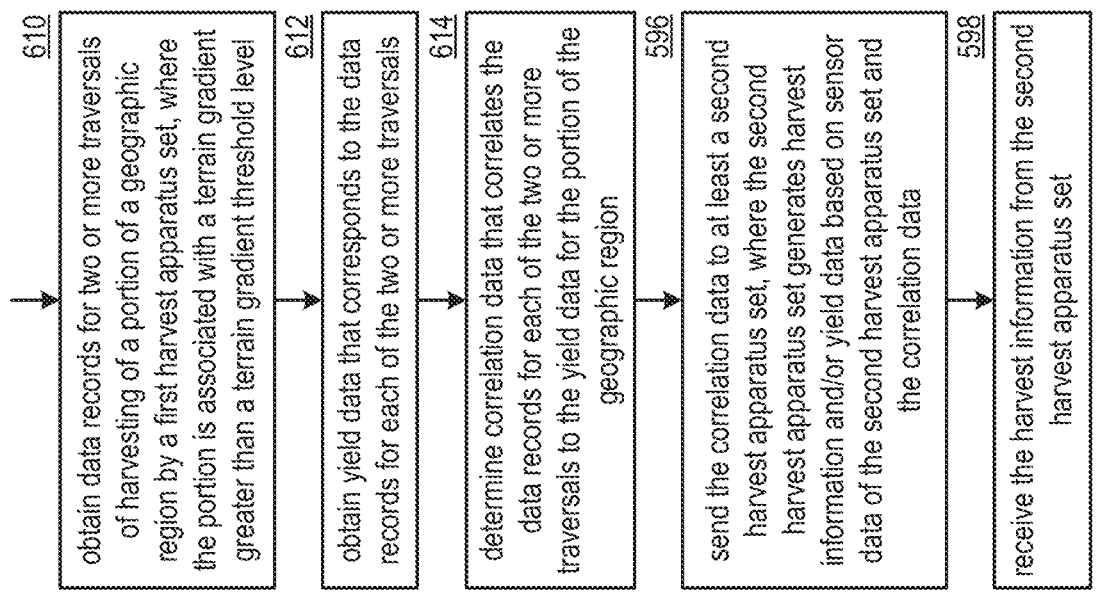
Figure 28A:
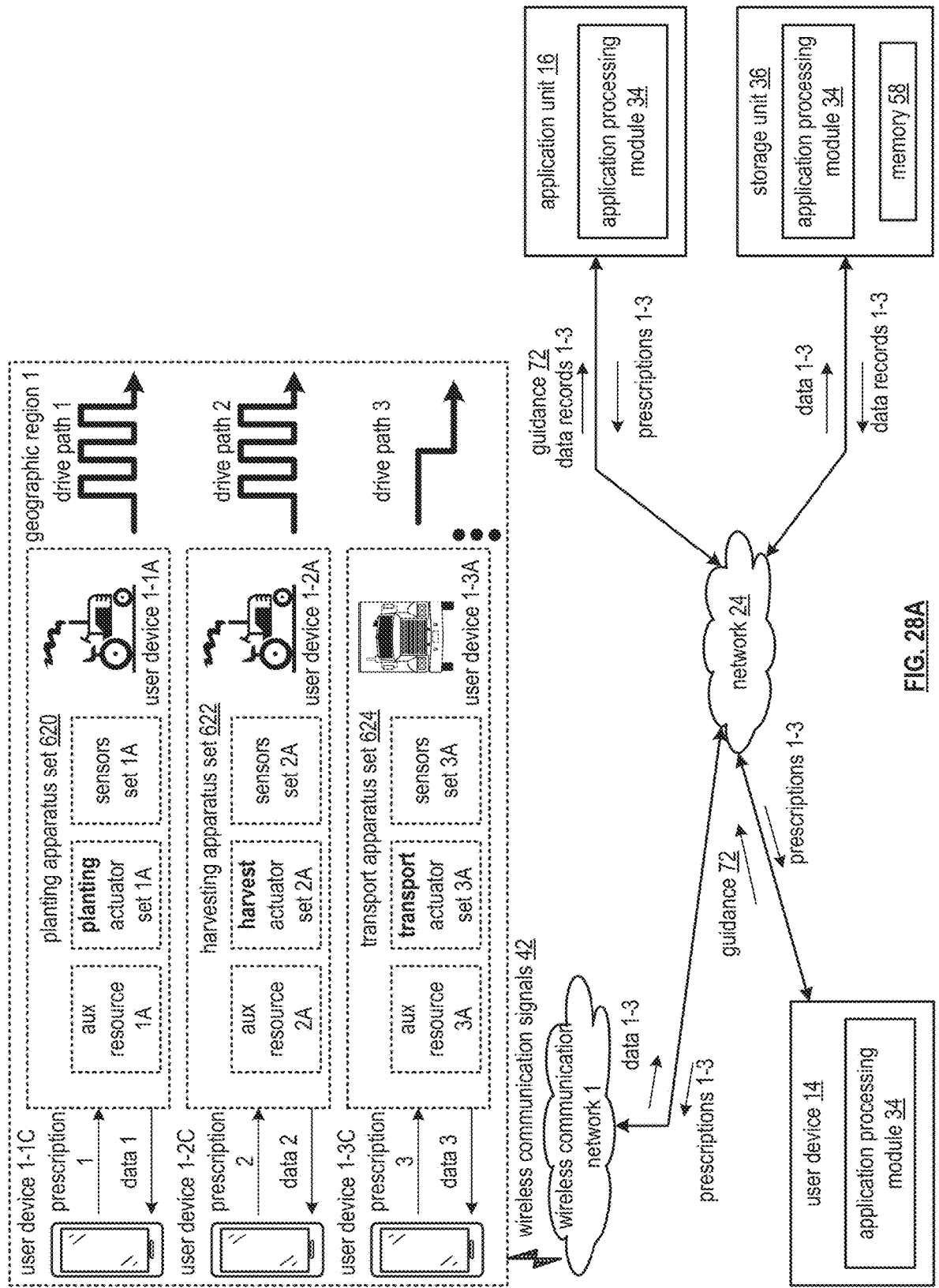
Figure 28B:
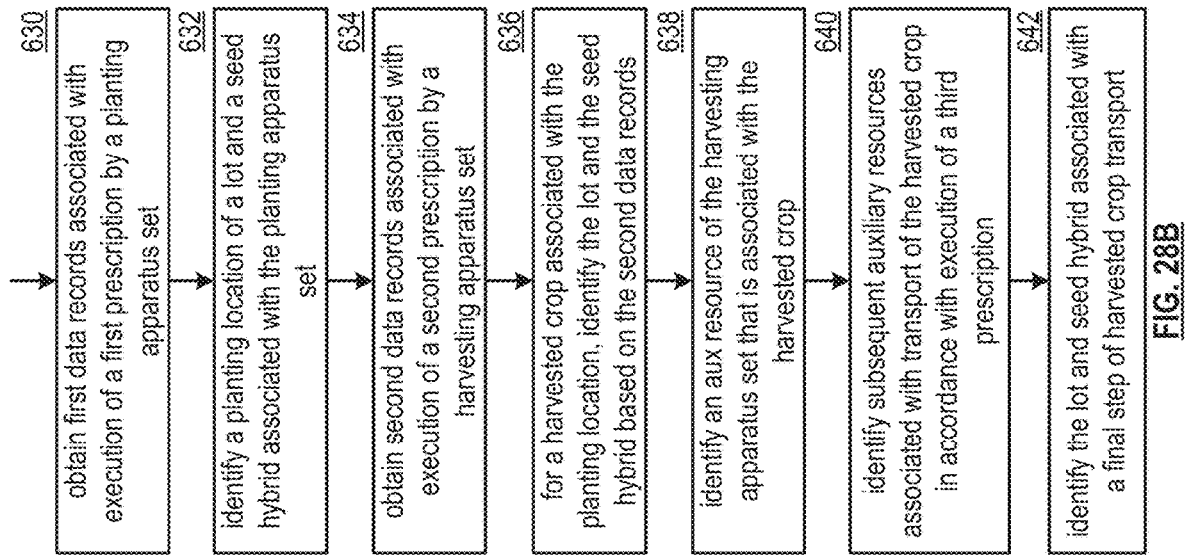

FIGS. 13B-C are diagrams of agricultural prescription resource mapping in accordance with the present invention;

FIG. 13D is a flowchart illustrating an example of updating resource assignments in accordance with the present invention;

FIG. 14A is a schematic block diagram of another embodiment of a computing system in accordance with the present invention;

FIG. 14B is a flowchart illustrating an example of identifying an unfavorable crop harvesting output level in accordance with the present invention;

FIG. 15A is a schematic block diagram of another embodiment of a computing system in accordance with the present invention;

FIG. 15B is a flowchart illustrating an example of identifying an unfavorable crop planting level in accordance with the present invention;

FIG. 16A is a schematic block diagram of another embodiment of a computing system in accordance with the present invention;

FIG. 16B is a flowchart illustrating an example of identifying an unfavorable applicant application level in accordance with the present invention;

FIG. 17A is a schematic block diagram of another embodiment of a computing system in accordance with the present invention;

FIG. 17B is a flowchart illustrating an example of generating a tillage agricultural prescription in accordance with the present invention;

FIG. 18A is a schematic block diagram of another embodiment of a computing system in accordance with the present invention;

FIG. 18B is a flowchart illustrating an example of generating a scouting agricultural prescription in accordance with the present invention;

FIG. 19A is a schematic block diagram of another embodiment of a computing system in accordance with the present invention;

FIG. 19B is a flowchart illustrating an example of generating an updated agricultural prescription based on forecasted weather conditions in accordance with the present invention;

FIG. 20A is a schematic block diagram of another embodiment of a user device in accordance with the present invention;

FIG. 20B is a schematic block diagram of an embodiment of an application processing module in accordance with the present invention;

FIG. 20C is a flowchart illustrating an example of opportunistic acquisition of location information enabling data collection to generate an agricultural prescription in accordance with the present invention;

FIG. 21A is a schematic block diagram of another embodiment of a computing system in accordance with the present invention;

FIG. 21B is a flowchart illustrating an example of generating a nitrogen application agricultural prescription in accordance with the present invention;

FIG. 22A is a schematic block diagram of another embodiment of a computing system in accordance with the present invention;

FIG. 22B is a flowchart illustrating an example of generating a harvest agricultural prescription in accordance with the present invention;

FIG. 23A is a schematic block diagram of another embodiment of a computing system in accordance with the present invention;

FIG. 23B is a flowchart illustrating an example of determining crop harvesting yield in accordance with the present invention;

FIG. 24A is a schematic block diagram of another embodiment of a computing system in accordance with the present invention;

FIG. 24B is a flowchart illustrating an example of optimizing crop harvesting yield in accordance with the present invention;

FIG. 25A is a schematic block diagram of another embodiment of a computing system in accordance with the present invention;

FIG. 25B is a diagram illustrating an example of correcting sensor data in accordance with the present invention;

FIG. 25C is a flowchart illustrating an example of improving accuracy of crop harvesting sensor data in accordance with the present invention;

FIG. 26A is a schematic block diagram of another embodiment of a computing system in accordance with the present invention;

FIG. 26B is a flowchart illustrating an example of improving accuracy of crop yield data in accordance with the present invention;

FIG. 27A is a schematic block diagram of another embodiment of a computing system in accordance with the present invention;

FIG. 27B is a flowchart illustrating another example of improving accuracy of crop yield data in accordance with the present invention;

FIG. 28A is a schematic block diagram of another embodiment of a computing system in accordance with the present invention; and FIG. 28B is a flowchart illustrating an example of chain of custody crop tracking in accordance with the present invention.

DETAILED DESCRIPTION OF THE INVENTION

Figure 1:
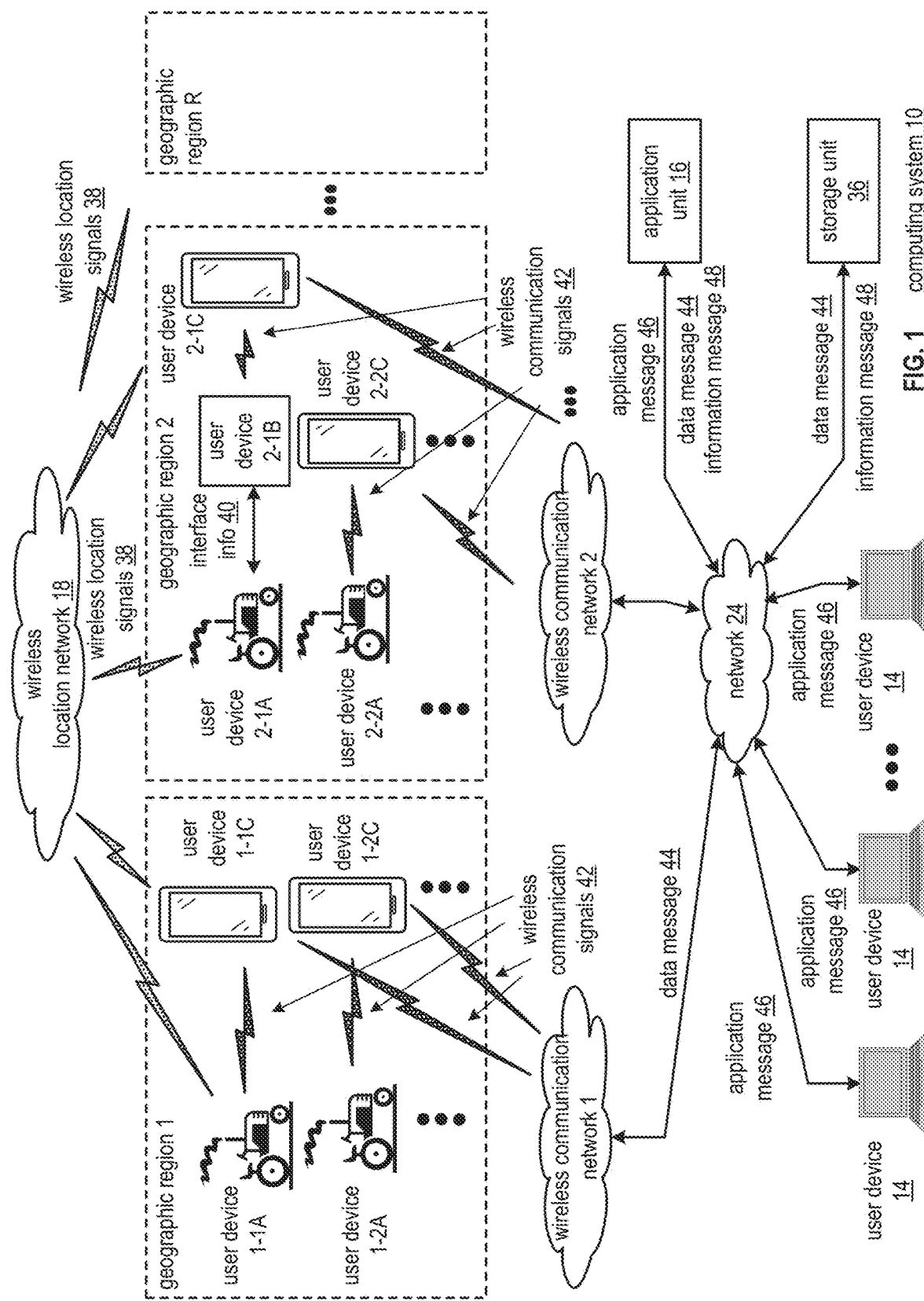
FIG. 1 is a schematic block diagram of an embodiment of a computing system in accordance with the present invention.

FIG. 1 is a schematic block diagram of an embodiment of a distributed computing system 10 that includes at least one wireless location network 18, one or more wireless communication networks 1, 2, etc., a network 24, an application unit 16, a storage unit 36, a plurality of user devices 14, and a plurality of user devices associated with geographic regions 1-R (e.g., user devices 1-1A, 1-1C, 1-2A, 1-2C, etc. associated with geographic region 1, user devices 2-1A, 2-1B, 2-1C, 2-2A, 2-2C, etc. associated with geographic region 2). Hereafter, the user devices associated with the geographic regions and the user devices 14 may be referred to interchangeably as the user devices. The components of the computing system 10 are coupled via the network 24, which may include one or more of wireless and/or wireline communications systems, one or more private communications systems, a public internet system, one or more local area networks (LAN), and one or more wide area networks (WAN).

Each wireless communications network includes one or more of a public wireless communication system and a private wireless communication system and may operate in accordance with one or more wireless industry standards including universal mobile telecommunications system (UMTS), global system for mobile communications (GSM), long term evolution (LTE), wideband code division multiplexing (WCDMA), IEEE 802.11, IEEE 802.16. Each wireless communication network 1-R sends wireless communications signals 42 to the user devices and receives wireless communications signals 42 from the user devices to communicate data messages 44 and/or application messages 46. The user devices associated with the geographic regions may send and receive the wireless communications signals 42 directly between two or more user devices. Alternatively, or in addition to, the two user devices may communicate interface information 40 directly via a wireline interface between the two user devices. For instance, user device 2-1A communicates the interface information 40 with the user device 2-1B when the user device 2-1A and the user device 2-1B are operably coupled with the wireline interface.

The wireless location network 18 includes one or more of a public wireless location system (e.g., global positioning satellite (GPS), a cellular network) and a private wireless location system (e.g., wireless beacon, a wireless local area network (WLAN)). The wireless location network 18 sends wireless location signals 38 to at least some of the plurality of user devices to enable determination of location information.

The application unit 16 and storage unit 36 include a processing module (e.g., an application processing module) and memory to support execution of one or more applications (e.g., an agricultural lifecycle optimization application) and storage of information. Each user device may be a portable computing device (e.g., embedded farming equipment electronics, a farming equipment interface dongle, embedded vehicular electronics, a smart phone, a tablet computer, a laptop, a handheld computer, and/or any other portable device that includes a computing unit) and/or a fixed computing device (e.g., a desktop computer, a cable television set-top box, an application server, an internet television user interface and/or any other fixed device that includes a computing unit). Such a portable or fixed computing device includes one or more of a computing unit (e.g., providing processing module functionality), one or more wireless modems, sensors, and one or more user interfaces. The user device is discussed in greater detail with reference to FIG. 4.

Farming equipment (e.g., farm equipment) includes any machinery, apparatus, and/or tool associated with agriculture. For example, the farming equipment may include one or more of a tractor, a seed planter, a fertilizer dispenser (e.g., fertilizing equipment), a soil tiller, watering equipment, a combine, and a harvesting mechanism (e.g., harvesting equipment). As an example of user device implementation, user devices 1-1A, 1-2A, 2-1A, and 2-2A includes embedded farming equipment electronics associated with farm tractors. As another example, user devices 1-1C, 2-1C, 1-2C, and 2-2C include smart phones. As yet another specific example, user device 2-1B includes a tractor interface dongle.

The user device 14, the application unit 16, and the storage unit 36, may be implemented in a variety of ways. For example, a first user device includes a computing unit, which includes the application unit 16. As another example, a second user device includes another computing unit, which includes the storage unit 36. As yet another example, a third user device includes yet another computing unit that includes the application unit 16 and the storage unit 36. As a still further example, a still further computing unit includes the application unit 16 and the storage unit 36.

In general and with respect to optimization of the agricultural lifecycle, the computing system 10 supports at least five example functions: capturing data, analyzing data, producing an analysis summary, producing an agricultural prescription, and utilizing the agricultural prescription in the execution of the steps associated with the agricultural lifecycle. In accordance with these functions, agricultural prescriptions can be created that are relevant in relationship to likely planting lifecycles and may be utilized to enhance the effectiveness of the overall agricultural lifecycle.

The first example function includes the computing system 10 capturing data. In this example, the user device 1-1A receives wireless location signals 38 and determines location information (e.g., location coordinates, a timestamp, identification of geographic region 1) therefrom. Having produced the location information, the user device 1-1A captures data associated with one or more steps of the agricultural lifecycle within the geographic region 1 and generates wireless communication signals 42 based on one or more of the data and the location information. As a specific example, the user device 1-1A traverses at least a portion of the geographic region 1 and captures sensor data as the captured data when the embedded control electronics for the farm tractor includes the user device 1-1A. Alternatively, the user device 1-1A stores at least a portion of the captured data in a local memory. The wireless communication signals 42 from user device 1-1A are received by a user device 1-1C. The user device 1-1C extracts the data from the received wireless communication signals 42 from the user device 1-1A and subsequently generates wireless communication signals 42 for transmission to the wireless communication network 1, where the wireless communication signals 42 are based on the data.

The wireless communication network 1 receives the wireless communication signals 42 from the user device 1-1C and decodes the wireless communication signals 42 to reproduce the data. Having reproduced the data, the wireless communication network 1 sends a data message 44, via the network 24, to the storage unit 36, where the data message 44 includes the reproduced data. Alternatively, or in addition to, the user device 1-2A functions in a similar fashion as the user device 1-1A to capture further data within the geographic region 1, and to send, via a user device 1-2C, the wireless communication network 1, and the network, the further captured data to the storage unit 36. Having received one or more of the data message 44 from the user device 1-1A and another data message from the user device 1-2A, the storage unit 36 extracts the reproduced data from the data message 44 of the user device 1-1A and/or extracts the further captured data from the other data message 44 from the user device 1-2A to produce data from the geographic region 1.

Having obtained the data from geographic region 1, the storage unit 36 generates data records based on the data from geographic region 1. Having generated the data records, the storage unit 36 facilitates storage of the data records in at least one of a local memory associated with the storage unit, the application unit, one or more user devices, another storage unit, and in a storage system. As a specific example, the storage unit 36 stores the data records in the local memory of the storage unit and sends, via the network 24, an information message 48 to a user device 14 associated with the geographic region 1, where the information message 48 includes the data record.

In another example of operation of the capturing of the data, a user device 2-1A captures data associated with the geographic region 2 and sends interface information 40 to the user device 2-1B, where the interface information 40 includes the captured data associated with the geographic region 2 and location information associated with the user device 2-1A. Alternatively, or in addition to, the user device 2-1A stores at least a portion of the interface information 40 in a local memory of the user device 2-1A. The user device 2-1B sends, using the wireless communication signals 42, the captured data to the user device 2-1C. Alternatively, or in addition to, the user device 2-1B stores at least the portion of the interface information 40 in a local memory of the user device 2-1B. Alternatively, the user device 2-1B sends, using the wireless communication signals 42, the interface information 40 to the communication network 2. The user device 2-1C sends, using the wireless communication signals 42, the interface information 40 that includes the captured data to the wireless communication network 2 when the user device 2-1B sends the captured data to the user device 2-1C. The wireless communication network 2 sends the captured data, via the network 24, to the storage unit 36. Alternatively, the user device 2-1C sends, using the wireless communication signals 42, the captured data to the wireless communication network 1 where the wireless communication network 1 sends the captured data, via the network 24, to the storage unit 36. In a similar fashion, a user device 2-2A captures further data within the geographic region 2, and sends the captured further data, via one or more of the user device 2-2C, the wireless communication network 2, and the network 24, to the storage unit 36.

The storage unit 36 receives data and/or captured further data from one or more of the user devices 2-1A and 2-2A to produce data from the geographic region 2. Having obtained the data from geographic region 2, the storage unit 36 generates data records based on the data from geographic region 2 and facilitates storage of the data records from the geographic region 2 in at least one of the local memory associated with the storage unit, the application unit, the one or more user devices, another storage unit, and in the storage system. As a specific example, the storage unit 36 stores the data records associated with the geographic region 2 in the local memory of the storage unit and sends, via the network 24, another information message 48 to another user device 14 associated with the geographic region 2, where the other information message 48 includes the data record associated with the geographic region 2.

The second example function includes the computing system 10 analyzing the data. In an example of operation, the user device 14 associated with geographic region 1 issues an application message 46, via the network 24, to the application unit 16, where the application message 46 requests an analysis of the agricultural lifecycle for the geographic region 1. The application unit 16 obtains the information message 48 from the storage unit 36, where the information message 48 includes one or more of data records associated with the geographic region 1 and historical summaries associated with the geographic region 1. Such historical summaries include one or more of a result of a previous analysis, a summary of a previous analysis, and a summary of a previous agricultural prescription. Alternatively, or in addition to, the application unit 16 obtains another information message 48 from the storage unit 36, where the other information message 48 includes one or more data records associated with one or more other geographic regions. As a specific example, the application unit 16 obtains data records associated with geographic regions that are immediately proximally adjacent to the geographic region 1.

Having obtained the one or more of the data records and the historical summaries, the application unit 16 performs one or more analysis functions on the data records and/or the historical summaries to produce an analysis. The analysis functions includes one or more of a filtering function, correlation function, a comparing function, a transformation function, a mathematical function, a logical function, an identification function, a listing function, a searching function, an estimation function, a probability density generating function, a trend analysis function, and any other function that may be utilized in assisting in analyzing the data records and/or the historical summaries to provide insights to improving the effectiveness of the steps of the agricultural lifecycle. As a specific example, the application unit 16 compares corn crop yield rates for the geographic region 1 and the geographic region 2 for a similar set of conditions (e.g., soil type, weather) and for differing approaches to the steps of the agricultural lifecycle to produce the analysis. Alternatively, or in addition to, the application unit 16 facilitates storage of the analysis in the storage unit 36 (e.g., to facilitate subsequent retrieval as history summaries).

The third example function includes the computing system 10 producing the analysis summary. In an example of operation, having produced the analysis, the application unit 16 may obtain one or more further information messages 48 from the storage unit 36, where the one or more further information messages 48 includes one or more previous analysis summaries. Having obtained the further information messages 48, the application unit 16 summarizes the analysis to produce the analysis summary based on one or more of the analysis, the application message, and the previous analysis summaries. As a specific example, the application unit summarizes the analysis to produce a corn crop yield analysis summary for a previous year using a similar format in accordance with the previous analysis summaries, when the application message 46 from the user device 14 associated with the geographic region 1 requests a corn crop yield analysis for the previous year. Alternatively, or in addition to, the application unit 16 facilitates storage of the analysis summary in the storage unit 36 (e.g., to facilitate subsequent retrieval as history summaries).

The fourth example function includes the computing system 10 producing the agricultural prescription. In an example of operation, having produced the analysis summary, the application unit 16 may obtain still further information messages 48 from the storage unit 36, where the still further information messages 48 includes one or more previous agricultural prescriptions. Having obtained the further information messages 48, the application unit 16 generates the agricultural prescription based on one or more of the analysis summary, the application message 46, and the previous agricultural prescriptions. The generating may include further analysis. As a specific example, the application unit 16 analyzes a previous agricultural prescription for the previous year, and the summary analysis for the previous year indicating results of utilizing the previous agricultural prescription, to produce a corn crop optimization prescription for a current year. For instance, the corn crop optimization prescription indicates which hybrid corn type to plant, when to plant, how to plant (e.g., including a density level of planting seeds), and a recommended procedure for harvesting. Having produced the agricultural prescription, the application unit 16 may send, via the network 24, yet another application message 46 to the user device 14 associated with the geographic region 1, where the yet another application message 46 includes the agricultural prescription. Alternatively, or in addition to, the application unit 16 facilitates storage of the agricultural prescription in the storage unit 36 (e.g., to facilitate subsequent retrieval as history summaries).

The fifth example function includes the computing system 10 utilizing the agricultural prescription. In an example of operation, the application unit 16 generates another data message 44, where the other data message 44 includes the agricultural prescription. The agricultural prescription may be represented in a variety of formats including one or more of hypertext markup language, text, graphics, typographic maps, and a machine-readable format to facilitate some level of automation. For instance, the agricultural prescription includes the recommended steps of the agricultural lifecycle in a machine-readable format that is compatible with a particular set of farming machinery including one or more of farm tractors, soil maintenance machinery, fertilizer application machinery, planting machinery (e.g., a planter), and crop harvesting machinery (e.g., a combine). Having generated the other data message 44, the application unit 16 sends, via the network 24 and the wireless communication network 1 (e.g., using the wireless communication signals), the other data message 44 to the user device 1-1C. Having received the other data message 44, the user device 1-1C distributes the agricultural prescription to one or more of a user interface associated with the user device 1-1C (e.g., to display to an operator of farm machinery) and to user device 1-1A. Having received the agricultural prescription, the user device 1-1A extracts control information from the agricultural prescription. Having obtained the control information, the user device 1-1A outputs the control information to an actuator set associated with one or more varieties of farming machinery to facilitate the automation of the one or more steps of the agricultural lifecycle. The outputting of the control information to the actuator set is discussed in greater detail with reference to FIG. 11.

FIG. 2 is a diagram illustrating an embodiment of a plurality of geographic regions, where one or more of the geographic regions include the geographic regions 1-R of FIG. 1. The plurality of geographic regions may include any number of geographic regions spanning relatively small areas (e.g., a few acres per region), relatively large areas (e.g., tens of thousands of acres or more per region), or any size in between. Two or more geographic regions may be associated with common characteristics. For example, each geographic region may include a common geographic region size or a unique geographic region size. Two or more geographic regions may overlap such that a common portion is included in each of the two or more geographic regions. Each geographic region may include two or more sub-geographic regions.

Each geographic region may be associated with region characteristics. The region characteristics include one or more of a natural water supply level, a man-made irrigation water supply level, an average number of sun-days, an average sun intensity level, a soil type, a soil nutrient level, a previous utilization history, a crop yield rate, an insect affect level, an average altitude level, and average temperature level, and any other metric associated with characteristics that may affect the efficiency of the agricultural lifecycle. Two or more regions may share common and/or similar region characteristics. For example, adjacent geographic regions have a higher probability of sharing more common region characteristics than non-adjacent geographic regions. As another example, a series of geographic regions that include a common waterway (e.g., a lake, a river) may share more common region characteristics.

Each geographic region may be associated with varying groups of user devices utilized in the primary steps of the computing system 10 of FIG. 1. For example, a common first user device is associated with operation within geographic regions 1 and 2. As another example, a unique second user device is associated with operation within geographic region 2 and a unique third user device is associated with operation within geographic region 3.

Figure 3:
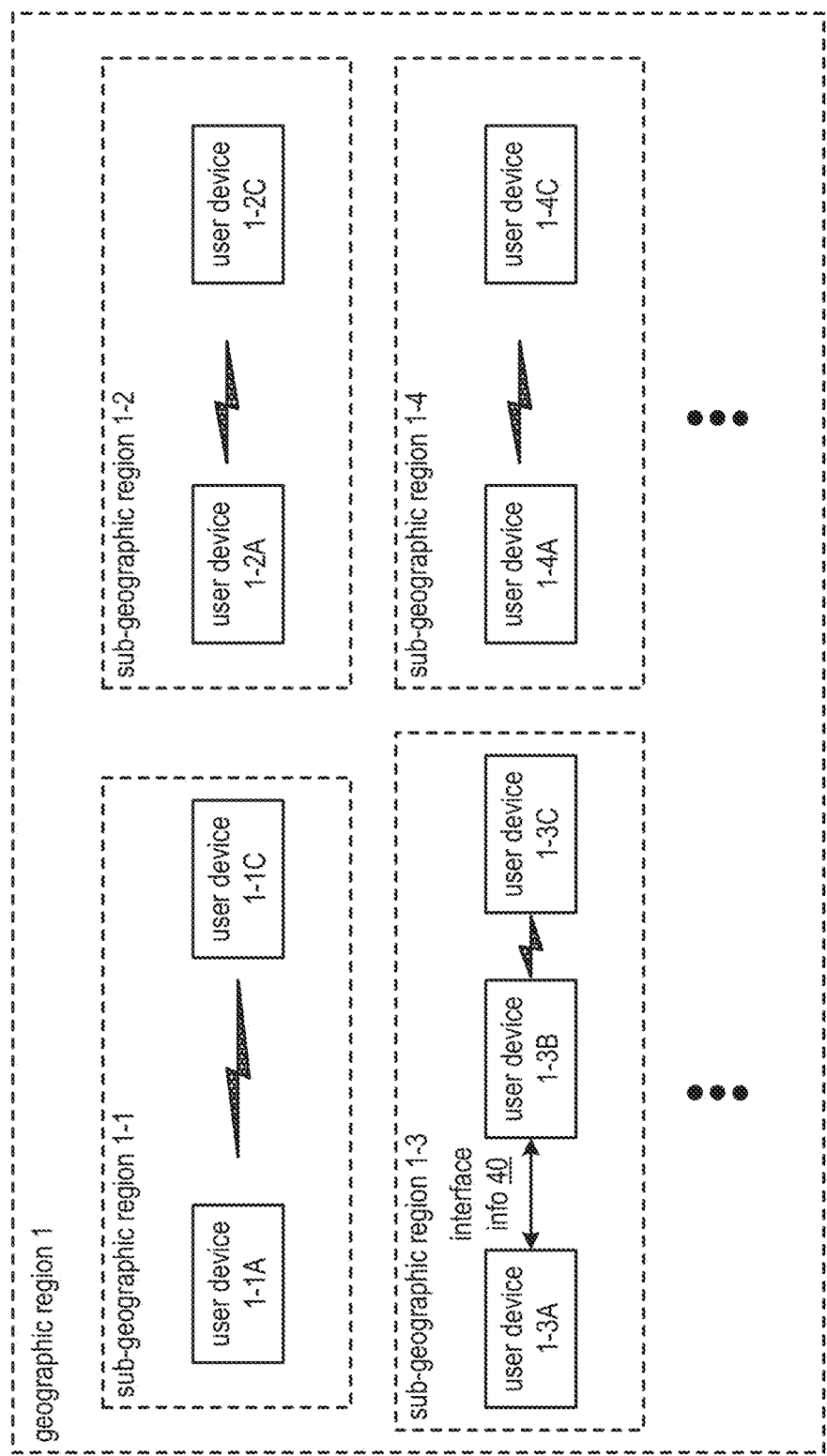
FIG. 3 is a diagram illustrating an embodiment of a plurality of sub-geographic regions in accordance with the present invention.

FIG. 3 is a diagram illustrating an embodiment of a geographic region divided into any number of sub-geographic regions. Hereafter, a sub-geographic region may be referred to interchangeably as a geographic sub-region. For example, geographic region 1 includes geographic sub-regions 1-1, 1-2, 1-3, 1-4, etc.

Each geographic sub-region may include any number of user devices that operate within the sub-region. For example, the geographic sub-region 1-1 includes a user device 1-1A and a user device 1-1C; the geographic sub-region 1-2 includes a user device 1-2A and a user device 1-2C; the geographic sub-region 1-3 includes a user device 1-3A, a user device 1-3B operably coupled with the user device 1-3A to exchange interface information 40, and a user device 1-3C; and the geographic sub-region 1-4 includes a user device 1-4A and a user device 1-4C. As another example, each geographic sub-region may include a common group of user devices such that the common group of user devices traverses each geographic sub-region of the geographic region.

Figure 4:
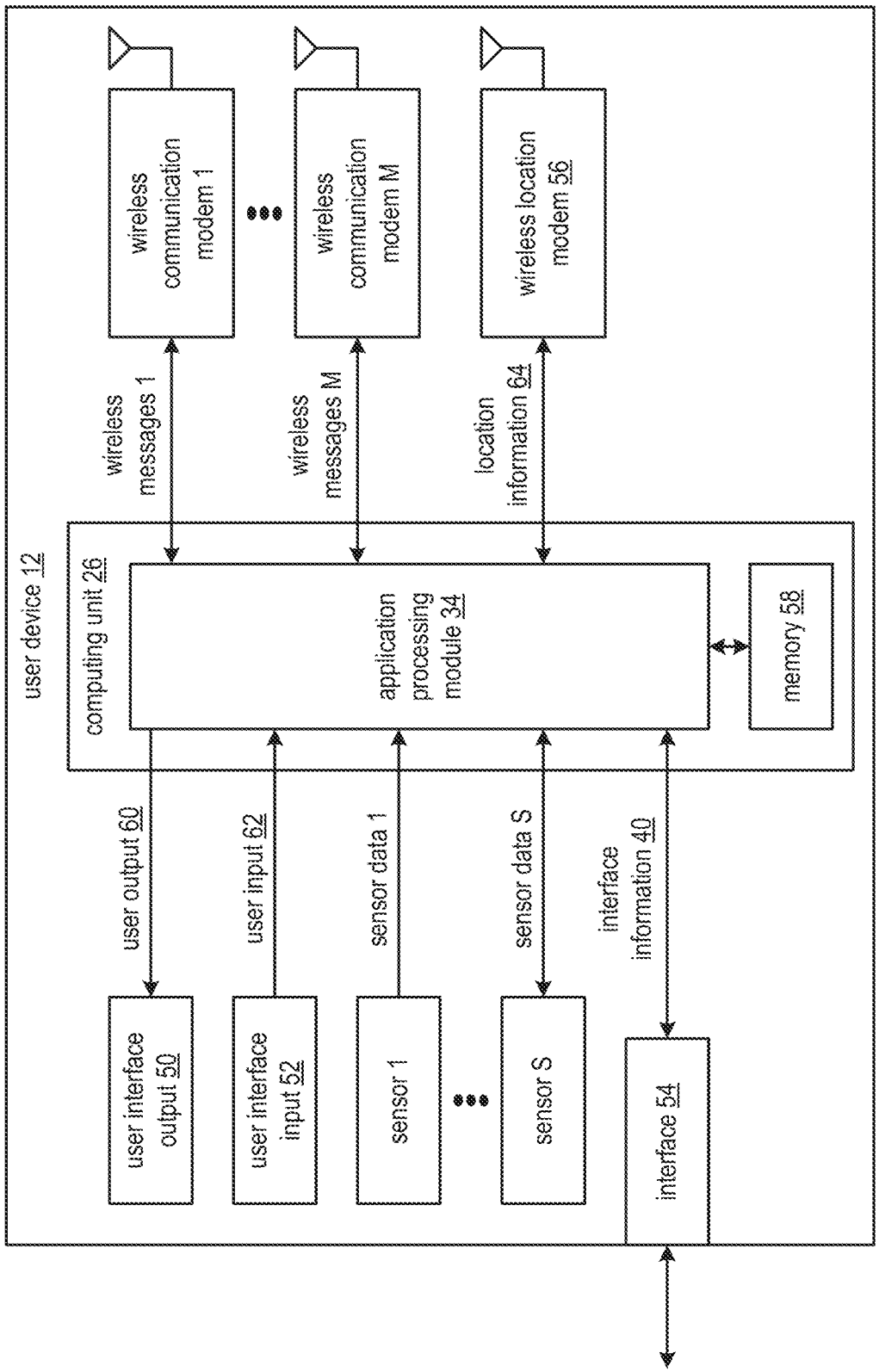
FIG. 4 is a schematic block diagram of an embodiment of a user device in accordance with the present invention.

FIG. 4 is a schematic block diagram of an embodiment of a user device (e.g., 12, 14 or any other user device). The user device includes a user interface output 50, a user interface input 52, one or more sensors 1-S, an interface 54, a computing unit 26, one or more wireless communications modems 1-M, and at least one wireless location modem 56. The user interface output 50 may include a single interface output device or a plurality of interface output devices to present user output 60. The interface output device may include one or more of a display, a touch screen, a speaker, an earpiece, a motor, an indicator light, a light emitting diode (LED), a transducer, and a digital indicator. For instance, the interface output device includes a color touch screen display capable of rendering static images and/or full-motion video.

The user interface input 52 may include a single interface input device or a plurality of interface input devices to capture user input 62. The interface input device includes one or more of a touch screen sensor array, a keyboard, a microphone, a fingerprint reader, a trackball, a mouse sensor, an image sensor, a pushbutton, and a selector switch. For instance, the interface input device includes a touch screen sensor array associated with the color touch screen display.

Each sensor includes capabilities for sensing one or more of a magnetic field (e.g., a compass), motion (e.g., an accelerometer), temperature, pressure, altitude, humidity, moisture, an image, visible light, infrared light, an electromagnetic field, ultrasonic sound, weight, density, a chemical type, fluid flow volume, execution of a step of the agricultural lifecycle, a stream of images (e.g., capture video), biometrics, proximity, capacitance, gases, radiation, pathogens, light levels, bio hazards, DNA, wind speed, wind direction, and characteristics of an object to support object detection and/or object identification. The sensors 1-S output sensor data 1-S to the computing unit 26. For example, a first sensor outputs sensor data 1 that includes a video stream when the first sensor includes an image capture device. As another example, a second sensor outputs sensor data 2 that includes a moisture level indicator when the second sensor includes a moisture detector. As yet another example, a third sensor outputs sensor data 3 that includes tractor pitch, tractor yaw, tractor roll, tractor velocity, tractor acceleration, tractor position, tractor inclination, tractor tilt, tractor orientation tractor impact (e.g. shock) when the third sensor includes the accelerometer and the embedded control electronics of a farming tractor includes the user device.

The interface 54 provides an external wireline interface to the computing unit such that interface information 40 may be communicated with one or more other devices operably coupled to the interface 54. Each device includes one or more other user devices. For example, another user device is associated with embedded sensor and control electronics of a farming planting mechanism. As another example, the other user device is associated with embedded control electronics of a farming fertilizing mechanism. As yet another example, the other user device is associated with embedded control electronics of a farming harvesting mechanism. As a still further example, the other user device is associated with the embedded control electronics of the farming tractor.

The interface 54 may operate in accordance with one or more industry interface protocol standards such as on-board diagnostics (OBD), controller area network (CAN), or any other industry interface protocol standard. For instance, the interface operably couples to a CAN interface of a farming tractor such that the interface information 40 may be exchanged between the computing unit 26 and the embedded control electronics of the farming tractor. The interface information 40 includes one or more of further sensor data, an agricultural prescription, and control information (e.g., one or more steps of an agricultural lifecycle). As a specific example, the interface 54 couples the computing unit 26 to the farming fertilizing mechanism such that the computing unit 26 receives sensor data from a sensor array associated with the farming fertilizing mechanism that monitors fertilization steps of the agricultural lifecycle.

Each wireless communication modem 1-M may include a single wireless transceiver or a plurality of wireless transceivers. Alternatively, or in addition to, each communication modem may include one or more wireless transmitters. The wireless transceiver and/or transmitter encodes wireless messages to produce wireless communication signals and the wireless transceiver further receives other wireless communication signals for decoding into corresponding wireless messages. The wireless transceiver and/or transmitter may operate in accordance with one or more wireless industry standards including universal mobile telecommunications system (UMTS), global system for mobile communications (GSM), long term evolution (LTE), wideband code division multiplexing (WCDMA), IEEE 802.11, IEEE 802.16, and Bluetooth. For example, the wireless communication modem 1 encodes the wireless messages 1 for transmission as Bluetooth wireless communication signals to a local user device and the wireless communication modem 2 encodes the wireless messages 2 for transmission as LTE wireless communication signals to a wireless communication network.

The wireless location modem 56 may include one or more of a single wireless location receiver, a single wireless location transceiver, a plurality of wireless location receivers, and a plurality of wireless location transceivers. The wireless location receiver and wireless location transceiver may operate in accordance with one or more wireless location technologies including GPS, WiFi, angle of arrival, time difference of arrival, signal strength, and beaconing to produce location information 64.

The computing unit 26 includes an application processing module 34, a memory 58, and one or more internal interfaces to one or more of the user interface output 50, the user interface input 52, the sensors 1-S, the interface 54, the wireless communication modems 1-M, and the wireless location modem 56. The memory 58 provides a non-transitory computer readable storage medium that stores operational instructions that are executed by the processing module 34.

The memory 58 may include a single memory device or a plurality of memory devices. Each memory device is associated with a memory type including one or more of a read-only memory, random access memory, volatile memory, non-volatile memory, cache memory, and/or any device that stores digital information. Each memory device may be implemented utilizing one or more technologies including static random access memory (SRAM), dynamic random access memory (DRAM), NAND flash memory, magnetic memory (e.g., a hard disk), and optical memory (e.g., an optical disc) that stores digital information. The memory device may be removable (e.g., a universal serial bus flash drive) to facilitate transfer of data between the computing unit 26 and other entities that may operably coupled with the removable memory device.

Figure 5:
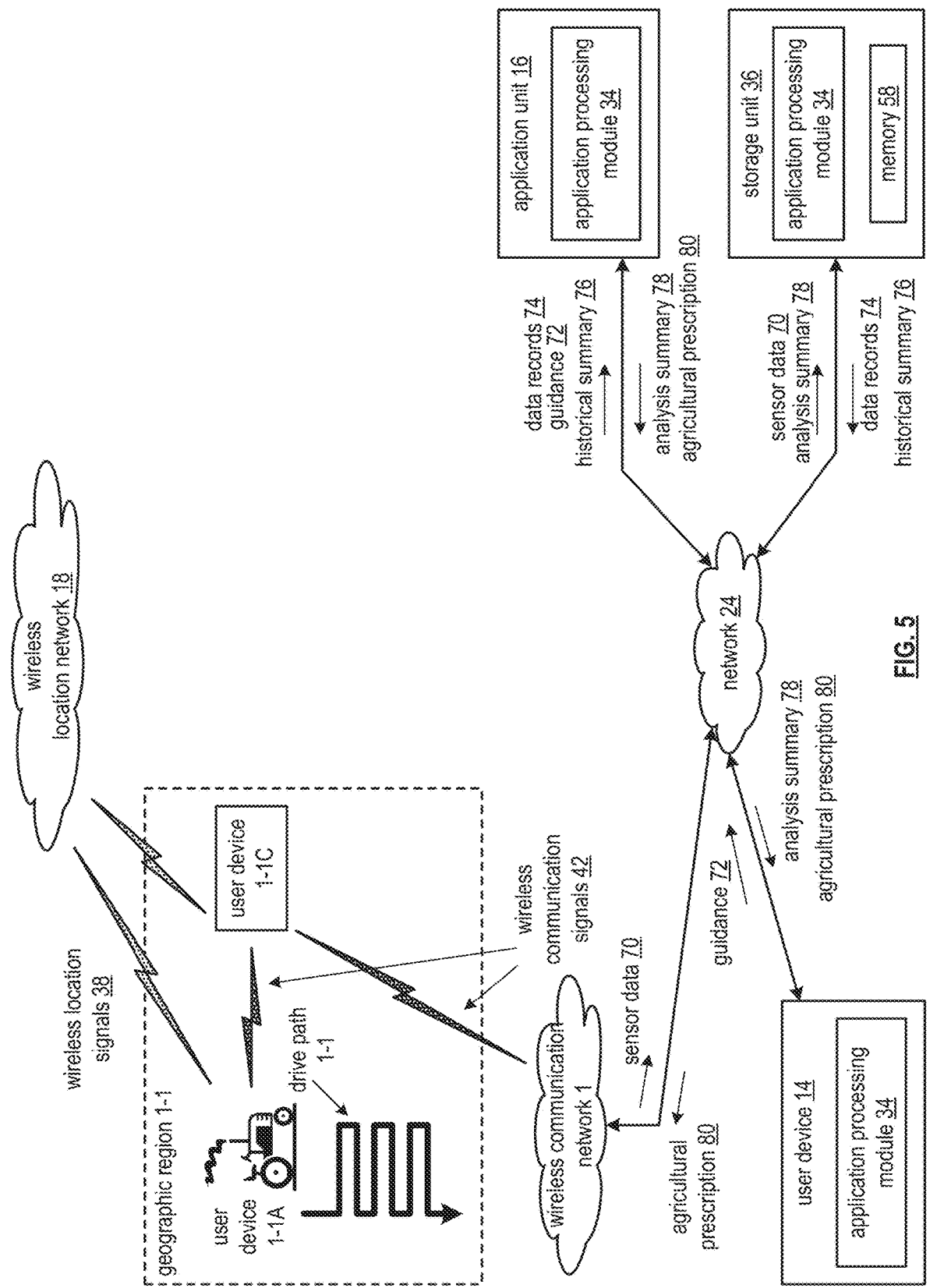
FIG. 5 is a schematic block diagram of another embodiment of a computing system in accordance with the present invention.

FIG. 5 is a schematic block diagram of another embodiment of a computing system that includes the wireless location network 18, the wireless communication network 1, the network 24, the application unit 16, the storage unit 36, and the user device 14 that is associated with geographic region 1-1. Within the geographic region 1-1 are the user device 1-1A (e.g., embedded control electronics of a farming tractor) and the user device 1-1C (e.g., a smart phone utilized by an operator of the farming tractor).

In an example of operation of performing one of the five example functions, the user device 1-1A determines location information based on receiving wireless location signals 38 from the wireless location network 18 and captures sensor data (e.g., farming tractor accelerometer data, soil moisture levels, soil chemical content, etc.) along a drive path 1-1 for at least a portion of the geographic region 1-1. The drive path 1-1 includes a geographic path of the user device 1-1A when the user device 1-1A operates within the geographic region 1. The drive path may include two or more sub-drive paths. For example, a first sub-drive path traverses the geographic region 1-1 from west to east and a second sub-drive path traverses the geographic region 1-1 from east to west. The user device 1-1A may monitor the drive path (e.g., passively monitoring along a path taken by the farming tractor) or may provide the drive path (e.g., where an agricultural prescription includes control information to invoke operation of the farming tractor along the drive path). The drive path 1-1 may be obtained by the user device 1-1A in a variety of ways including one or more of determining a specific drive path in accordance with the agricultural prescription 80, utilizing a predetermined drive path (e.g., the drive path for geographic region 1-1 from a list), generating a random drive path, utilizing a previous drive path associated with geographic region 1-1 (e.g., obtaining a historical summary), and receiving the agricultural prescription 80 that includes control information associated with the drive path. As a specific example, the user device 1-1A utilizes the drive path 1-1 from the agricultural prescription 80 while an associated farming tractor and tilling machinery is tilling the soil of at least a portion of the geographic region 1-1.

Having captured the sensor data, the user device 1-1A sends, using, for example, Bluetooth wireless communication signals, the captured sensor data to the user device 1-1C. The user device 1-1C sends, utilizing, for example, long-term evolution (LTE) wireless communication signals, the captured sensor data 70 via the wireless communication network 1 and the network 24 to the storage unit 36. The application processing module 34 of the storage unit 36 processes the captured sensor data 70 to produce data records 74 for storage in the memory of the storage unit 36. Alternatively, a removable memory of the user device 1-1A is utilized to temporarily store the captured sensor data 70. The removable memory is operably coupled to the storage unit 36 to facilitate transfer of the captured sensor data 70 to the application processing module 34 of the storage unit 36. For example, the removable memory device is directly interfaced to the storage unit 36. As another example, the removal memory device is interfaced to the user device 14 associated with the geographic region 1-1 and the user device 14 facilitates sending, via the network 24, the captured sensor data 70 to the storage unit 36.

The application processing module 34 of the user device 14 associated with the geographic region 1-1 receives a user input to invoke a request for an analysis and generation of an agricultural prescription 80. The application processing module 34 of the user device 14 generates guidance 72 based on the request and other desired characteristics (e.g., a crop list, a time frame, equipment availability, chemical availability, and soil management operational ranges available) of the agricultural prescription 80 for the geographic region 1-1. The user device 14 sends, via the network 24, the guidance 72 to the application unit 16. The application processing module 34 of the application unit 16 obtains the data records 74 for the geographic region 1-1 from the storage unit 36 based on the guidance 72. The application processing module 34 of the application unit 16 may further obtain historical summaries 76 with regards to the geographic region 1-1 based on the guidance 72.

Having obtained the guidance 72, the data records 74, and/or the historical summaries 76, the application processing module 34 of the application unit 16 produces an analysis based on the data records 74 and/or the historical summaries 76. The application processing module 34 of the application unit 16 processes the analysis in accordance with the guidance 72 and/or the historical summaries 76 to produce an analysis summary 78. The application processing module 34 of the application unit 16 facilitates storage of the analysis summary 78 by the storage unit 36 to enable subsequent recovery of the historical summaries 76 that includes the analysis summary 78.

Having produced the analysis summary 78, the application processing module 34 of the application unit 16 processes the analysis summary 78 in accordance with the guidance 72 and the historical summaries 76 to produce the agricultural prescription 80. The agricultural prescription 80 may further include a plurality of steps, where each step includes one or more actions, and for each action, one or more required preconditions to execute the action. Such steps may be executed in parallel, in series, and in a combination in accordance with the preconditions for execution.

The preconditions for execution of the action includes required conditions to enable execution of the action (e.g., when to execute the action) including one or more of a current date match, a current date within a date range, a time within a time range, a current data sensor value within a desired range (i.e., a current temperature within a temperature range), an actuator readiness state, distance from a previously executed step (i.e., seed dispensing population of seeds per acre), and elapsed time since a previously executed step). For example, a precondition for planting a short growing seed at a later date has occurred within a growing season.

Each action includes what to do and how to do it (e.g., when to do it is a precondition). As such, each action includes one or more of dispensing particular one or more materials (i.e. a gas, a liquid, a slurry, a solid), how to dispense the material (i.e., distance between dispensing points, distance between parallel dispensing tracks), collect sensor data, and manipulate another object (i.e. management practices including one or more of: tilling, irrigation control, sunlight control), activate a variant of an electromagnet field). The liquids include chemical compounds such as fertilizers and pesticides. The pesticides include one or more of insecticides (e.g., insect killers), herbicides (e.g., weed killers), and fungicides (e.g., to kill or inhibit fungi). The solids include one or more of seed, fertilizer powder, and manure. The seeds include a plurality of hybrid seed types and may vary from growing season to growing season.

Having produced the agricultural prescription 80, the application processing module 34 of the application unit 16 sends, via the network 24, one or more of the analysis summary 78 and the agricultural prescription 80 to the user device 14. The application processing module 34 of the application unit 16 may further send the agricultural prescription 80, via the network 24 and the wireless communication network 1, to the user device 1-1C for utilization in performing of one or more steps of the agricultural lifecycle in accordance with the agricultural prescription 80. For example, the user device 1-1C displays a portion of the agricultural prescription 80 and sends control information of the agricultural prescription, via wireless signals 42, to the user device 1-1A to automate a portion of the execution of at least some of the steps of the agricultural lifecycle. For the example, the user device 1-1A issues control information to a set of actuators to dispense fertilizer in accordance with the agricultural prescription 80. For instance, to control dispensing a specified volume of liquid fertilizer in a specified date range in a specified geometric pattern for at least a portion of the geographic region 1-1 as the user device 1-1A versus the drive path 1-1.

Figure 6:
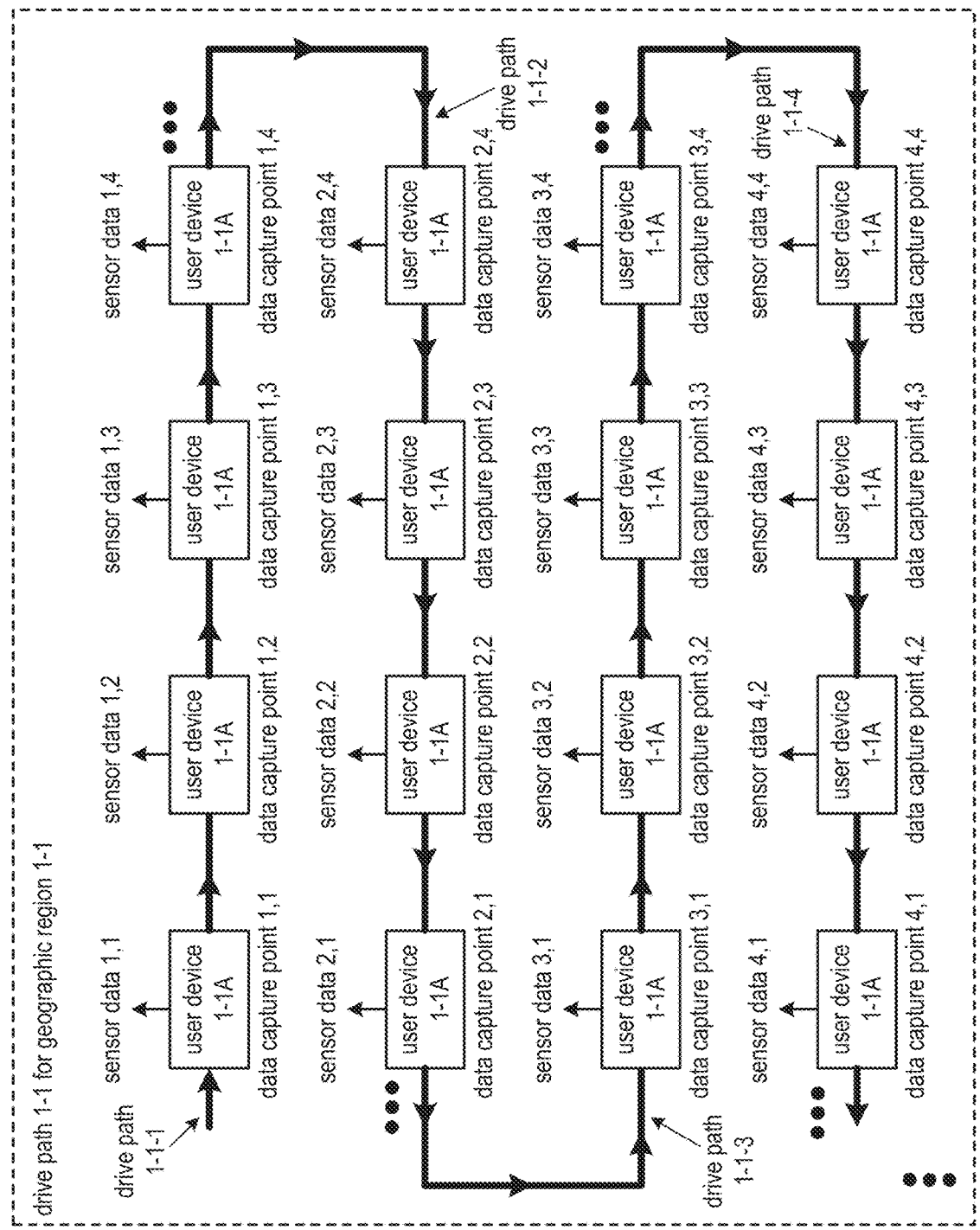
FIG. 6 is a diagram illustrating an embodiment of a drive path for an associated geographic region in accordance with the present invention.

FIG. 6 is a diagram illustrating an embodiment of a drive path 1-1 for an associated geographic region 1-1. In an example of operation, the user device 1-1A of FIG. 1 traverses the drive path 1-1 when executing steps of an agricultural lifecycle. The traversing of the drive path 1-1 may be in accordance with an agricultural prescription. The drive path 1-1 includes a plurality of corresponding drive paths 1-1-1, 1-1-2, 1-1-3, 1-1-4, etc. Each corresponding drive path may be associated with a portion of the overall drive path such that the corresponding drive path is associated with favorable attributes. Such favorable attributes includes one or more of minimizing waste by including fewer turnaround sections or deleting sections that link one corresponding drive path to another, minimizing fuel usage, minimizing soil erosion, maximizing crop yield, and maximizing overall efficiency of executing one or more steps of an agricultural lifecycle. For example, drive path 1-1-1 extends from a western edge of the geographic region 1-1 to an eastern edge of the geographic region 1-1 such that a farming tractor traversing the drive path 1-1-1 minimizes an amount of time to cover acreage associated with drive path 1-1-1 (e.g., driving in a substantially straight line).

The user device 1-1A includes an array of sensors that are utilized along the drive path 1-1 to capture sensor data in accordance with a data capture scheme. The agricultural prescription may include the data capture scheme. The data capture scheme includes one or more of where to capture sensor data (e.g., coordinates, distance between capturing), when to capture sensor data (e.g., how often, precondition trigger), which sensors to capture sensor data from (e.g., selecting particular sensors based on a step of an agricultural lifecycle), and how to capture the sensor data (e.g., instantaneous sample, average sample, another mathematical distribution applied to sample data).

The user device 1-1A may utilize the array of sensors to capture the sensor data for as many as each pass along the drive path 1-1 when operating within the geographic region 1-1 to execute at least some of the steps of the agricultural lifecycle. For example, the user device 1-1A captures sensor data while one or more of the following steps of the agricultural lifecycle are executed: initiating a planting cycle by tilling soil, applying fertilizer, applying pesticide, planting a primary crop, simultaneously applying fertilizer while planting the primary crop, planting a cover crop (e.g. utilized to minimize soil erosion and enhance soil nutrients), managing irrigation, harvesting according to a time schedule, harvesting based on detecting a crop condition trigger (e.g., crop moisture content), tilling the soil after harvesting, and applying fertilizer after harvesting.

The capturing of the sensor data may be unique for each of the corresponding drive paths. For example, the data capture scheme indicates to capture the sensor data from all sensors along the drive path 1-1-1 every one tenth of an inch to produce data capture points 1,1, 1,2, 1,3, 1,4, etc. When capturing the sensor data at periodic distance intervals, one of the data sensors may be utilized to measure the distance between data capture points to trigger capture of a next set of sensor data at a next data capture point. As another example, the data capture scheme indicates to capture the sensor data from sensors 1, 3, 5, and 7 along the drive path 1-1-2 every two seconds. As yet another example, the data capture scheme indicates to capture the sensor data from sensors 2 and 4 along the drive path 1-1 when sensor data from sensor 1 is interpreted to detect that a particular chemical density level is less than a low chemical density threshold level.

Figure 7:
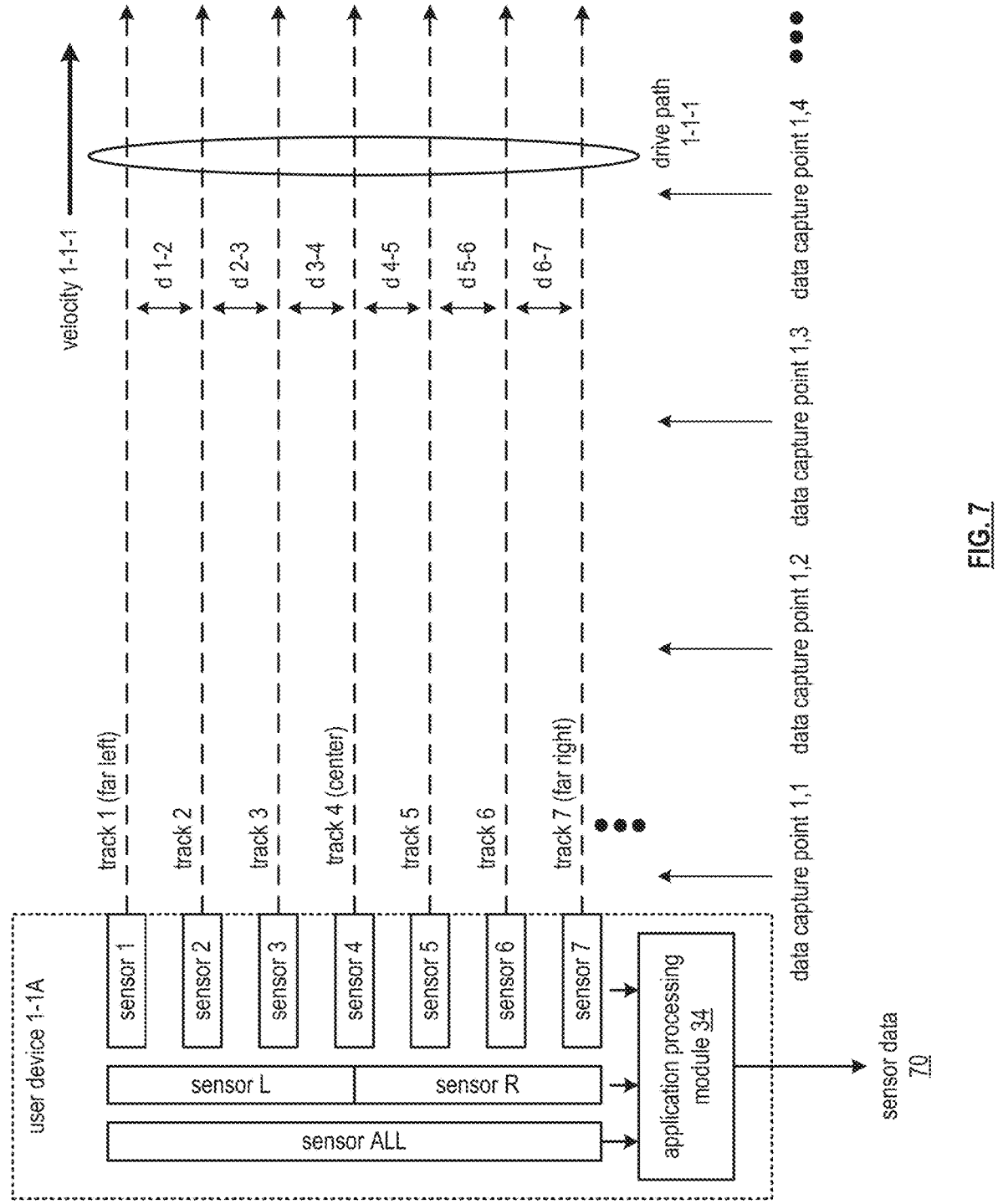
FIG. 7 is a diagram illustrating a relationship between a user device and tracks along a drive path in accordance with the present invention.

FIG. 7 is a diagram illustrating a relationship between the user device 1-1A and tracks 1-7 along the drive path 1-1-1. The user device 1-1A includes the application processing module 34, an array of sensors 1-7, sensor L, sensor R, and sensor ALL to capture corresponding sensor 70 data along the drive path 1-1-1 as the user device 1-1A traverses the drive path 1-1-1 in accordance with a velocity 1-1-1. The velocity 1-1-1 may be established as at least one of a random velocity, a predetermined velocity, and an instantaneous velocity in accordance with a velocity schedule. An agricultural prescription may include the velocity schedule for each corresponding drive path or portion thereof.

The drive path 1-1-1 is associated with the tracks 1-7 and may include further tracks. Each track is a virtual path substantially parallel with the drive path 1-1-1. A center track (e.g., track 4) may further align with the drive path 1-1-1 and each other track runs in parallel to the center track, where each track is separated from another track by a potentially unique distance d (e.g., different distances between different tracks in a typical range of a few centimeters to many meters). For example, track 3 is separated from track 4 by distance d3-4 of 8 inches and track 4 is separated from track 5 by distance d4-5 of 20 inches. The agricultural prescription may include a number of tracks, each of the distances that separate the tracks, and a track to sensor mapping.

Each sensor is associated with one or more tracks. For example, sensor 1 is associated with track 1, sensor 2 is associated with track 2, sensor 3 is associated with track 3, etc. through sensor 7 is associated with track 7; sensor L is associated with tracks 1-4; sensor R is associated with tracks 4-7; and sensor ALL is associated with tracks 1-7. Each sensor may include capabilities to sense one or more attributes associated with one or more of the tracks in accordance with the track mapping. For example, sensors 1-7 include image sensors to detect and enable identification of objects (e.g., desired and undesired) along tracks 1-7, sensor L includes an ultrasonic sensor to detect objects associated with tracks 1-4, sensor R includes an ultrasonic sensor to detect objects associated with tracks 4-7, and sensor ALL includes an accelerometer to provide inertia information with regards to a farming tractor associated with the user device 1-1A (e.g., to enable precision location determination).

The application processing module 34 captures the sensor data 70 from the array of sensors from time to time in accordance with a data capture scheme. The application processing module 34 processes the sensor data 70 in accordance with a sensor data processing scheme. The agricultural prescription may include the sensor data processing scheme. The application processing module 34 obtains the sensor data processing scheme by at least one of accessing a predetermination, initiating a query, receiving a query response, receiving the agricultural prescription, and determining the agricultural prescription.

The sensor data processing scheme includes one or more of locally storing at least a portion of the sensor data, outputting at least some of the sensor data, identifying a portion of the sensor data for analysis, analyzing the identified portion of the sensor data to produce an analysis, summarizing the analysis to produce an analysis summary, and generating an updated agricultural prescription. As a specific example of capturing the sensor data 70, the application processing module 34 captures the sensor data 70 from the array of sensors at a data capture point 1,1 for each of the tracks 1-7, where the distance between tracks is 8 inches; captures the sensor data 70 from the array of sensors at a data capture point 1, 2 for each of the tracks 1-7, where the distance between tracks is adjusted to 6 inches, from sensor L, from sensor R, and from sensor ALL; captures the sensor data 70 from the array of sensors at a data capture point 1, 3 for each of the tracks 1-7, where the distance between tracks is maintained at 6 inches, and the velocity 1-1-1 is suggested from 8 miles per hour (MPH) to 11 MPH; etc.

Figure 8:
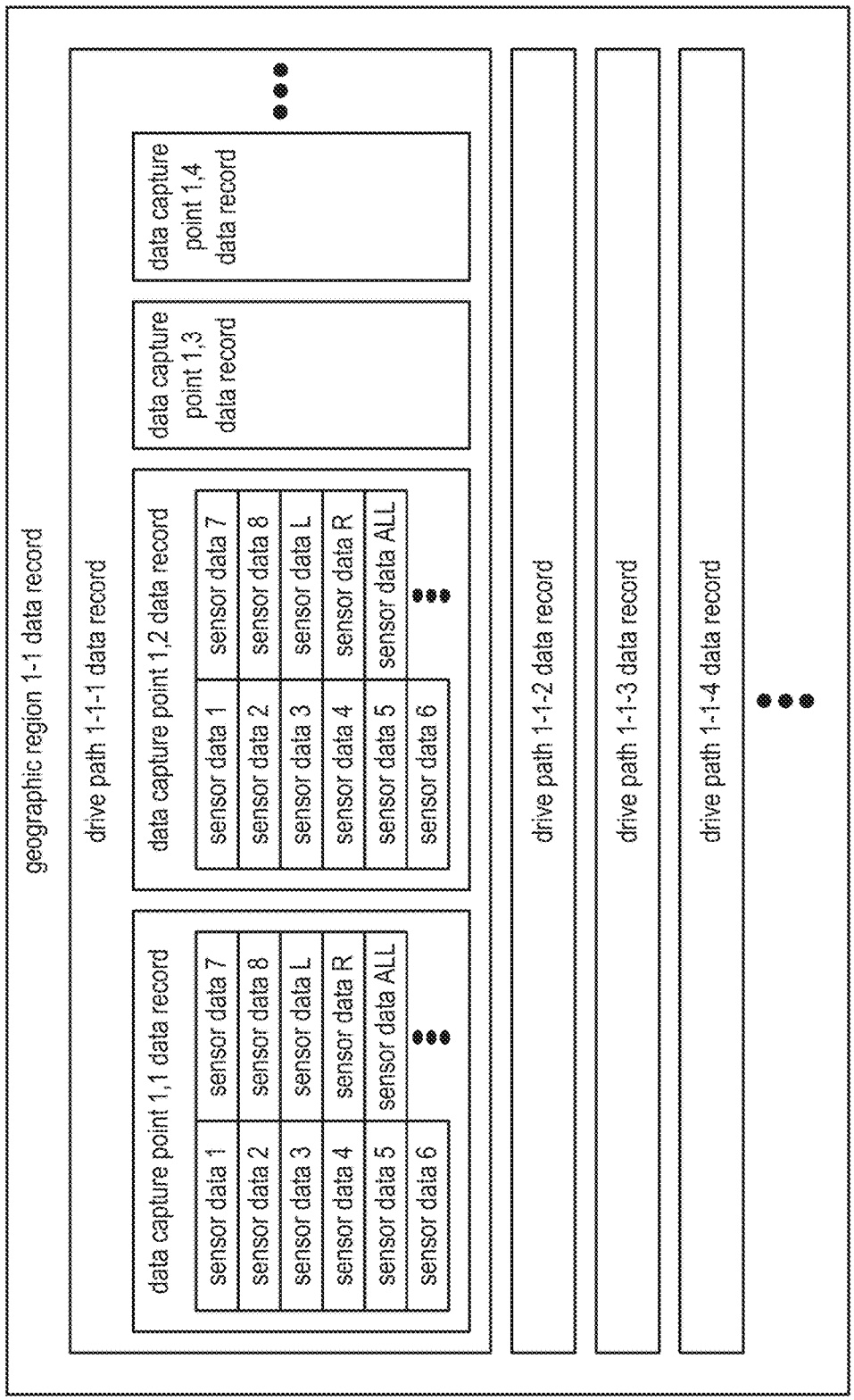
FIG. 8 is a diagram illustrating an example of a structure of a data record in accordance with the present invention.

FIG. 8 is a diagram illustrating an example of a structure of a geographic region 1-1 data record, where the data records 74 may include the geographic region 1-1 data record. The geographic region 1-1 data record includes a plurality of drive path data records 1-1-1, 1-1-2, 1-1-3, etc. Each drive path data record is associated with a plurality of corresponding drive paths of a drive path associated with the geographic region 1-1. Each drive path data record includes data capture point data records. For example, the drive path 1-1-1 data record includes data capture point data records for data capture points 1,1, 1,2, 1,3, 1,4, etc.

Each data capture data record includes the sensor data 70 for a sensor array corresponding to a user device associated with capture of the sensor data. For example, the data capture point data records for the drive path 1-1-1 data record includes sensor data 1-8, sensor data L, sensor data R, sensor data ALL, and may include further data associated with data capture point 1,1. The further data may include one or more of a timestamp corresponding to capturing of the sensor data, a timestamp corresponding to receiving of the captured sensor data, location information associated with the data capture point, an identifier of a user device associated with the sensor array, identifiers for each sensor of the sensor array, an identifier associated with another user device that is associated with the user device, an identifier of the geographic region, an identifier of the drive path data record, an identifier of the data capture point, a data owner identifier, an access control list, security credentials, security information (e.g., a signed certificate, an encryption key, an encryption key seed), and any other data to facilitate optimization of an agricultural lifecycle.

Figure 9:
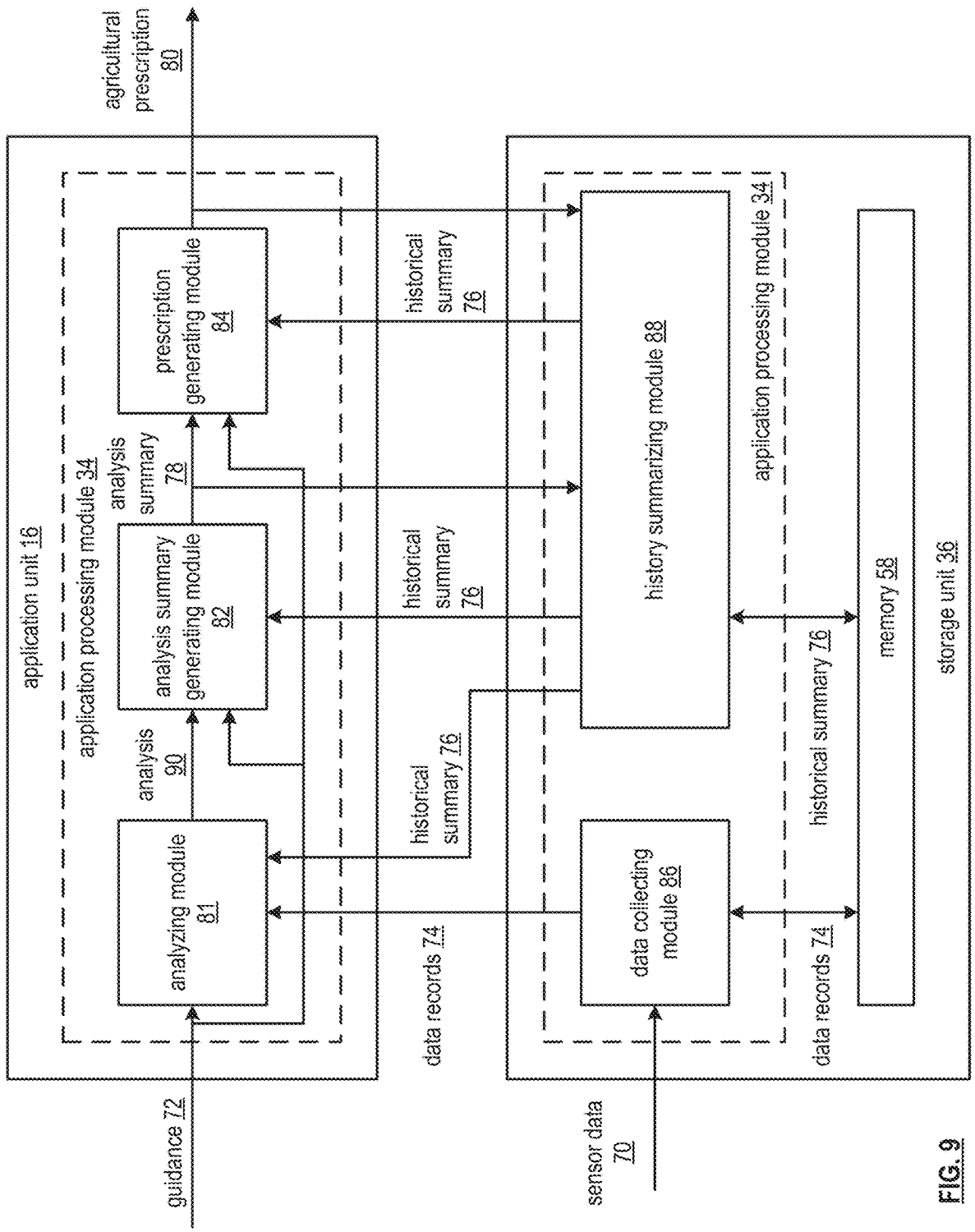
FIG. 9 is a schematic block diagram of an embodiment of an application unit and an associated storage unit in accordance with the present invention.

FIG. 9 is a schematic block diagram of an embodiment of the application unit 16 and of the storage unit 36, where the application unit 16 and the storage unit 36 include corresponding application processing modules 34 and may include the memory 58. Alternatively, a single computing device may include each application processing module 34 and each memory 58. The application processing module 34 of the application unit 16 includes an analyzing module 81, an analysis summary generating module 82, and a prescription generating module 84. The application processing module 34 of the storage unit 36 includes a data collecting module 86 and a history summarizing module 88.

The application unit 16 and storage unit 36 perform at least some steps associated with the five example functions of the computing system 10. In an example of operation, the data collecting module 86 receives sensor data 70 from one or more user devices associated with a geographic region of a plurality of geographic regions. The data collecting module 86 generates one or more data records 74 based on the sensor data 70 and stores the one or more data records 74 in the memory 58 of the storage unit 36.

The analyzing module 81 receives guidance 72 from a user device (e.g., the user device 14 of FIG. 1) associated with the geographic region. For example, the guidance 72 includes a request for an analysis and conditions of the analysis. The analyzing module 81 obtains data records 74 from the data collecting module 86 based on the guidance 72 and may further obtain a historical summary 76 from the history summarizing module 88 based on the guidance 72. Hereafter, the historical summary 76 may be interchangeably referred to as a history summary. For example, the analyzing module 81 issues a data records request to the data collecting module 86 with regards to the geographic region and receives the data records 74 from the data collecting module 86, where the received data records 74 are associated with the geographic region and adjacent geographic regions to the geographic region. As another example, the analyzing module 81 issues a history summary request to the history summarizing module 88 and receives the historical summary 76 with regards to the geographic region and the adjacent geographic regions from the history summarizing module 88.

Having obtained the data records 74 and the historical summary 76, analyzing module 81 analyzes one or more of the data records 74 and the historical summary 76 to produce an analysis 90 in accordance with the guidance 72. For example, the analyzing module 81 identifies results from the data records 74 and correlates the results to specific steps of an agricultural lifecycle of the historical summary 76 to produce the analysis 90, where the analysis 90 indicates results and associated steps.

The analysis summary generating module 82 obtains another historical summary 76 from the history summarizing module 88, where the other historical summary 76 includes a previous analysis summary associated with the geographic region. Having received the historical summary 76, the analysis summary generating module 82 summarizes the analysis 90 in accordance with one or more of the guidance 72 and the historical summary 76 to produce an analysis summary 78. For example, the analysis summary generating module 82 determines probabilities of favorable results associated with the steps based on previous sets of results and steps.

The history summarizing module 88 may obtain the analysis summary 78 and process the analysis summary 78 to produce a further historical summary 76 for storage in the memory 58 of the storage unit 36. The prescription generating module 84 obtains yet another historical summary 76 from the history summarizing module 88, where the yet another historical summary 76 may include one or more previous agricultural prescriptions associated with the geographic region and/or agricultural prescriptions associated with the adjacent geographic regions. Having received the analysis summary 78 and the yet another historical summary 76, the prescription generating module 84 generates an agricultural prescription 80 for the geographic region based on one or more of the analysis summary 78, the yet another historical summary 76, and the guidance 72. For example, the prescription generating module 84 utilizes the probabilities of favorable results associated with the steps to recommend steps of the agricultural lifecycle associated with the geographic region and in accordance with the guidance 72 (e.g., for a specific desired crop type).

The agricultural prescription 80 may include one or more of steps, actions associated with each step, and preconditions for each action. The prescription generating module 84 outputs the agricultural prescription 80 which may include sending the agricultural prescription 80 to the history summarizing module 88. When receiving the agricultural prescription 80, the history summarizing module 88 processes the agricultural prescription 80 to produce an updated historical summary 76 for storage in the memory 58.

Figure 10:
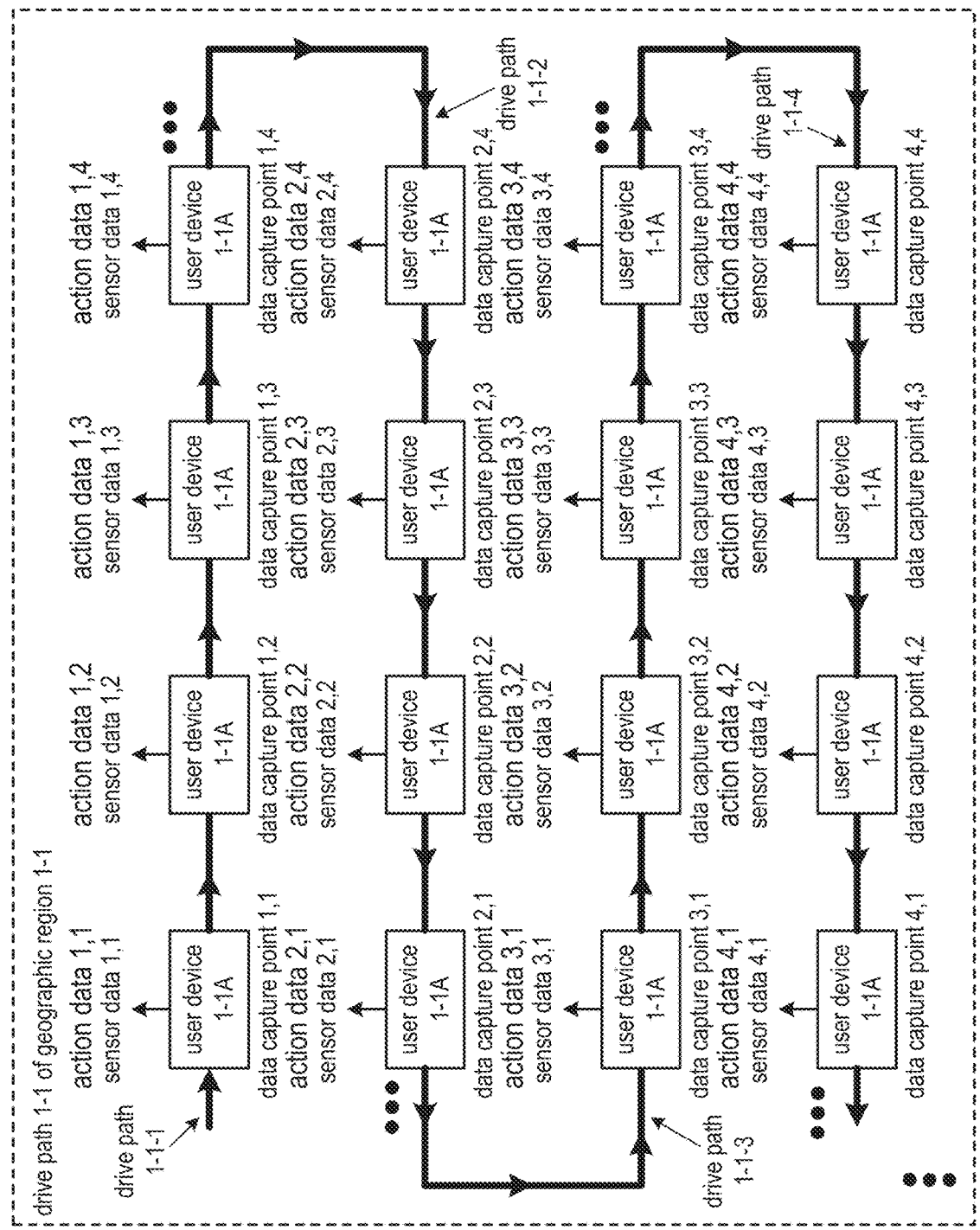
FIG. 10 is a diagram illustrating another embodiment of a drive path for an associated geographic region in accordance with the present invention.

FIG. 10 is a diagram illustrating another embodiment of the drive path 1-1 for associated geographic region 1-1. The user device 1-1A captures sensor data at the plurality of data capture points along each associated drive path of the drive path 1-1 and provides action data along at least some of the associated drive paths. The user device enables execution of the action data along each associated drive path in accordance with an agricultural prescription.

The action data includes one or more steps of an agricultural lifecycle, and may further include actions and associated preconditions for each action. For example, an action may include depositing a specified volume of liquid fertilizer along the drive path 1-1-1 at specific intervals. As another example, the action may include planting seeds of a desired crop at a specific soil depth at specified intervals along the drive path 1-1-2. For instance, a specified average number of seeds are deposited along the drive path 1-1-2 in accordance with action data 2, 4 followed by depositing further seeds along the drive path 1-1-2 in accordance with action data 2, 3 etc.

Figure 11:
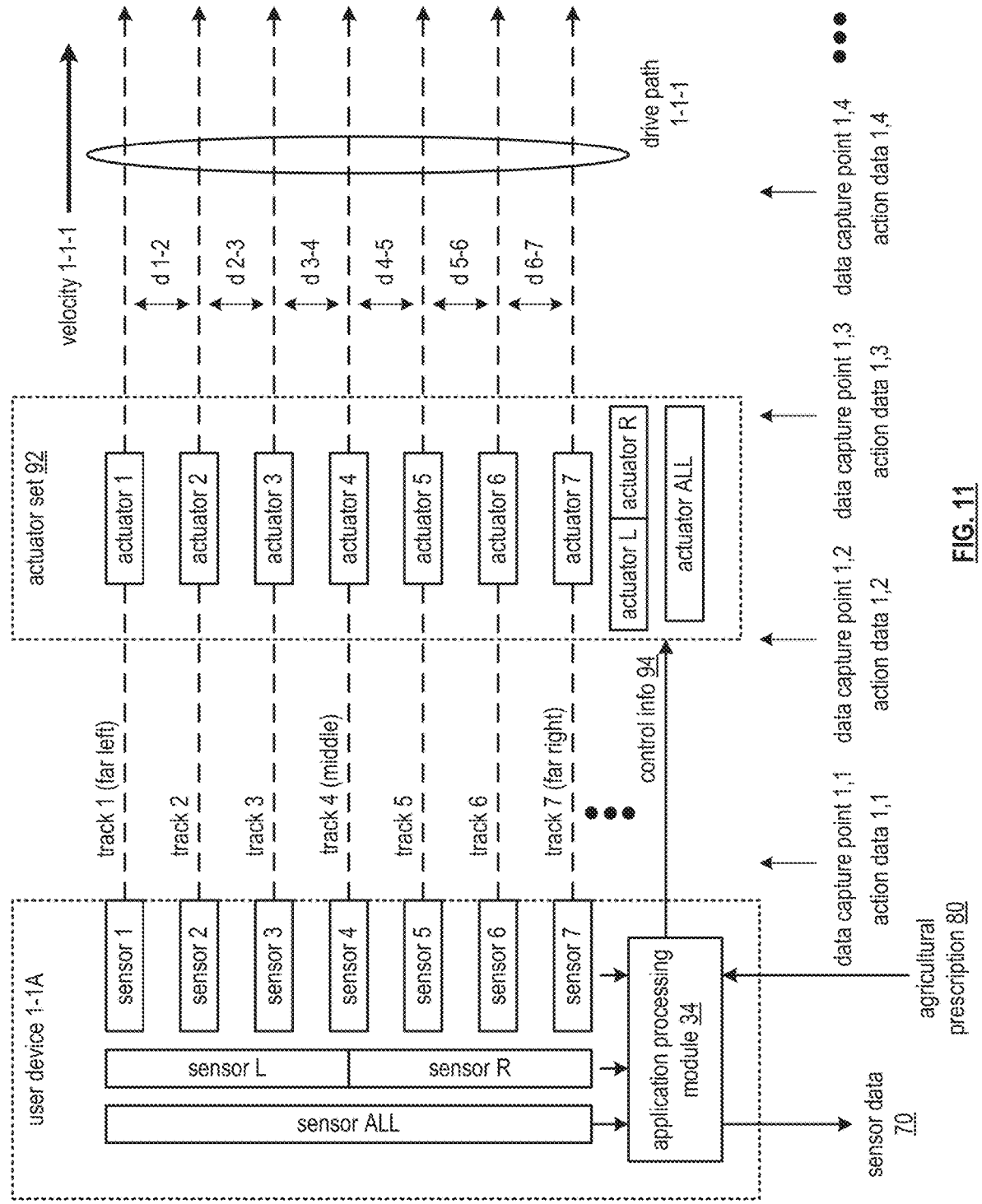
FIG. 11 is a diagram illustrating a relationship between a user device, an actuator set, and tracks along a drive path in accordance with the present invention.

FIG. 11 is a diagram illustrating a relationship between the user device 1-1A, an actuator set 92, and the tracks 1-7 along the drive path 1-1-1. In an embodiment, the actuator set 92 includes a set of actuators 1-7, actuator L, actuator R, and actuator ALL. Each actuator is operable to perform an action in accordance with control information 94 including one or more of dispensing fluid (e.g., fertilizer, pesticide, fungicide), dispensing a solid (e.g., planting a seed), and manipulating soil (e.g., tilling). An agricultural prescription 80 includes the control information 94 that includes the actions of the planting. The user device 1-1A includes the sensor array of FIG. 7 and the application processing module 34 of FIG. 7.

The control information 94 further includes one or more instructions with regards to implementation of actions performed by the actuators. The instructions includes one or more of setting a distance d between the tracks, planting a seed at a specified planting depth, dispensing a specified volume of a liquid within a linear distance along a track, setting a velocity 1-1-1 of traversing of the drive path 1-1-1 in accordance with a velocity schedule, modifying the velocity 1-1-1 based on real-time sensor data, and utilizing one or more sensors to detect preconditions to enable execution of one or more actions.

The user device 1-1A and the actuator set 92 share a common implementation association. For example, embedded control electronics of a farming tractor includes the user device 1-1A and a farming planting mechanism, propelled by the farming tractor, includes the actuator set 92, where the actuator set 92 facilitates actions associated with planting along the drive path 1-1-1.

Each actuator may be associated with one or more of the tracks 1-7. For example, actuator 1 is associated with track 1, actuator 2 is associated with track 2, etc. through actuator 7 is associated with track 7, actuator L is associated with tracks 1-4, actuator R is associated with tracks 4-7, and actuator ALL is associated with tracks 1-7. For example, actuators 1-7 include planting actuators, actuator L includes a mechanism to simultaneously adjust a position of actuators 1-4 (e.g., lift left, lower left), actuator R includes a mechanism to simultaneously adjust a position of actuators 4-7 (e.g., lift right, lower right), and actuator ALL includes a mechanism to simultaneously adjust a position of actuators 1-7 (e.g., lift all, lower all).

In an example of operation, the application processing module 34 of the user device 1-1A extracts the control information 94 from the received agricultural prescription 80 and activates the actuator set 92 with the control information 94. As the user device 1-1A and the actuator set 92 traverses the drive path 1-1-1 at velocity 1-1-1, the actuator set 92 performs the actions of the control information 94 (e.g., plants seeds along the tracks) in accordance with a plurality of action data 1,1, 1,2, 1,3, 1,4, etc., and the application processing module 34 captures sensor data 70 from the array of sensors at data capture points 1,1, 1,2, 1,3, 1,4, etc. The application processing module 34 may update the control information 94 based on the captured sensor data 70. For example, the application processing module modifies a planting depth of the control information 94 based on a moisture sensor data value and in accordance with the agricultural prescription 80.

Figure 12A:
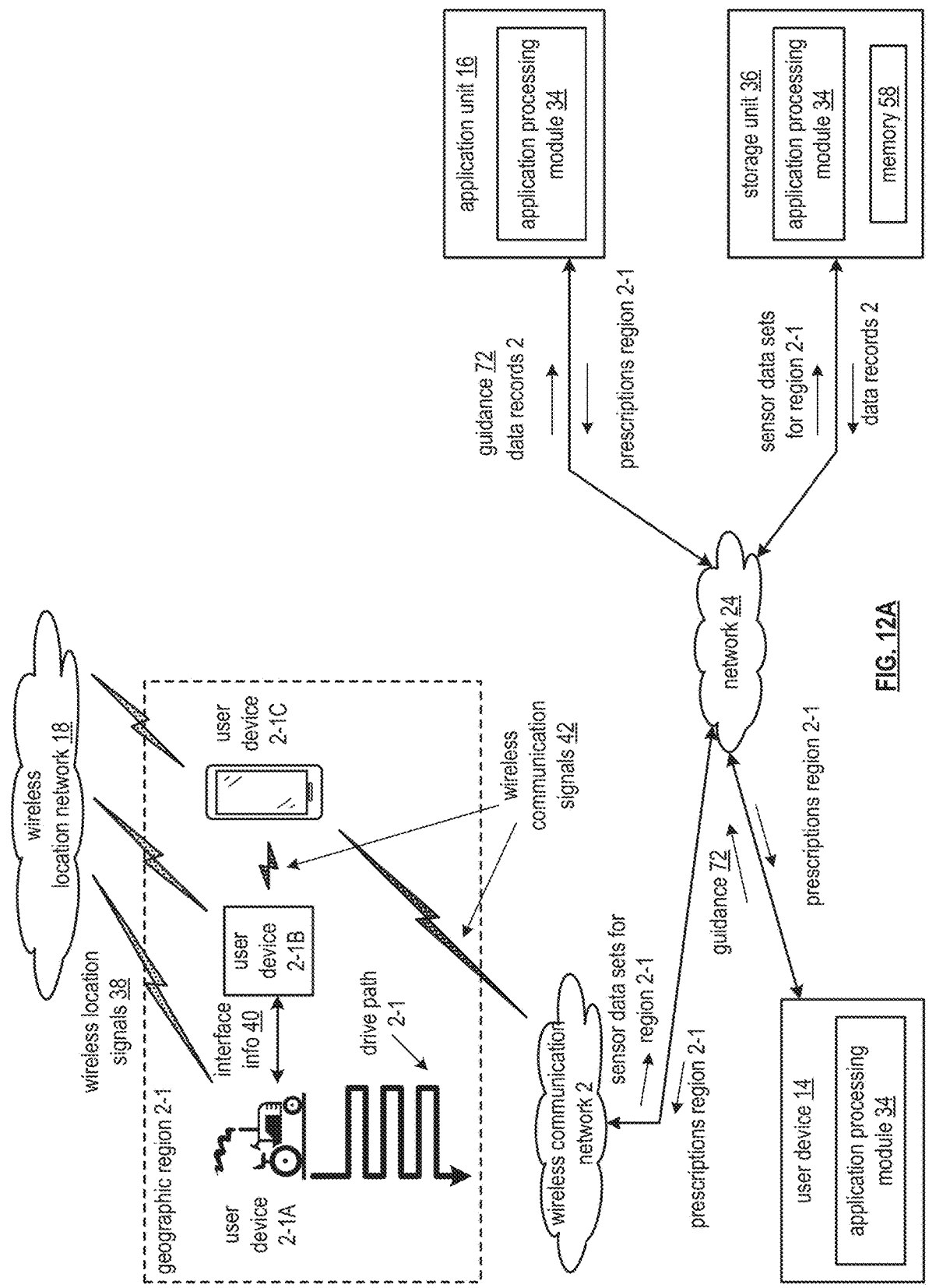
FIG. 12A is a schematic block diagram of another embodiment of a computing system in accordance with the present invention.

FIG. 12A is a schematic block diagram of another embodiment of a computing system that includes the wireless location network 18 of FIG. 5, a geographic region 2-1, the wireless communication network 2 of FIG. 1, the network 24 of FIG. 1, the user device 14 of FIG. 5, the application unit 16 of FIG. 5, and the storage unit 36 of FIG. 5. The geographic region 2-1 includes the user devices 2-1A, 2-1B, and 2-1C of FIG. 5, where the user device 2-1A traverses the drive path 2-1 of FIG. 5. Each of the user device 14, the application unit 16, and the storage unit 36 include the application processing module 34 of FIG. 5. The storage unit 36 further includes the memory 58 of FIG. 5.

The computing system is operable to collect data to generate an agricultural prescription for the geographic region 2-1. In an example of operation of the collecting of the data to generate the agricultural prescription, the user device 2-1B obtains one or more prescriptions associated with the geographic region 2-1. For example, the application processing module 34 of the application unit 16 generates the one or more prescriptions and sends the one or more prescriptions, via the network 24, to the wireless communication network 2. The wireless communication network 2 sends wireless communication signals 42 to the user device 2-1C, where the wireless communication signals 42 includes the one or more prescriptions. The user device 2-1C sends further wireless communication signals 42 to the user device 2-1B, where the further wireless communication signals 42 include the one or more prescriptions.

Having obtained the one or more prescriptions associated with the geographic region 2-1, the user device 2-1B interprets received data, via interface information 40, from the user device 2-1A to produce raw sensor data sets for the geographic region 2-1. For example, the user device 2-1B receives the interface information 40 from the user device 2-1B during traversal of the drive path 2-1 to produce the raw sensor data sets. Having produced the raw sensor data sets, the user device 2-1B obtains location information associated with the raw sensor data sets. The obtaining includes at least one of interpreting the received data and interpreting wireless location signals 38 received directly from the wireless location network 18. Having obtained the location information, the user device 2-1B associates the raw sensor data sets with the obtained location information to produce location enabled sensor data sets. For example, the user device 2-1B tags each sensor data value with a corresponding location coordinate, where the sensor data value pertains to the location coordinate.

Having produced the location enabled sensor data sets, the user device 2-1B stores the location enabled sensor data sets in a local memory. Having stored the location enabled sensor data sets, the user device 2-1B identifies at least one prescription of the one or more prescriptions associated with the location information. For example, the user device 2-1B identifies location coordinates of a prescription that substantially match location information of the location enabled sensor data sets. For instance, the user device 2-1B identifies a prescription associated with geographic region 2-1.

Having identified the at least one prescription, the user device 2-1B associates the identified prescription with the location enabled sensor data sets to produce prescription based location enabled sensor data sets. For example, the user device 2-1B tags the location enabled sensor data sets with an identifier of the identified prescription to produce the prescription based location enabled sensor data sets.

Having produced the location enabled sensor data sets, the user device 2-1B performs a filtering function on the prescription based location enabled sensor data sets in accordance with a filter identifier of the identified prescription to produce sensor data sets for the geographic region 2-1. For example, the user device 2-1B discards one or more portions of sensor data not associated with the prescription while retaining other portions of the sensor data associated with the prescription.

Having performed the filtering function, the user device 2-1B sends, via the user device 2-1C, by wireless communication network 2, and the network 24, the sensor data sets for geographic region 2-1 to the storage unit 36 for storage and subsequent processing by the application unit 16 to produce at least one of a new prescription and an updated prescription. For example, the application unit receives guidance 72 from the user device with regards to the geographic region 2-1 (e.g., an instruction to collect sensor data), obtains data records 2 that includes the sensor data sets for geographic region 2-1, generates the at least one of the new prescription and the updated prescription, and sends, via the network 24, the at least one of the new prescription and the updated prescription to the user device 14 and, via the wireless network 2 and the user device 2-1C, to the user device 2-1B for further execution of steps within the geographic region 2-1. The operation of the user device 2-1B is discussed in greater detail with reference to FIG. 12B.

Figure 12B:
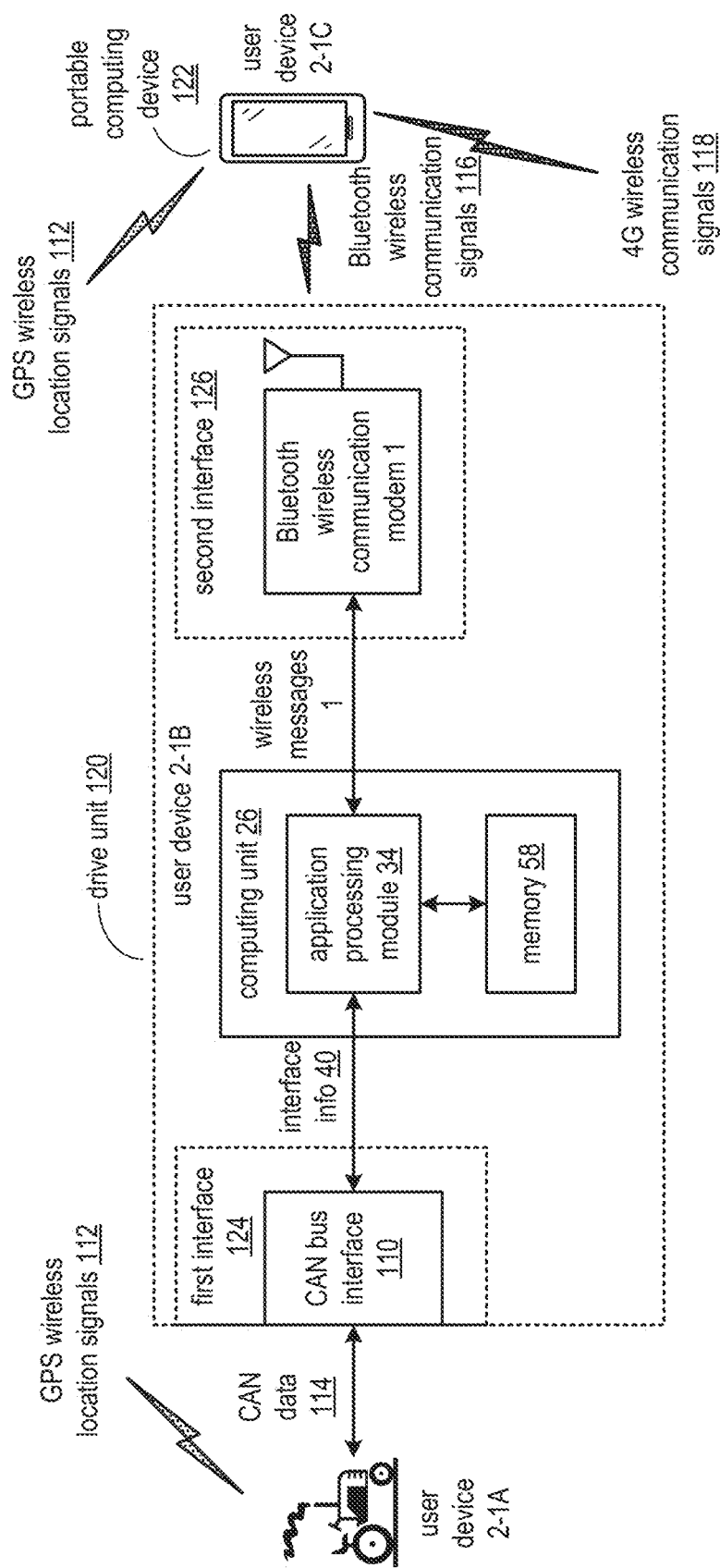
FIG. 12B is a schematic block diagram of an embodiment of a drive unit in accordance with the present invention.

FIG. 12B is a schematic block diagram of an embodiment of a drive unit 120 that includes a first interface 124, the computing unit 26 of FIG. 5, and a second interface 126. The drive unit 120 may be implemented utilizing the user device 2-1B of FIG. 12A. The first interface 124 includes a controller area network (CAN) bus interface 110 to establish a first communication path with farm equipment (e.g., any equipment associated with execution of one or more steps of an agricultural prescription associated with an agricultural lifecycle such as the user device 2-1A of FIG. 12A, i.e., a farming tractor). The first communication path may be utilized to communicate one or more of sensor data and controller data between the farm equipment and the drive unit 120, where one or more sensors associated with the farm equipment produce sensor data and one or more controllers associated with the farm equipment produces the controller data. The one or more sensors and the one or more controllers may conform to a very sensor types and various controller types in accordance with a farm equipment type. For example, when the farm equipment includes a tractor, examples of sensor types includes engine speed, fuel consumption, an area/distance counter (e.g., GPS, radar), power take off (PTO), tractor hydraulics (e.g., pressure, flow), hydraulic pump speed, wheel speed, and wheel slippage; and examples of controllers includes hydraulic directional, pressure, and flow controllers, hydraulic pump speed, speed controller, hitch position controller, and a wheel position controller.

As another example, when the farm equipment includes seed planting equipment (e.g., a planter, a drill, an air seeder), examples of sensor types includes speed sensors (e.g., optical, other electromagnetic sensors, impacts sensors), downforce sensors (e.g., load pins, load cells, pressure sensors), soil property sensors, (e.g., reflectivity sensors, moisture sensors, electrical conductivity sensors, optical residue sensors, temperature sensors), component operating criteria sensors (e.g., planting depth sensors, and downforce cylinder pressure sensors, seed disc speed sensors, seed drive motor encoder, seed conveyor system speed sensors, vacuum level sensors), and pesticide application sensors (e.g., optical, other electromagnetic sensors, impacts sensors); and examples of controllers includes toolbar fold controller (e.g., valves associated with hydraulic cylinders), downforce controllers (e.g., valves associated with pneumatic cylinders, airbags, hydraulic cylinders) for applying downforce applied to individual row units or entire planter frame, planting depth controller (e.g., linear actuator), metering controllers (e.g., electric seed meter drive motors, hydraulic seed meter drive motors, swath control clutches), hybrid selection controllers (e.g., seed meter drive motors, actuators selectively allowing or preventing seed or air/seed mixture from delivering seed to or from seed meters or central bulk hoppers), seed conveyor system controllers (e.g., belt seed delivery conveyor motor), marker controllers (e.g., pneumatic/hydraulic actuator), and pesticide application rate controller (e.g., metering drive controller, orifice size/position controller).

As another example, when the farm equipment includes tillage equipment (e.g., a tiller), examples of sensor types includes tool (e.g., shank, disc) position sensors (e.g., depth, gang angle, lateral spacing), downforce sensors, and draft force sensors; and examples of controller types includes downforce controllers and tool position controllers (e.g., depth, gang angle, lateral spacing).

As another example, when the farm equipment includes fertilizing or insecticide application equipment (e.g., un-planter starter fertilizer system, subsoil fertilizer applicator, fertilizer spreader), examples of sensor types includes fluid system criteria sensors (e.g., flow, pressure) sensors associated with a tank, sectional order system-wide supply line, and row-specific supply line, kinematic sensors (e.g., accelerometers disposed on a sprayer boom); and example of controller types includes pump speed controllers, valve (e.g., pressure control, flow control, directional) controller, and position actuators (e.g., boom height, subsoil depth).

As another example, when the farm equipment includes harvesting equipment (e.g., a harvester), examples of sensor types includes a yield monitor (e.g., impact plate strain gauge or position sensors, capacitive flow sensor, load/weight sensor or torque sensor associated with elevator or auger, optical or other electromagnetic grain height sensors), grain moisture sensors (e.g., capacitive sensors), a grain loss sensor (e.g., impact, optical, capacitive), header operating criteria sensors (e.g., header height, header type, deck plate gap, feeder speed, reel speed), separator operating criteria sensors (e.g., concave clearance, rotor speed, shoe clearance, chaffer clearance), auger position/operation/speed sensors, and an engine speed sensor; and examples of controllers includes header operating criteria controllers (e.g., header height, header type, deck plate, feeder speed, reel speed), separator operating criteria controllers (e.g., concave clearance, rotor speed, shoe clearance, chaffer clearance), and auger position/operation/speed controllers. As another example, when the farm equipment includes a grain cart, examples of the sensor types includes weight sensors and auger position/operation/speed sensors; and examples of controller types includes auger position/operation/speed controllers.

Alternatively, or in addition to, the first interface 124 may be implemented utilizing an on-board diagnostics (OBD) interface or any other de facto or de jure industry standard interface. The computing unit 26 includes the application processing module 34 of FIG. 5 and the memory 58 of FIG. 5. The second interface 126 includes a Bluetooth wireless location modem 1 to establish a second communication path with a portable computing device 122 (e.g., the user device 2-1C of FIG. 12A). Alternatively, or in addition to, the second interface 126 includes at least one of a Wi-Fi indication modem, a 60 GHz communication modem, an infrared communication modem, any other wireless connectivity wireless communication modem, and a wireline interface (e.g., a universal serial bus (USB) interface) may be utilized in lieu of the Bluetooth wireless communication modem 1.

The user device 2-1B is operable to facilitate the collecting of the data to generate the agricultural prescription. In an example of operation of the facilitating of the collecting of the data to generate the agricultural prescription, the Bluetooth wireless communication modem 1 interprets Bluetooth wireless communication signals 116 from the user device 2-1C to produce wireless messages 1, where the wireless messages 1 have been encoded with one or more agricultural prescriptions. The application processing module 34 extracts the one or more agricultural prescriptions from the wireless messages 1 and stores the one or more agricultural prescriptions in the memory 58.

Having received the one or more agricultural prescriptions, the CAN bus interface 110 receives CAN data 114 from the user device 2-1A to produce interface information 40. The application processing module 34 interprets the interface information 40 to produce raw sensor data sets. For example, the application processing module 34 decodes the interface information 40 in accordance with a CAN industry standard to produce the raw sensor data sets.

Having produced the raw sensor data sets, the application processing module 34 interprets the raw sensor data sets to produce location information. As a specific example, the application processing module 34 extracts coordinated universal time (UTC) and global positioning system (GPS) coordinates from the CAN data 114, where the user device 2-1A receives the GPS location signals 112 to produce the UTC. As another specific example, the application processing module 34 synchronizes a local time with the extracted UTC to produce a synchronized local time and further processes (e.g., interpolation, geolocation refinement) the extracted GPS coordinates utilizing the synchronized local time to provide the location information.

Having produced the location information, the application processing module 34 associates the raw sensor data sets with the obtained location information to produce location enabled sensor data sets. For example, the application processing module tags sensor data with corresponding UTC and GPS location coordinates of time-of-receipt to produce the location enabled sensor data sets. Having produced the location enabled sensor data sets, the application processing module 34 stores the location enabled sensor data sets in the memory 58.

The application processing module 34 identifies at least one prescription of the one or more prescriptions associated with the location information. For example, the application processing module 34 identifies a geographic location area associated with the prescription that is substantially the same as the obtained location information. Having identified the prescription, the application processing module 34 associates the identified prescription with the location enabled sensor data sets to produce prescription based location enabled sensor data sets. For example, the application processing module 34 tags the location enabled sensor data sets with an identifier of the identified prescription to produce these prescription based location enabled sensor data sets.

Having produced the prescription based location enabled sensor data sets, the application processing module 34 performs a filtering function on the prescription based location enabled sensor data sets in accordance with a filter identifier of the identified prescription to produce sensor data sets. For example, the application processing module 34 discards one or more portions of sensor data and not associated with the prescription. Alternatively, the application processing module 34 applies a null filter to prevent discarding any sensor data.

The application processing module 34 generates further wireless messages 1 based on the sensor data sets. Having produced the further wireless messages 1, the application processing module 34 sends the further wireless messages 1 to the Bluetooth wireless communication modem 1 for transmission to the user device 2-1C for retransmission, via any one or more wireless industry standards, including fourth-generation (4G) wireless communication signals 118, to a storage unit for storage and subsequent processing to produce at least one of an updated agricultural prescription and a new agricultural prescription.

In another example of operation of the facilitating of the collecting of the data by the drive unit 120 to generate the agricultural prescription, the drive unit 120 receives, via the first interface 124 of the drive unit 120, data from farm equipment to produce agricultural data. For example, the CAN bus interface 110 receives the CAN data 114 from the user device 2-1A (e.g., a tractor) and produces interface information for at least temporary storage in the memory 58, where the CAN data 114 and the interface information 40 includes the data. The agricultural data may include one or more of location information, timestamp information, terrain information, soil sampling information, accelerometer information, gyroscope information, velocity information, weather information, magnetic field information, imaging data, chemical detection, fluid flow volume, sensor data, and execution phase of an agricultural prescription.

The producing of the agricultural data may include the drive unit 120 receiving, via the second interface 126 of the drive unit 120, additional data from the portable computing device 122. For example, the computing unit 26 receives wireless messages 1 (e.g., including the additional data) from the Bluetooth wireless communication modem 1, where the Bluetooth wireless location modem 1 interprets Bluetooth wireless communication signals 116 received from the user device 2-1C. Having received the additional data, the application processing module 34 integrates the additional data with the data to produce the agricultural data.

The producing of the agricultural data may further include the drive unit 120 receiving, via the first interface 124 of the drive unit 120, first location information from the farm equipment. For example, the CAN bus interface 110 receives the CAN data 114 from the user device 2-1A to produce interface information 40 that includes the first location information, where the user device 2-1A interprets the GPS wireless location signals 112 (e.g., GPS wireless location signals 1) to produce the first location information (e.g., location information 1). Alternatively, the user device 2-1A produces the CAN data 114 to include null first location information when the GPS wireless location signals 112 are unavailable to the user device 2-1A or when the user device 2-1A is unable to interpret the GPS wireless location signals 112.

Having received the first location information, the drive unit 120 receives, via the second interface 126 of the drive unit 120, second location information (e.g., location information 2) from the portable computing device 122. For example, the Bluetooth wireless communication modem 1 receives Bluetooth wireless communication signals 116 to produce the wireless messages 1 that includes the second location information, where the user device 2-1C interprets the GPS wireless location signals 112 (e.g., GPS wireless location signals 2 of proximal location to the GPS wireless location signals 1) to produce the second location information. Having received the wireless messages 1, the application processing module 34 processes the wireless messages 1 to produce the second location information. For example, the application processing module 34 extracts the second location information from the wireless messages 1. As another example, the application processing module 34 facilitates conversion of the wireless messages 1 into a format associated with the CAN data 114, where the second location information is represented in received interface information 40. As another example, the application processing module 34 interprets the wireless messages 1 as the format of the CAN data 114 utilizing the CAN bus industry standard to produce the second location information, when the portable computing device 122 encodes the second location information utilizing the CAN bus industry standard.

Having received the first and second location information, the drive unit 120 integrates the first and second location information into composite location information (e.g., location information 388 of FIG. 20B) as part of the agricultural data. The receiving of the first and second location information and producing of the composite location information is discussed in greater detail with reference to FIGS. 20A-C.

Having produced the agricultural data, the drive unit 120 determines a filtering constraint based on one or more parameters selected from a plurality of lists of agricultural parameters. The plurality of lists of agricultural parameters includes two or more of a list of crop cycle parameters, a list of types of agricultural prescription parameters, and a list of types of farm equipment. The list of crop cycle parameters includes one or more of a planting cycle, a harvesting cycle, a tending cycle, a fertilizing cycle, a watering cycle, and a weeding cycle. The list of types of agricultural prescription parameters includes one or more of a planting plan, a speed plan, a fertilizing plan, a watering plan, a weeding plan, and a harvesting plan (e.g., each plan may include a geographic location, a pattern of traversal of the geographic location, a distribution pattern, a volume of distribution specification, and a schedule). The list of types of farm equipment includes one or more of planting equipment, a tractor, fertilizing equipment, watering equipment, weeding equipment, and harvesting equipment, etc.

The selecting the one or more parameters may include the drive unit 120 receiving, via the second interface 126 of the drive unit 120, an instruction to collect a particular type of data. For example, the computing unit 26 receives a wireless message 1 that includes the instruction to collect the particular data from the Bluetooth wireless location modem 1, where the Bluetooth wireless communication modem 1 receives Bluetooth wireless communication signals 116 that includes the instruction from the user device 2-1C, and where the user device 2-1C receives 4G wireless communication signals 118 that includes the instruction. Having received the instruction, the drive unit 120 selects the one or more parameters based on the instruction. For example, the application processing module 34 includes the planting cycle, the planting plan, and the planting equipment parameters in the filtering constraint when the received instruction includes a gather planting information instruction.

Having determined the filtering constraint, the drive unit 120 filters the agricultural data based on the filtering constraint to produce filtered agricultural data. For example, the application processing module 34 retrieves the agricultural data from the memory 58 and filters the agricultural data using the planting parameters to produce the filtered agricultural data with regards to the planting information.

Having produced the filtered agricultural data, the drive unit 120 determines processing of the filtered agricultural data. The processing of the filtered agricultural data includes processing of the filtered agricultural data by the drive unit 120 and/or processing of the filtered agricultural data by a host server (e.g., the application unit 16). The determining may be based on one or more of a received instruction, a value of a portion of the filtered agricultural data (e.g., a comparison of the value to a value threshold is favorable to trigger the processing determining), an ability level of the user device 2-1A to execute a modified agricultural prescription versus an existing agricultural prescription, and a level of a number of further farm equipment required to execute the existing agricultural prescription. For example, the drive unit 120 determines to process the filtered agricultural data locally (e.g., by the drive unit 120) when a change to the existing agricultural prescription is feasible. As another example, the drive unit 120 determines to have the filtered agricultural data processed by the host server (e.g., the application unit 16 of FIG. 12A) when the existing agricultural prescription includes an indicator for the host server to modify existing agricultural prescriptions.

Having determined the processing of the filtered agricultural data, the drive unit 120 facilitates the executing of the processing of the filtered agricultural data. As an example of determining the processing of the filtered agricultural data and the executing the processing of the filtered agricultural data, the application processing module 34 determines that the filtered agricultural data is to be processed by the drive unit 120 for modifying the existing agricultural prescription, modifies the existing agricultural prescription in accordance with the filtered agricultural data to produce the modified agricultural prescription, and outputs, via the first interface 124 of the drive unit 120, the modified agricultural prescription to the farm equipment (e.g., sends the modified agricultural prescription and/or steps associated with the modified agricultural prescription to the user device 2-1A encoded as CAN data 114).

As another example of the determining the processing of the filtered agricultural data and the executing the processing of the filtered agricultural data, the application processing module 34 determines that the filtered agricultural data is to be processed by the host server, and outputs, via the second interface 126 of the drive unit 120, the filtered agricultural data to the host server (e.g., generates wireless messages 1 to include the filtered agricultural data, the Bluetooth wireless communication modem 1 sends Bluetooth wireless communication signals 116 that includes the filtered agricultural data to the user device 2-1C, the user device 2-1C sends 4G wireless location signals 118 that includes the filtered agricultural data to the host server).

Having sent the filtered agricultural prescription, the drive unit 120 receives, via the second interface 126 of the drive unit 120, a new agricultural prescription or a modified agricultural prescription from the host server (e.g., the application processing module 34 receives further wireless messages 1 that includes the modified agricultural prescription), and outputs, via the first interface 124 of the drive unit 120, the new agricultural prescription or the modified agricultural prescription to the farm equipment (e.g., using the interface information 40 to the CAN bus interface 110 and encoded as CAN data 114 to the user device 2-1A).

Figure 12C:
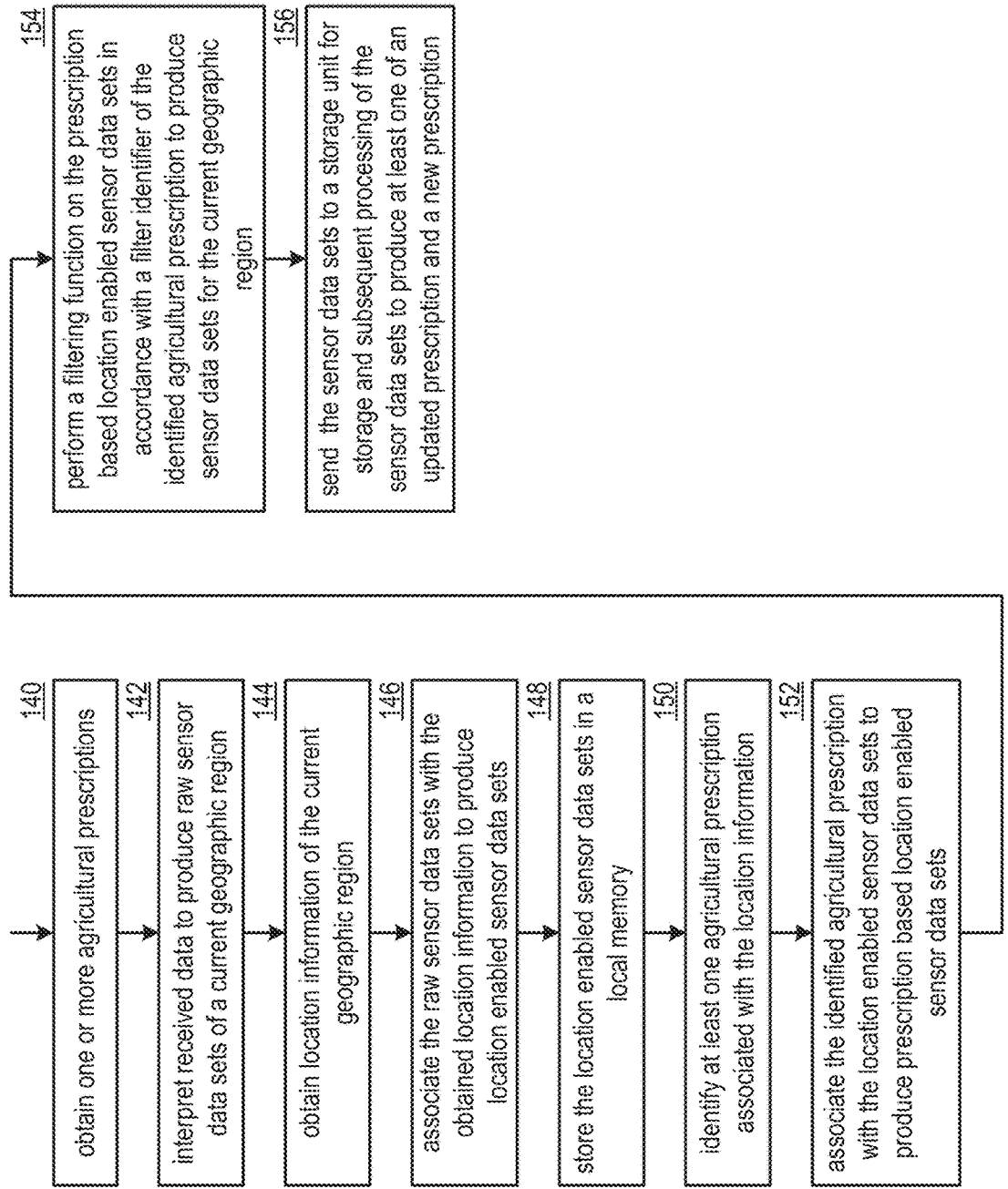
FIG. 12C is a flowchart illustrating an example of collecting data to generate an agricultural prescription in accordance with the present invention.

FIG. 12C is a flowchart illustrating an example of collecting data to generate an agricultural prescription. The method begins or continues at step 140 where a processing module (e.g., of a user device) obtains one or more agricultural prescriptions. The obtaining includes at least one of initiating a query, receiving a query response, and autonomously receiving the one or more agricultural prescriptions. The method continues at step 142 where the processing module interprets received data to produce raw sensor data sets of a current geographic region. For example, the processing module converts received data into information using an associated protocol standard.

The method continues at step 144 where the processing module obtains location information of the current geographic region. As a specific example, the processing module interprets the received data to extract UTC and location coordinates. As another specific example, the processing module interprets received wireless location signals to produce the UTC and location coordinates.

The method continues at step 146 where the processing module associates the raw sensor data sets with the obtained location information to produce location enabled sensor data sets. As a specific example, the processing module attaches time tags of time arrival and location coordinates to portions of the raw sensor data set to produce the location enabled sensor data sets. The method continues at step 148 where the processing module stores the location enabled sensor data sets available memory.

The method continues at step 150 where the processing module identifies at least one agricultural prescription associated with the location information. As a specific example, the processing module identifies a region of the prescription that substantially matches a region of the location information. The method continues at step 152 where the processing module associates the identified agricultural prescription with the location enabled sensor data sets to produce prescription based location enabled sensor data sets. As a specific example, the processing module tags the location enabled sensor data sets with an identifier of the identified agricultural prescription.

The method continues at step 154 where the processing module performs a filtering function on the prescription based location enabled sensor data sets in accordance with a filter identifier of the identified agricultural prescription to produce sensory data sets for the current geographic location. As a specific example, the processing module identifies portions of the data associated with the agricultural prescription and discards remaining portions.

The method continues at step 156 where the processing module sends the sensor data sets to a storage unit for storage and subsequent processing of the sensor data sets to produce at least one of an updated prescription and a new prescription. As a specific example, the processing module sends the sensor data sets via a wireless link to another user device for retransmission, via a wireless network, to the storage unit. As another specific example, the processing module sends, via a wireline connection, the sensor data sets to yet another user device for retransmission to the storage unit.

FIG. 12D is a flowchart illustrating another example of collecting data to generate an agricultural prescription. In particular, a method is presented for use in conjunction with one or more functions and features described in conjunction with FIGS. 1-11, 12A-C, and also FIG. 12D. The method begins at step 160 where a processing module of one or more processing modules of a drive unit and/or of one or more computing devices affiliated with farm equipment receives (e.g., via a first interface of the drive unit) data from the farm equipment to produce agricultural data. The producing of the agricultural data may include the processing module receiving (e.g., via a second interface of the drive unit) additional data from a portable computing device (e.g., a smart phone carried by a farm equipment operator, a laptop) and integrating the additional data with the data to produce the agricultural data. The producing of the agricultural data may further include the processing module receiving (e.g., via the first interface of the drive unit) first location information from the farm equipment, receiving (e.g., via the second interface of the drive unit) second location information from the portable computing device, and integrating the first and second location information into composite location information.

The method continues at step 162 where the processing module determines a filtering constraint based on one or more parameters selected from a plurality of lists of agricultural parameters. The selecting the one or more parameters may include the processing module receiving (e.g., via a second interface of the drive unit) an instruction to collect a particular type of data and selecting the one or more parameters based on the instruction. The method continues at step 164 where the processing module filters the agricultural data based on the filtering constraint to produce filtered agricultural data.

The method continues at step 166 where the processing module determines processing of the filtered agricultural data. As an example of the determining the processing of the filtered agricultural data, the processing module determines that the filtered agricultural data is to be processed by the drive unit for modifying an existing agricultural prescription. As another example of the determining the processing of the filtered agricultural data, the processing module determines that the filtered agricultural data is to be processed by a host server. The method branches to step 172 when the processing module determines that the filtered agricultural data is to be processed by the host server. The method continues to step 168 when the processing module determines that the filtered agricultural data is to be processed by the drive unit.

When determining that the filtered agricultural data is to be processed by the drive unit for modifying the existing agricultural prescription, the method continues at step 168 where the processing module initiates execution of the processing of the filtered agricultural data by modifying the existing agricultural prescription in accordance with the filtered agricultural data to produce a modified agricultural prescription. The method continues at step 170 where the processing module outputs (e.g., via the first interface of the drive unit) the modified agricultural prescription to the farm equipment.

When determining that the filtered agricultural data is to be processed by a host server, the method continues at step 172 where the processing module initiates the execution of the processing of the filtered agricultural data by outputting (e.g., via the second interface of the drive unit) the filtered agricultural data to the computing device (e.g., for processing by one or more of the computing device as the host server and another remote computing device as the host server). The method continues at step 174 where the processing module receives (e.g., via the second interface of the drive unit) a new agricultural prescription or a modified agricultural prescription. The method continues at step 176 where the processing module outputs (e.g., via the first interface of the drive unit) the new agricultural prescription or the modified agricultural prescription to the farm equipment.

The method described above in conjunction with the processing module can alternatively be performed by other modules of the one or more computing devices affiliated with the farm equipment or by other devices associated with general agricultural equipment. In addition, at least one memory section (e.g., a non-transitory computer readable storage medium) that stores operational instructions can, when executed by one or more processing modules of the one or more computing devices affiliated with the farm equipment, cause the one or more computing devices to perform any or all of the method steps described above.

FIG. 13A is a schematic block diagram of another embodiment of a computing system that includes the geographic region 1 of FIG. 1, the wireless communication network 1 of FIG. 1, the network 24 of FIG. 1, the user device 14 of FIG. 5, the application unit 16 of FIG. 5, and the storage unit 36 of FIG. 5. The user device 14, the application unit 16, and the storage unit 36 includes the application processing module 34 of FIG. 5. The storage unit 36 further includes the memory 58 of FIG. 5. The geographic region 1 includes associated user devices 1-1A, and 1-1C of FIG. 1, with actuator set 1A and associated user devices 1-2A, and 1-2C of FIG. 1, with actuator set 2A. The geographic region 1 may include further associations of user devices and actuators. The user device 1-1A traverses portions of drive paths 1, 2, and 3 with a velocity of A within the geographic region 1 in accordance with an agricultural prescription 1A and the user device 1-2A traverses portions of drive paths 2 and 3 with a velocity of B within the geographic region 1 in accordance with an agricultural prescription 2A. The agricultural prescriptions 1A and 2A are discussed in greater detail with reference to FIG. 13B.

The computing system is operable to update resource assignments associated with an agricultural prescription. In an example of operation of the updating of the resource assignments, the application unit 16 generates the agricultural prescriptions 1A and 2A based on data records 1 and guidance 72 from the user device 14, where the agricultural prescriptions includes action data that includes a plurality of steps to be executed by at least one of user devices 1-1A and 1-2A. The data records 1 include historical sensor data sets for region 1, received from resources associated with geographic region 1.

Having generated the prescriptions, the application unit 16 determines an availability level of resources (e.g., tractor availability, combine availability, fertilizer applicator availability, and task execution capacity level for resources) for assignment of portions of the agricultural prescriptions. The determining may be based on one or more of initiating a query, interpreting the received query response, performing a lookup, interpreting a schedule, and estimating. Having determined the availability level, the application unit 16 selects one or more resources based on the availability levels (e.g., prioritizes selection of resources associated with the most favorable availability levels).

For each selected resource, the application unit 16 assigned to a portion of the agricultural prescription, where each portion of the agricultural prescription includes a schedule for at least some of the plurality of steps and schedule time frames for at least some of the steps. For example, the application unit partitions the plurality of steps between the resources based on the availability levels and sends the assigned portions of the steps to the resources. For instance, the application unit sends the prescriptions 1A and 2A, via the network 24 and the wireless communication network 1, to the user devices 1-1A and 1-2A.

While the resources are executing the agricultural prescription, the application unit 16 monitors subsequently generated data records from the assigned resources. For example, the application unit receives data records 1 that includes subsequent sensor data sets for region 1. For instance, user device 1-1A sends sensor data sets as steps are executed along one or more of the drive paths 1-3.

When a time difference between actual execution of a subset of steps and scheduled execution of the subset of steps exceeds a time threshold, the application unit 16 updates the availability level of the resources. For example, the application unit 16 detects unfavorable schedule adherence (e.g., too far behind schedule, too far ahead of schedule, unnecessarily idling) by the user device 1-1A while executing the steps of the prescription 1-A. The application unit 16 may issue an analysis summary 78 that includes a schedule adherence alert, via the network 24, to the user device 14 (e.g., associated with a farm foreman).

Having updated the availability level of the resources, the application unit 16 re-assigns un-executed portions of the agricultural prescription to produce updated prescriptions based on the updated availability level of the resources. For example, the application unit 16 re-partitions remaining steps based on the updated availability levels and sends the re-assigned remaining steps to the assigned resources. For instance, the application unit moves steps associated with drive paths 2 and 3 from assignment with user device 1-1A over to user device 1-2A. Having produced the updated prescriptions, the application unit 16 sends the updated prescriptions to the user devices 1-1A and 1-2A for subsequent execution.

FIGS. 13B-C are a diagram of agricultural prescription resource mapping where the prescriptions 1A and 2A include initially assigned action data for user devices 1-1A and 1-2A in accordance with the agricultural prescription. For example, the user device 1-1A is assigned to perform action data 1,1, 1,2, 1,3 along drive path 1, action data 2,1 and 2,2 along drive path 2, and action data 3,4 along drive path 3 while user device 1-2A is assigned to perform further action data 2,3, 2,4, and 2,5 along the drive path 2 and further action data 3,1, 3,2, and 3,3 along the drive path 3.

FIG. 13B illustrates an example of operation, the user device 1-1A falls behind schedule while executing the assigned tasks along the drive paths 1-3 and reports sensor data to the application unit of FIG. 13A, where the sensor data includes task execution indications. The user device 1-2A performs tasks of prescription 2A in accordance with scheduled time frames and reports sensor data to the application unit.

FIG. 13C illustrates the reassignment of schedule tasks based on updated resource availability. For example, the prescription 1A is modified to discard the action data steps associated with drive paths 2 and 3 while the prescription 2A is modified to add the action steps discarded from the prescription 1A such that the user device 1-2A is assigned to execution of the action steps for drive paths 2 and 3.

FIG. 13D is a flowchart illustrating an example of updating resource assignments. The method begins or continues at step 180 where a processing module (e.g., of an application unit) generates an agricultural prescription based on obtained data records and guidance. For example, the application unit obtains the data records from a storage unit, where the data records includes sensor data associated with a geographic region. The application unit analyzes the data records in accordance with received guidance to produce an analysis. The application unit summarizes the analysis based on a historical summary for the geographic region. The application unit generates the prescription based on the analysis summary, the guidance, and the historical summary, where the prescription includes a plurality of steps and a schedule of time frames associated with the steps. The application unit stores the agricultural prescription.

The method continues at step 182 where the processing module determines a level of availability of resources for assignment of portions of the agricultural prescription. For example, the processing module identifies resources associated with the geographic region, and, for each identified resource, the processing module determines a task execution capacity level as the level of availability for the resource, where the task execution capacity level is associated with a task type of the agricultural prescription.

For each resource, the method continues at step 184 where the processing module assigns a portion of the agricultural prescription where each portion includes an execution schedule for steps associated with the portion. For example, the processing module identifies the portion of the agricultural prescription that includes a group of associated steps (e.g., of a common sub-geographic region, for a common task type), determines goals for execution of steps of the agricultural prescription (e.g., to adhere to a schedule, to be achieved under a maximum cost level, to be achieved utilizing the available materials, and to be achieved utilizing the available resources), allocates the portion to one or more of the resources based on the associated level of availability of the resources that optimizes the achievement of the desired goals, issues the assigned portions of the agricultural prescription to the resource (e.g., sends a schedule of steps to a tractor), and stores the assignments.

While the resources are executing the agricultural prescription, the method continues at step 186 where the processing module monitors subsequent data records generated by the resources. For example, the processing module receives sensor data sets directly from the resources. As another example, the processing module recovers stored data records from the storage unit that includes recent sensor data sets associated with the executing of the agricultural prescription.

The method continues at step 188 where the processing module detects an unfavorable schedule adherence based on the subsequent data records. For example, the processing module interprets the subsequent data records to identify actual execution of steps, compares the actual execution to the execution schedule for the steps associated with the agricultural prescription to produce a difference, and indicates unfavorable schedule adherence when the difference is greater than a difference threshold level (e.g., behind schedule, ahead of schedule). As another example, the processing module detects an unfavorable goal adherence for goals unrelated to the time schedule (e.g., too costly, too many raw materials being utilized, etc.).

The method continues at step 190 where the processing module determines an updated level of availability of the resources. For example, for each identified resource, the processing module re-determines the task execution capacity level as the level of availability for the resource. For instance, a resource may be idling even though it has many unexecuted pending tasks. As another instance, another resource may have completed all tasks.

The method continues at step 192 where the processing module re-assigns one or more unexecuted portions of the agricultural prescription based on the updated level of availability of the resources. For example, the processing module identifies the unexecuted portion of the agricultural prescription associated with the unfavorable schedule adherence, determines goals for execution of the steps of the agricultural prescription, re-allocates the portion to one or more of the resources based on the associated level of availability of the resources that optimizes the achievement of the desired goals, issues re-assigned portions of the agricultural prescription to the resources (e.g., send an up to date schedule of steps to another tractor), and stores the updated assignments.

FIG. 14A is a schematic block diagram of another embodiment of a computing system that includes the geographic region 1 of FIG. 1, the wireless communication network 1 of FIG. 1, the network 24 of FIG. 1, the user 14 device of FIG. 5, the application unit 16 of FIG. 5, and the storage unit 36 of FIG. 5. The geographic region 1 includes associated user devices 1-1A, and 1-1C of FIG. 1, with a combine actuator set 1A. The geographic region 1 may further include a user device 1-1B to provide communication and processing of information between the user device 1-1C and the user device 1-1A in a similar fashion as user device 2-1B provides processing and communication between user devices 2-1C and 2-1A of FIG. 12A. The user device 1-1A includes sensors 190, the application processing module 34 of FIG. 4, and the wireless communication modem 1 of FIG. 4. The sensors 190 include at least some of the sensors 1-7 of FIG. 7. The user device 1-1A traverses portions of a drive path 1 within the geographic region 1 in accordance with an agricultural prescription 1.

The computing system is operable to identify an unfavorable crop harvesting output level. In an example of operation of the identifying of the unfavorable crop harvesting output level, the user device 1-1A facilitates execution of the prescription 1 with regards to combining a crop for harvesting. For example, the user device 1-1A receives the prescription 1 from the wireless communication modem 1, where the application unit 16 sends, via the network 24, the prescription 1 to the wireless communication network 1, where the wireless communication network 1 sends wireless communication signals 42, that includes the prescription 1, to the user device 1-1C, and where the user device 1-1C issues further wireless communication signals 42, that includes the prescription 1, to the wireless communication modem 1.

Having received the prescription 1, the application processing module 34 of the user device 1-1A issues control information 196 to the combine actuator set 1A based on the prescription 1. The control information 196 may include one or more settings for the combine. The settings include one or more of chaffer position, sieve position, concave spacing, and thresher revolutions per minute (RPM). The combine actuator set 1A may further operate in accordance with local settings 194 provided by an operator of the combine. As such, the combine operates in accordance with one or more of the local settings 194 and the control information 196.

Having issued the control information 196 to the combine actuator set 1A, the application processing module 34 interprets sensor data 192 from the sensors 190 and combine status 198 to generate output data 200 and waste data 202. The output data 200 includes a rate of crops produced (e.g., by count, by volume, by weight). The waste data 202 includes a rate of crops wasted. The application processing module 34 sends one or more of the sensor data 192, the output data 200, and the waste data 202 as data sets for region 1 to the storage unit 36 for storage in the memory 58 and subsequent delivery as data records 1 to the application unit 16 for further processing.

When the output data 200 compares unfavorably to expected output data of the prescription 1 and/or when the waste data 202 compares unfavorably to expected waste data of the prescription 1, the application processing module 34 of the user device 1-1A facilitates corrective action. The facilitating includes selecting the action and executing the selected action. The selecting may be based on one or more of a predetermination, instructions extracted from the prescription 1, guidance 72 from the user device 14, and a magnitude level of the unfavorable comparison. The actions includes identifying a settings template 204 based on the local settings 194, issuing a settings alert 206 to one or more of the user device 14 and the storage unit 36, and executing another prescription (e.g., prescription 2) received from the application unit 16 and/or determined by the user device 1-1A based on the prescription 1. For example, the prescription 2 may include corrective action to override the local settings 194 with new control information 196 to optimize the output data 200 and waste data 202.

FIG. 14B is a flowchart illustrating an example of identifying an unfavorable crop harvesting output level. The method begins or continues at step 210 where a processing module (e.g., of an agricultural resource user device) facilitates execution of an agricultural prescription within a local resource that includes a combine to harvest crops. For example, the processing module issues control information to a combine actuator based on the agricultural prescription.

While executing the agricultural prescription, the method continues at step 212 where the processing module interprets sensor data and combine status to generate output data and waste data associated with harvesting crops. The interpreting includes determining a level of crop output as the output data based on the combine status in the sensor data and determining a level of crop waste as the waste data based on the combine status in the sensor data.

The method continues at step 214 where the processing module detects an unfavorable comparison of the output data and the waste data with expected output data and expected waste data of the agricultural prescription. For example, the processing module extracts the expected output data and the expected waste data from the agricultural prescription, compares the output data to the expected output data, compares the expected waste data to the waste data, and indicates the unfavorable comparison when a difference of either comparison is greater than a difference threshold level (e.g., too little crop output, too much waste).

The method continues at step 216 where the processing module identifies a settings template based on local settings of the combine. For example, the processing module receives the local settings from the combine and compares the received local settings to a plurality of settings templates to identify the settings template.

The method continues at step 218 where the processing module issues a settings alert that includes the settings template to a managing user device. For example, the processing module generates the settings alert to include one or more of the settings template and the difference of the unfavorable comparison.

The method continues at step 220 where the processing module obtains an updated agricultural prescription. For example, the processing module sends one or more of the output data and the waste data to an application unit and receives the updated agricultural prescription. As another example, the processing module generates the updated agricultural prescription based on one or more of the agricultural prescription, the output data, the waste data, and the sensor data. For instance, the processing module generates updated control information to affect one or more settings of the combine to improve output and reduce waste.

The method continues at step 222 where the processing module facilitates execution of the updated agricultural prescription within the local resource. For example, the processing module overwrites local settings with the updated control information of the updated agricultural prescription.

FIG. 15A is a schematic block diagram of another embodiment of a computing system that includes the geographic region 1 of FIG. 1, the wireless communication network 1 of FIG. 1, the network 24 of FIG. 1, the user device 14 of FIG. 5, the application unit 16 of FIG. 5, and the storage unit 36 of FIG. 5. The geographic region 1 includes associated user devices 1-1A, and 1-1C of FIG. 1, with a planter actuator set 1A. The geographic region 1 may further include a user device 1-1B to provide communication and processing of information between the user device 1-1C and the user device 1-1A in a similar fashion as user device 2-1B provides processing and communication between user devices 2-1C and 2-1A of FIG. 12A. The user device 1-1A includes sensors 190, the application processing module 34 of FIG. 4, and the wireless communication modem 1 of FIG. 4. The sensors 190 include at least some of the sensors 1-7 of FIG. 7. The user device 1-1A traverses portions of a drive path 1 within the geographic region 1 in accordance with an agricultural prescription 1.

The computing system is operable to identify an unfavorable crop planting level. In an example of operation of the identifying of the unfavorable crop planting level, the user device 1-1A facilitates execution of the prescription 1 with regards to planting a crop. For example, the user device 1-1A receives the prescription 1 from the wireless communication modem 1, where the application unit 16 sends, via the network 24, the prescription 1 to the wireless communication network 1, where the wireless communication network 1 sends wireless communication signals 42, that includes the prescription 1, to the user device 1-1C, and where the user device 1-1C issues further wireless communication signals 42, that includes the prescription 1, to the wireless communication modem 1.

Having received the prescription 1, the application processing module 34 of the user device 1-1A issues control information 242 to the planter actuator set 1A based on the prescription 1. The control information 242 may include one or more settings for the planter. The settings include one or more of population, speed, depth, and downforce pressure. The planter actuator set 1A may further operate in accordance with local settings 240 provided by an operator of the planter. As such, the planter operates in accordance with one or more of the local settings 240 and the control information 242.

Having issued the control information 242 to the planter actuator set 1A, the application processing module 34 interprets sensor data 192 of the sensors 190 and planter status 244 to generate error data 246. The error data 246 includes a difference between actual in desired planting rates. The application processing module 34 sends one or more of the sensor data 192 and the error data 246 as data sets for region 1 to the storage unit 36 for storage and subsequent delivery as data records 1 to the application unit 16 for further processing.

When the error data 246 compares unfavorably to expected error data of the prescription 1, the application processing module 34 of the user device 1-1A facilitates corrective action. The facilitating includes selecting the action and executing the selected action. The selecting may be based on one or more of a predetermination, instructions extracted from the prescription 1, guidance 72 from the user device 14, and a magnitude level of the unfavorable comparison. The actions includes identifying a settings template 248 based on the local settings 240, issuing a settings alert 250 to one or more of the user device 14 and the storage unit 36, and executing another prescription (e.g., prescription 2) received from the application unit 16 and/or determined by the user device 1-1A based on the prescription 1. For example, the prescription 2 may include corrective action to override the local settings 240 with new control information 242 to optimize the error data 246.

FIG. 15B is a flowchart illustrating an example of identifying an unfavorable crop planting level. The method begins or continues at step 260 where a processing module (e.g., of an agricultural resource user device) facilitates execution of an agricultural prescription within a local resource that includes a planter to plant crops. For example, the processing module issues control information to a planter actuator based on the agricultural prescription.

While executing the agricultural prescription, the method continues at step 262 where the processing module interprets sensor data and planter status to generate error data associated with planting crops. The interpreting includes determining a level of crop planting based on the planter status and the sensor data and determining a difference between the level of crop planting and a desired level of crop planting from the agricultural prescription as the error data.

The method continues at step 264 where the processing module detects an unfavorable comparison of the error data with expected error data of the agricultural prescription. For example, the processing module extracts the expected error data from the agricultural prescription, compares the error data to the expected error data, and indicates the unfavorable comparison when a difference of the comparison is greater than a difference threshold level (e.g., too little crop planted, too much crop planted).

The method continues at step 266 where the processing module identifies a settings template based on local settings of the planter. For example, the processing module receives the local settings from the planter and compares the received local settings to a plurality of settings templates to identify the settings template.

The method continues at step 268 where the processing module issues a settings alert that includes the settings template to a managing user device. For example, the processing module generates the settings alert to include one or more of the settings template and the difference of the unfavorable comparison.

The method continues at step 270 where the processing module obtains an updated agricultural prescription. For example, the processing module sends the error data to the application unit and receives the updated agricultural prescription. As another example, the processing module generates the updated agricultural prescription based on one or more of the agricultural prescription, the error data, and the sensor data. For instance, the processing module generates updated control information to affect one or more settings of the planter to improve planting accuracy.

The method continues at step 272 where the processing module facilitates execution of the updated agricultural prescription within the local resource. For example, the processing module overwrites local settings with the updated control information of the updated agricultural prescription.

FIG. 16A is a schematic block diagram of another embodiment of a computing system that includes the geographic region 1 of FIG. 1, the wireless communication network 1 of FIG. 1, the network 24 of FIG. 1, the user device 14 of FIG. 5, the application unit 16 of FIG. 5, and the storage unit 36 of FIG. 5. The geographic region 1 includes associated user devices 1-1A, and 1-1C of FIG. 1, with an applicator actuator set 1A. The geographic region 1 may further include a user device 1-1B to provide communication and processing of information between the user device 1-1C and the user device 1-1A in a similar fashion as user device 2-1B provides processing and communication between user devices 2-1C and 2-1A of FIG. 12A. The user device 1-1A includes sensors 190, the application processing module 34 of FIG. 4, and the wireless communication modem 1 of FIG. 4. The sensors 190 include at least some of the sensors 1-7 of FIG. 7. The user device 1-1A traverses portions of a drive path 1 within the geographic region 1 in accordance with an agricultural prescription 1.

The computing system is operable to identify an unfavorable applicant application level. The applicant includes any one of a solid, a liquid, and a gas applied to one or more portions of a geographic region associated with an agricultural lifecycle. Examples of the applicant includes fertilizer, fungicide, pesticide, and water. In an example of operation of the identifying of the unfavorable applicant application level, the user device 1-1A facilitates execution of the prescription 1 with regards to applying the applicant. For example, the user device 1-1A receives the prescription 1 from the wireless communication modem 1, where the application unit sends, via the network 24, the prescription 1 to the wireless communication network 1, where the wireless communication network 1 sends wireless communication signals 42, that includes the prescription 1, to the user device 1-1C, and where the user device 1-1C issues further wireless communication signals 42, that includes the prescription 1, to the wireless communication modem 1.

Having received the prescription 1, the application processing module 34 of the user device 1-1A issues control information 282 to the applicator actuator set 1A based on the prescription 1. The control information 282 may include one or more settings for the applicator. The settings includes one or more of the volume of applicant per unit of area, volume of applicant per linear distance, speed, and volume of applicant applied over a given time frame. The planter actuator set 1A may further operate in accordance with local settings 280 provided by an operator of the applicator. As such, the applicator operates in accordance with one or more of the local settings 280 and the control information 282.

Having issued the control information 282 to the applicator actuator set 1A, the application processing module 34 interprets sensor data 192 from the sensors 190 and applicator status 284 to generate error data. The error data 286 includes a difference between actual and desired application rates. The application processing module 34 sends one or more of the sensor data 192 and the error data 286 as data sets for region 1 to the storage unit 36 for storage in the memory 58 and subsequent delivery as data records 1 to the application unit 16 for further processing.

When the error data 286 compares unfavorably to expected error data of the prescription 1, the application processing module 34 of the user device 1-1A facilitates corrective action. The facilitating includes selecting the action and executing the selected action. The selecting may be based on one or more of a predetermination, instructions extracted from the prescription 1, guidance 72 from the user device 14, and a magnitude level of the unfavorable comparison. The actions includes identifying a settings template 288 based on the local settings 280, issuing a settings alert 290 to one or more of the user device 14 and the storage unit 36, and executing another prescription (e.g., prescription 2) received from the application unit 16 and/or determined by the user device 1-1A based on the prescription 1. For example, the prescription 2 may include corrective action to override the local settings 280 with new control information 282 to optimize the error data 286.

FIG. 16B is a flowchart illustrating an example of identifying an unfavorable applicant application level. The method begins or continues at step 300 where a processing module (e.g., of an agricultural resource user device) facilitates execution of an agricultural prescription within a local resource that includes an applicator to apply the applicant. For example, the processing module issues control information to an applicator actuator based on the agricultural prescription.

While executing the agricultural prescription, the method continues at step 302 where the processing module interprets sensor data and applicator status to generate error data associated with applying the applicant. The interpreting includes determining a level of application of the applicant based on the applicator status and the sensor data, and determining a difference between the level of application of the applicant and a desired level of application of the applicant from the agricultural prescription as the error data.

The method continues at step 304 where the processing module detects an unfavorable comparison of the error data with expected error data of the agricultural prescription. For example, the processing module extracts the expected error data from the agricultural prescription, compares the error data to the expected error data, and indicates the unfavorable comparison when a difference of the comparison is greater than a difference threshold level (e.g., too little applicant applied, too much applicant applied).

The method continues at step 306 where the processing module identifies a settings template based on local settings of the applicator. For example, the processing module receives the local settings from the applicator and compares the received local settings to a plurality of settings templates to identify the settings template.

The method continues at step 308 where the processing module issues a settings alert that includes the settings template to a managing user device. For example, the processing module generates the settings alert to include one or more of the settings template and the difference of the unfavorable comparison.

The method continues at step 310 where the processing module obtains an updated agricultural prescription. For example, the processing module sends the error data to the application unit and receives the updated agricultural prescription. As another example, the processing module generates the updated agricultural prescription based on one or more of the agricultural prescription, the error data, and the sensor data. For instance, the processing module generates updated control information to affect one or more settings of the applicator to improve applicant application accuracy.

The method continues at step 312 where the processing module facilitates execution of the updated agricultural prescription within the local resource. For example, the processing module overwrites local settings with the updated control information of the updated agricultural prescription.

FIG. 17A is a schematic block diagram of another embodiment of a computing system that includes the geographic region 1 of FIG. 1, the wireless communication network 1 of FIG. 1, the network 24 of FIG. 1, the user device 14 of FIG. 5, the application unit 16 of FIG. 5, and the storage unit 36 of FIG. 5. The geographic region 1 includes associated user devices 1-1A, and 1-1C of FIG. 1, with a sensors set 1A, an actuator set 1A, and an auxiliary resource 1A. The auxiliary resource 1A includes an agricultural lifecycle resource. Examples of the auxiliary resource includes a grain cart, a crop wagon, and a fertilizer container trailer. The geographic region 1 further includes associated user devices 1-2A, and 1-2C of FIG. 1, with a sensors set 2A and a tillage actuator set 2A. The geographic region 1 may further include a user device 1-1B to provide communication and processing of information between the user device 1-1C and the user device 1-1A in a similar fashion as user device 2-1B provides processing and communication between user devices 2-1C and 2-1A of FIG. 12A. The sensors sets 1A and 2A include at least some of the sensors 1-7 of FIG. 7. The user devices 1-1A and 1-2A traverse portions of a drive path 1 within the geographic region 1 with respect to velocities A and B in accordance with one or more agricultural prescriptions.

The computing system is operable to generate a tillage agricultural prescription. In an example of operation of the generating of the tillage agricultural prescription, the application processing module 34 of the application unit 16 (e.g., hereafter referred to interchangeably as the application unit) obtains data records 1 for the geographic region 1, where the data records 1 includes auxiliary data 1 and sensor data 1 from the user device 1-1A.

The auxiliary data 1 includes one or more of an auxiliary resource type indicator (e.g., grain cart vs. crop wagon, etc.), an estimated weight of the auxiliary resource (e.g., in kilograms, in pounds; at different times, and average over a time frame), a tire pattern (e.g., number of tires, tire width, separation between adjacent tires, separation between front and rear tires, etc.), and an estimated soil compaction level (e.g., as a function of the auxiliary resource type, the estimated weight, the tire pattern, and estimated rainfall volume and timing).

In an example of obtaining the auxiliary data 1, the application unit 16 receives data records 1 from the storage unit 36, where the storage unit 36 receives the auxiliary data 1, via the network 24 from the wireless communication network 1, where the wireless communication network receives wireless communication signals 42 from the user device 1-1C, and where the wireless communication signals 42 includes the auxiliary data 1. Having obtained the data records 1, the application unit 16 identifies a plurality of geographic region traversals by one or more auxiliary resources based on the auxiliary data 1. For example, the application unit 16 identifies the number of traversals by the user device 1-1A along the drive path 1, where each traversal includes the auxiliary resource 1A.

For each traversal, the application unit 16 estimates a level of soil impact (e.g., compaction of the soil). The estimating may be based on one or more of the auxiliary resource type, the estimated weight, the tire pattern, and the estimated soil compaction level when available. As a specific example, the application processing module 34 of the application unit 16 applies a deterministic function (e.g., a hashing function, a hash-based message authentication code, a sponge function, a logical function, a mask generating function) to the auxiliary resource type, the estimated weight, and the tire pattern to produce the estimated level of soil impact along the drive path 1. As another specific example, the application processing module 34 of the application unit 16 performs a table lookup based on the auxiliary resource type, the estimated weight, and the tire pattern to produce the estimated level of soil impact along the drive path 1.

Having generated the estimated level of soil impact levels for each traversal, the application unit generates an aggregate level of soil impact based on the plurality of traversals. For example, the application processing module 34 of the application unit 16 applies a further deterministic function to each of the estimated levels of soil impact for each traversal to produce the aggregate level of soil impact.

Having generated the aggregate level of soil impact, the application unit 16 generates a tillage prescription 1 based on the aggregate level of soil impact in one or more of guidance 72 from the user device 14 (e.g., a desired level of soil compaction after tillage), the sensor data, historical summaries, and rainfall level information (e.g., where more rainfall lessons the compaction in accordance with a rainfall compaction impact estimator). Having generated the tillage prescription 1 the application unit sends, via the network 24 and the wireless communication network 1, the tillage prescription 1 to the user device 1-2A for execution within a geographic region 1 along the drive path 1 with velocity B, where the user device 1-2A issues control information to the tillage actuator set 2A to implement tillage steps in accordance with the aggregate level of soil impact. For example, the tillage steps include utilizing a higher than average level of downforce when the aggregate level of soil impact indicates a higher than average level of soil compaction.

FIG. 17B is a flowchart illustrating an example of generating a tillage agricultural prescription. The method begins or continues at step 320 where a processing module (e.g., of an application unit) obtains agricultural data records for a geographic region, where the records includes auxiliary resource data. For example, the processing module receives the agricultural data records from one or more user devices associated with one or more auxiliary resources. As another example, the processing module receives the agricultural data records from a storage unit in response to issuing a query.

The method continues at step 322 where the processing module identifies a plurality of geographic region traversals by one or more auxiliary resources based on the agricultural data records. For example, the processing module analyzes the agricultural data records to identify sensor data associated with each traversal (e.g., including raw sensor data, GPS coordinates, and timing). For each traversal, the method continues at step 324 where the processing module determines a level of soil impact within the geographic region. For example, the processing module analyzes the auxiliary data associated with the traversal, where the auxiliary data includes a composite of an auxiliary resource type, and estimated weight, and a tire pattern indicator. For instance, the processing module identifies a composite pattern and performs a lookup based on the identified composite pattern to produce the level of soil impact.

The method continues at step 326 where the processing module generates an aggregate level of soil impact based on the plurality of traversals. For example, the processing module determines additive effects of soil impact from each traversal along a common drive path. For instance, the processing module adds a deterministic function to provide the additive effects of a plurality of traversals along the common drive path.

The method continues at step 328 where the processing module generates a tillage prescription based on the aggregate level of soil impact. For example, the processing module generates the tillage prescription based on one or more of a desired level of tillage, the sensor data, historical summaries, and estimated soil moisture based on rainfall information associated with the geographic region. The tillage prescription includes execution steps including one or more of speed, drive path, depth, and a number of traversals along a common drive path. The method continues at step 330 where the processing module issues the tillage prescription to a user device for utilization of one or more tillage execution steps within the geographic region. For example, the processing module sends the tillage prescription to the user device that is assigned to execute steps of the tillage prescription within the geographic region. As another example, the processing module sends the tillage prescription to a managing user device FIG. 18A is a schematic block diagram of another embodiment of a computing system that includes the user device 1-1A of FIG. 1, the sensors set 1A of FIG. 17A, the actuator set 1A of FIG. 13A, the user device 1-1C of FIG. 1, the user device 1-2A of FIG. 1, the sensors set 2A of FIG. 17A, the actuator set 2A of FIG. 13A, the user device 1-2C of FIG. 1, the geographic regions 1-1, 1-2, and 1-3 of geographic region 1 of FIG. 3, the wireless communication network 1 of FIG. 1, the network 24 of FIG. 1, the user device 14 of FIG. 5, the application unit 16 of FIG. 5, and the storage unit 36 of FIG. 5. The computing system may further include a user device 1-1B to provide communication and processing of information between the user device 1-1C and the user device 1-1A in a similar fashion as user device 2-1B provides processing and communication between user devices 2-1C and 2-1A of FIG. 12A. The user device 1-1A traverses a drive path 1 within the geographic regions 1-1 through 1-3 in accordance with one or more agricultural prescriptions.

The computing system is operable to generate a scouting agricultural prescription. In an example of operation of the generating of the scouting of the agricultural prescription, the application processing module 34 of the application unit 16 obtains data records 1 associated with execution of a prescription 1 for one or more portions of a geographic region, where the data records 1 includes one or more of sensor data 1 and historical summaries. Hereafter, the application processing module 34 of the application unit may 16 be interchangeably referred to as the application unit 16. In an example of the obtaining, the application unit 16 receives the data records 1 from the storage unit, where the storage unit receives the sensor data 1, via the network 24, from the wireless communication network 1, where the wireless communication network 1 receives wireless communication signals 42 from the user device 1-1C, where the wireless communication signals 42 includes the sensor data 1, and where the user device 1-1A generates the sensor data 1 based on data from the sensors set 1A as the user device 1-1A executes the prescription 1. The prescription 1 includes execution steps associated with collecting the data within the geographic regions 1-1 through 1-3. The application unit 16 generates the prescription 1 based on previous data records 1 and guidance 72 from the user device 14.

Having obtained the data records 1, the application unit 16 identifies a group of geographic regions associated with similar traits. The traits includes one or more of soil conditions, moisture levels, crop yield rates, soil nutrient levels, geographic proximity, crop types, elevation, and terrain variance. As a specific example, the application unit 16 identifies geographic regions 1-1 through 1-3 as the group of associated regions when the geographic regions 1-1 through 1-3 share common crop types.

Having identified the group of geographic regions with the similar traits, the application unit 16 selects one of the geographic regions for further data collection. The selecting may be based on one or more of a random selection, a round-robin approach, proximity of the geographic region to a farming resource (e.g., to a tractor, a farmer), and availability of the geographic region to the farming resource (e.g., ready for scouting). For example, the application unit 16 selects geographic region 1-3 when a distance between the geographic region 1-3 and the user device 1-2A is favorable (e.g., less than a distance threshold level).

Having selected the geographic region, the application unit 16 facilitates collection of further data 1 from the selected geographic region 1-3. As a specific example, the application unit 16 generates an updated prescription 1 and sends the updated prescription 1 to user device 1-2A (e.g., an available resource within a favorable proximity of the selected geographic region), where the updated prescription 1 indicates to collect data along a drive path 2 within the selected geographic region 1-3. The user device 1-2A collects the further data 1. As a specific example of the collecting of the further data 1, the user device 1-2A collects data from the sensors set 2A as the further data 1 and sends the further data 1 to the application unit 16 (e.g., directly via the wireless communication network 1 and network or indirectly via the storage unit 36 as well). As another specific example of the collecting of the further data 1, the user device 1-2A receives manual data input for the selected geographic region. For instance, a farmer enters crop condition data and soil condition data into at least one of the user device 1-2C and the user device 1-2A after scouting the geographic region 1-3 in accordance with the updated prescription 1 along drive path 2.

Having received the further data 1, the application unit 16 modifies the agricultural prescription 1 to produce a further updated prescription 1 for the group of geographic regions 1-1 through 1-3 based on the further data 1 and the prescription 1. Having produced the further updated prescription 1, the application unit 16 sends the further updated prescription 1 to the user device 1-1A for execution within the geographic regions 1-1 through 1-3.

FIG. 18B is a flowchart illustrating an example of generating a scouting agricultural prescription. The method begins or continues at step 340 where a processing module (e.g., of an application unit) obtains data records for one or more sub-geographic regions while an agricultural prescription is being executed. The data records include one or more of sensor data and historical summaries associated with the one or more sub-geographic regions. Such historical summaries may include one or more of a percentage of weeds killed, number of weeds killed, and timing of one or more growth stages for desired crops. The obtaining includes at least one of receiving the data records from one or more resources and acquiring from a storage unit.

The method continues at step 342 where the processing module identifies a group of sub-geographic regions associated with similar traits. As a specific example, the processing module determines traits of the sub-geographic regions based on the data records and identifies sub-geographic regions associated with common traits where trait values of the common traits compare favorably to each other (e.g., within a trait threshold level).

The method continues at step 344 where the processing module selects one sub-geographic region of the group of sub-geographic regions for further data collection. For example, the processing module identifies traits of a sub-geographic region that compares favorably to trait values of the group of sub-geographic regions.

The method continues at step 346 where the processing module facilitates collection of the further data from the selected sub-geographic region. As a specific example, the processing module issues an updated prescription that includes one or more execution steps to collect further data from a primary user device and/or another user device associated with the selected sub-geographic region, and receives the further data. As another specific example, the processing module retrieves the further data from a storage unit.

The method continues at step 348 where the processing module modifies the agricultural prescription for the group of sub-geographic regions to produce a further update a prescription based on the further data collected from the selected sub-geographic region. For example, the processing module determines changes to a plurality of steps associated with the agricultural prescription that, when executed, provide optimal results based on the further data. The method continues at step 350 where the processing module facilitates execution of the further updated prescription. For example, the processing module sends the further updated prescription to one or more user devices associated with the group of sub-geographic regions for execution.

FIG. 19A is a schematic block diagram of another embodiment of a computing system that includes the user device 1-1A of FIG. 1, the sensors set 1A of FIG. 17A, the actuator set 1A of FIG. 13A, the user device 1-1C of FIG. 1, the geographic regions 1-1 through 1-9 of geographic region 1 of FIG. 3, the wireless communication network 1 of FIG. 1, the network of FIG. 1, the user device 14 of FIG. 5, the application unit 16 of FIG. 5, the storage unit 36 of FIG. 5, and a weather forecast unit 358. The computing system may further include a user device 1-1B to provide communication and processing of information between the user device 1-1C and the user device 1-1A in a similar fashion as user device 2-1B provides processing and communication between user devices 2-1C and 2-1A of FIG. 12A. The user device 1-1A traverses a drive path within the geographic regions 1-1 through 1-9 in accordance with an agricultural prescription 1. The weather forecast unit 358 includes one or more of a National Weather Service information server, a micro-cast information server, and a local weather computer.

The computing system is operable to generate an updated agricultural prescription based on forecasted weather conditions. In an example of operation of the generating of the updated agricultural prescription, the application unit obtains associated data records 1 for an agricultural prescription 1 for a plurality of geographic regions. For example, the application unit receives data records 1 that includes sensor data 1 received from via user device 1-1C from the user device 1-1A as the user device 1-1A executes the prescription 1 along a drive path. The data records may include one or more of current speed, current location, and un-executed prescription steps. For example, the user device 1-1A send sensor data 1 to the storage unit 36 for storage in memory 58 for geographic region 1-2 when the user device 1-1A is currently operating within the geographic region 1-2 and collecting data via the sensors set 1A. Alternatively, or in addition to, other user devices may operate within the plurality of geographic regions and send further sensor data to the storage unit 36 providing further data records 1 to the application unit 16.

Having obtained the data records 1, the application unit 16 identifies a resource executing steps of the agricultural prescription 1 based on one or more of guidance 72 from the user device 14 and the data records 1. For example, the application unit 16 identifies the user device 1-1A based on the sensor data 1 from the user device 1-1A that includes identity of the user device 1-1A. Having identified the resource executing the steps, the application unit 16 obtains weather data 1 for the plurality of geographic regions. For example, the application unit 16 receives further data records 1, where the application unit 16 receives a further data records 1 from the storage unit 36, where the storage unit 36 receives weather data 1, via the network 24, from the weather forecast unit 358. In an instance, the weather data 1 includes a micro forecast for each of the geographic regions 1-1 through 1-9.

Having obtained the weather data 1, the application unit 16 identifies pending un-executed steps of the agricultural prescription 1 associated with one or more geographic regions associated with unfavorable weather data. The identifying includes detecting the unfavorable weather data from the weather data 1 and correlating the unfavorable weather data with one or more of the geographic regions (e.g., by location and time). As a specific example, the application unit identifies geographic regions 1-6, 1-8, and 1-9 associated with the unfavorable weather data in the next 15 minutes and identifies steps of the agricultural prescription 1 to collect sensor data within the identified geographic regions 1-6, 1-8, and 1-9.

Having identified the pending steps associated with the unfavorable weather, the application unit 16 modifies the agricultural prescription 1 regarding the pending steps to produce an updated agricultural prescription 1, where the update includes one or more of a change is speed, and updated right path to avoid the one or more geographic regions with the unfavorable weather data, and a suspension of one or more execution steps. As a specific example, the application unit modifies the prescription 1 to suspend steps associated with geographic regions 1-3, 1-6, 1-8, and 1-9, while updating the drive path and speed to move from geographic region 1-2 to geographic regions 1-5, 1-4, and 1-7 to perform un-executed steps associated with the geographic regions 1-2, 1-5, 1-4, and 1-7.

Having modified the agricultural prescription 1 to produce the updated agricultural prescription 1, the application unit 16 sends, via the network 24 and the wireless communication network 1 using wireless communication signals 42, the updated prescription 1 to the user device 1-1A for immediate execution to avoid the predicted unfavorable weather.

FIG. 19B is a flowchart illustrating an example of generating an updated agricultural prescription based on forecasted weather conditions. The method begins or continues at step 360 where a processing module (e.g., of an application unit) obtains data records associated with an agricultural prescription for a plurality of sub-geographic regions. As a specific example, the processing module recovers the data records from a storage unit. As another example, the processing module receives sensor data from a resource executing steps of the agricultural prescription within at least one of the plurality of sub-geographic regions.

The method continues at step 362 where the processing module identifies a resource executing steps of the agricultural prescription based on the data records. For example, the processing module interprets the data records to identify a resource associated with current execution of the agricultural prescription as the identified resource.

The method continues at step 364 where the processing module obtains weather data for the plurality of sub-geographic regions. As a specific example, the processing module determines an identity of the plurality of sub-geographic regions and receives the weather data based on the identity of the plurality of sub-geographic regions.

The method continues at step 366 where the processing module identifies pending steps of the agricultural prescription associated with one or more sub-geographic regions with unfavorable weather data. As a specific example, the processing module identifies one or more areas associated with an unfavorable weather forecast (e.g., rain, high winds, conditions unfavorable for execution of steps of the agricultural prescription, etc.) and interprets the agricultural prescription to identify the pending steps associated with the one or more identified areas.

The method continues at step 368 where the processing module modifies the agricultural prescription with regards to the one or more pending steps to produce an updated agricultural prescription. The processing module performs the update to include one or more of changing speed of a current product path, generating an updated drive path to avoid the one or more areas associated with the unfavorable weather forecast while executing steps in areas associated with the favorable weather forecast.

The method continues at step 370 where the processing module facilitates execution of the updated agricultural prescription by the resource. As a specific example, the processing module sends the updated agricultural prescription to the resource for execution of steps associated with the updated agricultural prescription. Alternatively, or in addition to, the processing module sends the updated agricultural prescription as an alert to the user device and/or to other user devices associated directly with the plurality of sub-geographic regions.

The sending of an updated agricultural prescription may include sending the agricultural prescription to one or more user devices associated with a common geographic region to facilitate one or more of execution of steps associated with the updated agricultural prescription, based on awareness of assignments of the one or more execution steps to specific user devices, and awareness of a condition and/or status of previous execution of steps of the agricultural prescription and/or status of any attribute associated with the common geographic region.

FIG. 20A is a schematic block diagram of another embodiment of a user device that includes the controller area network (CAN) bus interface 110 of FIG. 12B, the computing unit 26 of FIG. 5, and the Bluetooth wireless location modem 1 of FIG. 12B. Alternatively, at least one of a Wi-Fi indication modem, a 60 GHz communication modem, an infrared communication modem, any other wireless connectivity wireless communication modem, and a wireline interface (e.g., a universal serial bus (USB) interface) may be utilized in lieu of the Bluetooth wireless communication modem 1. The computing unit 26 includes the application processing module 34 of FIG. 5 and the memory 58 of FIG. 5. Alternatively, or in addition to, the user device 2-1B may include an on-board diagnostics (OBD) interface.

The user device 2-1B is operable to facilitate the collecting of data (e.g., sensor data, location data, time data) to generate an agricultural prescription. In an example of operation of the facilitating of the collecting of the data to generate the agricultural prescription, the Bluetooth wireless communication modem 1 interprets Bluetooth wireless communication signals 116 from the user device 2-1C to produce wireless messages 1, where the wireless messages 1 have been encoded with one or more agricultural prescriptions. The application processing module 34 extracts the one or more prescriptions from the wireless messages 1 and stores the one or more prescriptions in the memory 58.

Having received the one or more prescriptions, the CAN bus interface 110 receives CAN data 114 from the user device 2-1A to produce interface information 40. The application processing module 34 interprets the interface information 40 to produce raw sensor data sets. For example, the application processing module 34 decodes the interface information 40 in accordance with a CAN industry standard to produce the raw sensor data sets.

Having produced the raw sensor data sets, the application processing module 34 obtains location information 1 from the user device 2-1A. The location information 1 includes one or more of coordinated universal time (UTC) and GPS coordinates, where the user device 2-1A receives GPS wireless location signals 1 and generates the location information 1 based on the received GPS wireless location signals 1. As a specific example, at least one of the CAN bus interface 110 and the computing unit 26 receives the location information 1 from the user device 2-1A. As another specific example, the CAN bus interface 110 receives further CAN data 114 that includes the location information 1 and interprets the further CAN data 114 to produce further interface information 40 that includes the location information 1. The user device 2-1A utilizes at least one of extracted UTC and local time associated with at least one of the user device 2-1A and the user device 2-1C to facilitate associating of sensor data with GPS coordinates and timestamps.

Having received the location information 1, the application processing module receives location information 2 from the user device 2-1C. As a specific example, the application processing module 34 interprets further wireless messages 1 that includes the location information 2, where the Bluetooth wireless communication modem 1 receives further Bluetooth wireless communication signals 116 that includes the location information 2 from the user device 2-1C, and where the user device 2-1C receives GPS wireless location signals 2 and generates the location information 2 based on the received GPS wireless location signals 2.

As another specific example of receiving the location information 2, the application processing module 34 receives the location information 2 from the Bluetooth wireless communication modem 1, where the Bluetooth wireless communication modem 1 receives the further Bluetooth wireless communication signals 116 from the user device 2-1C, where the further Bluetooth wireless communication signals 116 includes the location information 2.

Having received the location information 1 and 2, the application processing module 34 generates error information associated with the location information 1 and 2 and selects at least one of the location information 1 and 2 based on the error information to produce location information. The selecting of the at least one of the location information 1 and 2 is discussed in greater detail with reference to FIG. 20B.

Having produced the location information, the application processing module 34 associates the raw sensor data sets with the location information to produce location enabled sensor data sets. For example, the application processing module tags sensor data with corresponding UTC and GPS location coordinates of time of receipt to produce the location enabled sensor data sets. Having produced the location enabled sensor data sets, the application processing module 34 stores the location enabled sensor data sets in the memory 58.

The application processing module 34 identifies at least one prescription of the one or more prescriptions associated with the location information. For example, the application processing module 34 identifies a geographic location area associated with the prescription that is substantially the same as the obtained location information. Having identified the prescription, the application processing module 34 associates the identified prescription with the location enabled sensor data sets to produce prescription based location enabled sensor data sets. For example, the application processing module 34 tags the location enabled sensor data sets with an identifier of the identified prescription to produce the prescription based location enabled sensor data sets.

Having produced the prescription based location enabled sensor data sets, the application processing module 34 may perform a filtering function on the prescription based location enabled sensor data sets in accordance with a filter identifier of the identified prescription to produce sensor data sets. For example, the application processing module 34 discards one or more portions of sensor data and not associated with the prescription. Alternatively, the application processing module 34 applies a null filter to prevent discarding any sensor data.

The application processing module 34 generates still further wireless messages 1 based on the sensor data sets. Having produced the still further wireless messages 1, the application processing module 34 sends the still further wireless messages 1 to the Bluetooth wireless communication modem 1 for transmission to the user device 2-1C for retransmission via fourth-generation (4G) wireless communication signals 118 to a storage unit for storage and subsequent processing to produce at least one of an updated agricultural prescription and a new agricultural prescription.

FIG. 20B is a schematic block diagram of an embodiment of the application processing module 34 of FIG. 20A that includes a location information error module 380, a location information switching module 382, an interpretation module 384, and a storage module 386. The application processing module 34 functions to generate error information associated with the location information 1 and 2 and selects at least one of the location information 1 and 2 based on the error information to produce location information for storage.

In an example of operation, the interpretation module 384 interprets the interface information 40 to produce sensor data sets. As a specific example, the interpretation module 384 decodes the interface information 40 in accordance with an industry CAN standard to produce the raw sensor data sets 390. The location information error module 380 analyzes the location information 1 and 2 to generate generates error information 1, 2. The analyzing includes one or more of detecting a signal dropout, estimating a location accuracy, comparing the location accuracy to one or more accuracy threshold levels, identifying a number of received satellites, generating a likelihood of spoofing level, and estimating a time accuracy. The analyzing may further include comparing a first portion of location information 1 to another portion of location information 2 and comparing the first portion of location information 1 to a first portion of the location information 2.

The location information switching module 382 selects at least one of the location information 1 and location information 2 based on the error information 1, 2 to produce location information 388 (e.g., composite location information as discussed with reference to FIG. 12B). The selecting may be in accordance with a selection approach. The selection approach includes one or more of selecting an error free signal, selecting a signal with a lowest level of errors, selecting a signal with a level of errors below a low error threshold level, selecting both, selecting either, combining to produce a lower net error level, and interleaving.

The storage module 386 combines the location information 388 and the raw sensor data 390 to produce location enabled sensor data 392 for storage in the memory 58. As a specific example, the storage module 386 tags a first portion of the raw sensor data with a first portion of the location information, where absolute timing information is substantially the same for the first portions.

FIG. 20C is a flowchart illustrating an example of opportunistic acquisition of location information enabling data collection to generate an agricultural prescription, that include similar steps to FIG. 12C. The method begins or continues with the steps 140-142 of FIG. 12C where a processing module (e.g., an application processing module of a user device) obtains one or more agricultural prescriptions and interprets received data to produce raw sensor data sets of a current geographic region.

The method continues at step 410 where the processing module obtains location information of the current geographic region from two or more sources. For example, the processing module interprets the received data to extract the location information. As another example, the processing module receives further location information from another user device.

The method continues at 412 where the processing module determines error information for the location information of each of the two or more sources. For example, the processing module analyzes the location information to identify one or more error conditions (e.g., location dropouts, unfavorable location accuracy, too few satellites, etc.).

The method continues at step 414 where the processing module processes the location information of the two or more sources based on the error information to produce location information. The processing includes at least one of selecting and combining to provide a location accuracy level greater than a minimum accuracy threshold level.

The method continues with steps 146-152 of FIG. 12C where the processing module associates the raw sensor data sets with the obtained location information to produce location enabled sensor data sets, stores the location enabled sensor data sets in the local memory, identifies at least one agricultural prescription associated with the location information, and associates the identified agricultural prescription with the location enabled sensor data sets to produce prescription based location enabled sensor data sets. The method may further continue with steps 154-156 of FIG. 12C where the processing module performs a filtering function on the prescription based location enabled sensor data sets in accordance with a filter identifier of the identified agricultural prescription to produce sensor data sets for the current geographic region and sends the sensor data sets to a storage unit for storage and subsequent processing of the sensor data sets to produce at least one of an updated prescription and a new prescription.

FIG. 21A is a schematic block diagram of another embodiment of a computing system that includes associated user devices 1-1A, and 1-1C of FIG. 1, a gyro sensor set 1A, and a tillage actuator set 1A, the geographic region 1 of FIG. 1, the wireless communication network 1 of FIG. 1, the network 24 of FIG. 1, the user device 14 of FIG. 5, the application unit 16 of FIG. 5, the storage unit 36 of FIG. 5, and the weather forecast unit 358 of FIG. 19A. The computing system may further include a user device 1-1B to provide communication and processing of information between the user device 1-1C and the user device 1-1A in a similar fashion as user device 2-1B provides processing and communication between user devices 2-1C and 2-1A of FIG. 12A. The sensors include at least some of the sensors 1-7 of FIG. 7. The user device 1-1A traverses portions of a drive path 1 within a geographic region 1 in accordance with an agricultural prescription 1 at various times 1, 2, etc. through time x.

The computing system is operable to generate a nitrogen application agricultural prescription. In an example of operation of generating the nitrogen application agricultural prescription, the application processing module 34 of the application unit 16 obtains data records 1 for the geographic region 1, where the data records 1 includes sensor data 1 from the user device 1-1A collected at various times from transversals of the geographic region 1. The sensor data 1 includes one or more of gyro data 1, tillage data 1, image data 1, and planter data 1. The gyro data 1 includes one or more of gyroscope output data (e.g., acceleration, velocity, distance, pitch, yaw, etc.) and location information (e.g., GPS coordinates, timestamp information). The tillage data 1 includes torque level data. The planter data 1 includes further torque level data. The image data 1 includes soil images.

The obtaining of the data records 1 includes at least one of receiving the data records 1 from the storage unit 36 and interpreting received sensor data 1, where the application processing module 34 receives the sensor data 1 directly from the user device 1-1A. Having obtained the data records 1, the application processing module 34 of the application unit 16 interprets the data records 1 to produce composite torque levels based on the tillage data and the planter data. For instance, the application processing module 34 produces a time stamped torque level histogram for each transversal.

Having produced the composite torque levels, the application processing module 34 of the application unit 16 interprets the data records 1 to produce bare soil images based on the image data. For instance, the application processing module produces time stamped images along each transversal, where the time stamped images includes image of the soil of the geographic region along the drive path.

Having produced the bare soil images, the application processing module 34 of the application unit 16 interprets the data records 1 to produce a topographic map for the geographic region 1. For example, the application processing module 34 interprets the gyroscope output and location information to produce linear elevation data along each transversal and aggregates the linear elevation data along the transversals to produce the topographic map for the geographic region 1. Alternatively, the application processing module 34 of the application unit 16 receives the topographic map from the storage unit 36 and/or from another server. Further alternatively, the application processing module 34 of the application unit 16 utilizes location information from the user device 1-1A to produce the topographic map, where the GPS coordinates of the location information includes z direction information for elevation.

Having obtained the topographic map, the application processing module 34 of the application unit 16 interprets weather data 1 to produce rainfall data for the geographic region 1 (e.g., timing for amounts of rain for one or more portions of the geographic region 1). As a specific example, the application processing module 34 receives, via the network 24, the weather data 1 from the weather forecast unit 358, where weather data 1 includes rainfall history for the geographic region 1.

Having produced the rainfall data, the application processing module 34 of the application unit 16 analyzes the bare soil images and the composite torque levels to determine an amount of organic material associated with portions of the geographic region 1. As a specific example, the application processing module 34 compares a series of bare soil images of a portion of the geographic region 1 to a plurality of template soil images to identify a corresponding template image and compares a series of composite torque levels of the portion of the geographic region 1 to a plurality of template torque levels to identify a corresponding template torque level. Having identified the template image and template torque level for the portion, the application processing module 34 performs a lookup to determine the amount of organic material for the portion based on the identified template image and template torque level.

Having produced the amount of organic material associated with portions of the geographic region 1, the application processing module of the application generates a nitrogen application prescription as an updated prescription 1 based on one or more of guidance 72 from the user device 14 (e.g., an instruction to produce the nitrogen application prescription), the amount of organic material associated with the portions, the topographic map, and the rainfall data. As a specific example, the application processing module 34 determines a gradient along the drive path 1 based on the topographic map and performs a deterministic function on the amount of organic material, the gradient, and the rainfall data to produce and intermediate result. Having produced the intermediate result, the application processing module 34 performs a lookup using the intermediate result to produce an amount of nitrogen to apply to a portion corresponding to the gradient.

Having produced the updated prescription 1, the application processing module 34 of the application unit 16 facilitates execution of the updated prescription 1. As a specific example, the application processing module 34 of the application unit 16 sends, via the network 24, the updated prescription 1 to the user device 14 and via the wireless communication network 1 using the wireless communication signals 42 to the user device 1-1C such that at time x the user device 1-1A issues control information to the nitrogen actuator set 1A, where the nitrogen actuator set 1A applies the amount of nitrogen along the drive path 1 in accordance with the updated prescription 1.

FIG. 21B is a flowchart illustrating an example of generating a nitrogen application agricultural prescription. The method begins or continues at step 440 where a processing module (e.g., of an application processing module of an application unit) obtains associated data records for a plurality of transfer cells of a geographic region associated with an agricultural prescription. For example, the processing module receives the data records directly from a user device. As another example, the processing module receives the data records from a storage unit. The data records include one or more of image data, tillage data, planter data, gyro data, and location information.

The method continues at step 442 where the processing module interprets the data records to produce torque levels based on tillage data and planter data. For example, the processing module interprets one or more of the tillage data and the planter data to produce torque levels associated with portions of the geographic region. The method continues at step 444 where the processing module interprets the data records to produce bare soil images based on image data. For example, the processing module extracts bare soil images from the image data.

The method continues at step 446 where the processing module obtains a topographic map for the geographic region. As a specific example, the processing module recovers the topographic map from the storage unit. As another specific example, the processing module generates the topographic map based on the gyro data and the location information. The method continues at step 448 for the processing module interprets weather data to produce rainfall data for the geographic region. As a specific example, the processing module extracts historical rainfall levels and timing of rainfall to produce the rainfall data.

The method continues at step 450 where the processing module analyzes the bare soil images and the torque levels to determine an amount of organic material associated with a portion of the geographic region. As a specific example, the processing module compares the bare soil images with reference bare soil images to identify a substantially similar reference bare soil image and performs a lookup to determine an organic material level associated with the identified reference bare soil image. As another specific example, the processing module compares the torque levels with reference torque levels to identify a substantially similar reference torque level and performs a lookup of an organic material level associated with the identified reference torque level.

The method continues at step 452 where the processing module generates a nitrogen application prescription as an updated prescription based on one or more of the amount of organic material, the topographic map, and the rainfall data. As a specific example, the processing module applies a deterministic function to the amount of organic material, topographic characteristics for a given portion of the geographic region from the topographic map, and the rainfall data to produce and intermediate result. The processing module accesses a nitrogen prescription table utilizing the intermediate result to recover a nitrogen level prescription for the given portion of the geographic region.

The method continues at step 454 where the processing module facilitates execution of the updated prescription. As a specific example, the processing module sends the updated prescription to a user device to implement steps of the updated prescription with regards to the nitrogen prescription.

FIG. 22A is a schematic block diagram of another embodiment of a computing system that includes associated user devices 1-1A, and 1-1C of FIG. 1, the sensors set 1A of FIG. 17A, the tillage actuator set 1A of FIG. 21A, the combine actuator set 1A of FIG. 14A, the geographic region 1 of FIG. 1, the wireless communication network 1 of FIG. 1, the network 24 of FIG. 1, the user device 14 of FIG. 5, the application unit 16 of FIG. 5, the storage unit 36 of FIG. 5, and the weather forecast unit 358 of FIG. 19A. The computing system may further include a user device 1-1B to provide communication and processing of information between the user device 1-1C and the user device 1-1A in a similar fashion as user device 2-1B provides processing and communication between user devices 2-1C and 2-1A of FIG. 12A. The sensors include at least some of the sensors 1-7 of FIG. 7. The user device 1-1A traverses portions of a drive path 1 within a geographic region 1 in accordance with an agricultural prescription 1 at various times 1, 2, etc. through time x.

The computing system is operable to generate a harvest agricultural prescription. In an example of the generating of the harvest agricultural prescription, the application processing module 34 of the application unit 16 obtains data records 1 for the geographic region 1, where the data records 1 includes sensor data 1 from the user device 1-1A collected at various times from transversals of the geographic region 1. The sensor data 1 includes one or more of timestamped temperature levels, timestamped soil moisture levels, and time stamped soil nutrient levels.

The obtaining of the data records 1 includes at least one of receiving the data records 1 from the storage unit 36 and interpreting received sensor data 1, where the application processing module 34 receives the sensor data 1 directly from the user device 1-1A. Having obtained the data records 1, the application processing module 34 of the application unit 16 obtains a unit of time (e.g., an hour, a minute) for an agricultural lifecycle, where a plurality of units of time range from a first unit of time to a present unit of time. The first unit of time corresponds to an initial planting of a crop. The present unit of time may refer to an intermediate time after planting but before harvesting. A future unit of time includes a time of harvesting.

The obtaining of the unit of time includes at least one of selecting based on a predetermination (e.g., from the agriculture prescription 1), and determining that an expected variance level of growth factors is expected to be less than a variance threshold level. For each unit of time, the application processing module 34 of the application unit 16 determines values of a set of growth factors based on one or more of the data records 1 and weather data 1. The weather data 1 includes one or more of sunlight intensity level per unit time, temperature level per unit of time, and rainfall history for the geographic region 1. The application processing module 34 extracts the weather data 1 one from the data records 1. Alternatively, the application processing module 34 receives, via the network 24, the weather data 1 directly from the weather forecast unit 358.

The growth factors include one or more of a sunlight intensity level, a temperature level, a soil moisture level, and a soil nutrient level. For example, the application processing module interprets the data records 1 to produce the soil moisture level and the soil nutrient level. As another example, the application processing module 34 interprets obtains the weather data 1 and interprets the weather data 1 to produce historical weather information (e.g., temperature per unit of time, sunlight intensity level per unit of time based on one or more of cloud cover and hours of sunlight based on the day of year for the geographic region 1).

For each unit of time, the application processing module 34 of the application unit 16 applies a deterministic function to the set of growth factors to produce a corresponding predictive growth unit (PGU). As a specific example, the application processing module generates the PGU in accordance with a formula:

$$PGU = a*\text{sunlight level} + b*\text{temp} + c*\text{moisture level temperature level} + d*\text{nutrient}$$

where a, b, c, and d are constants associated with the set of growth factors. The application processing module 34 of the application unit 16 sums each corresponding PGU for the units of time from the first unit of time to the present unit of time to produce a current accumulated predictive growth metric (PGM). As a specific example, the application processing module generates the PGM in accordance with a formula:

$$PGM = PGU1 + PGU2 + PGU3 + \text{through } PGU\text{current unit of time}$$

The application processing module 34 of the application unit 16 estimates a harvest ready unit of time based on one or more of a portion of the predictive growth units for at least some of the previous units of time (e.g., a trend), predictive values of growth factors for future units of time (e.g., based on history), and guidance 72 from the user device 14. As a specific example, the application processing module 34 estimates the harvest ready unit of time to be 10 days from the current unit of time when the PGM value is 2,457, a desired PGM harvest value is 3100, and an expected trend for the PGM is to move from 2,457 to 3,100 and 10 days based on historical data.

Having estimated a harvest timeframe based on the harvest ready unit of time, the application processing module 34 of the application unit 16 generates an updated prescription 1 based on the prescription 1 and the estimated harvest timeframe, such that the updated prescription 1 includes harvest execution steps in 10 days. Having generated the updated prescription 1, the application processing module 34 of the application unit 16 sends, via the network 24, the updated prescription 1 to the user device 14 and further sends, via the wireless communication network 1 using wireless communication signals 42, the updated prescription 1 to the user device 1-1A such that the user device 1-1A issues control information to the combine actuator set 1A in accordance with a harvest prescription 1 portion of the updated prescription 1.

FIG. 22B is a flowchart illustrating an example of generating a harvest agricultural prescription. The method begins or continues at step 470 where a processing module (e.g., of an application processing module of an application unit) obtains associated data records for a plurality of traversals of a geographic region associated with an agricultural prescription. The obtaining includes at least one of receiving the data records directly from the user device and recovering the data records from a storage unit. The data records includes one or more of time stamped temperature levels, time stamped soil moisture levels, time stamped soil nutrient levels, and location information for each of the times and values.

The method continues at step 472 where the processing module determines a unit of time for an agricultural lifecycle associated with the agricultural prescription. The determining may be based on one or more of a predetermination and a unit of time such that an expected variance level of growth factors is less than a variance threshold level.

For each unit of time of the agricultural lifecycle, the method continues at step 474 where the processing module determines values of a set of growth factors based on one or more of the data records and weather data. The determining includes interpreting the data records to produce one or more of a soil moisture level and a soil nutrient level. The determining may further include interpreting the weather data to produce a temperature per unit of time and a sunlight intensity level per unit of time.

For each unit of time, the method continues at step 476 where the processing module applies a deterministic function to the set of growth factors to produce a corresponding predictive growth unit. As a specific example, the processing module selects the deterministic function based on one or more of a predetermination, location information associated with the geographic region, a time of year, and an expected accuracy level. The processing module utilizes the selected deterministic function to manipulate the growth factors producing the predictive growth unit, where the deterministic function may include a combination of constants and deterministic mathematical functions.

The method continues at step 478 where the processing module sums each predictive growth unit to produce a current accumulated predictive growth metric. As a specific example, the processing module adds values for a predictive growth units associated with units of time 1 through a current unit of time to produce the current accumulated predictive growth metric.

The method continues at step 480 where the processing module estimates a harvest ready timeframe based on one or more of a portion of the predictive growth units for at least some of the previous units of time and predictive values of growth factors for future units of time. As a specific example, the processing module interprets a trend from the portion of the predicted growth units and extends the trend based on the predicted values of growth factors for future units of time based on interpreting historical summaries. Alternatively, or in addition to, the processing module generates an updated agricultural prescription based on the agricultural prescription and the harvest ready timeframe and sends the updated agricultural prescription to a user device for execution, where the updated agricultural prescription includes harvest execution steps associated with the harvest ready timeframe.

FIG. 23A is a schematic block diagram of another embodiment of a computing system that includes the geographic region 1 of FIG. 1, the wireless communication network 1 of FIG. 1, the network 24 of FIG. 1, the user device 14 of FIG. 5, the application unit 16 of FIG. 5, and the storage unit 36 of FIG. 5. The geographic region 1 includes a harvest apparatus set 490 and user device 1-1C of FIG. 1. The harvest apparatus set 490 includes the user device 1-1A of FIG. 1, a sensors set 1A, a harvest actuator set 1A, and an auxiliary resource 1A. The geographic region 1 may further include a user device 1-1B to provide one or more of communication, processing, and discovery of other like proximal user devices, where the communication includes transfer of information between the user device 1-1C and the user device 1-1A in a similar fashion as user device 2-1B provides processing and communication between user devices 2-1C and 2-1A of FIG. 12A.

The user device 1-1A includes the application processing module 34 of FIG. 4 and the wireless communication modem 1 of FIG. 4. The sensors set 1A include at least some of the sensors 1-7 of FIG. 7. The harvest actuator set 1A includes one or more actuators associated with at least one of a combine and any crop harvesting machine. The auxiliary resource 1A includes any other agricultural resource that may be associated with the harvest apparatus set 490 such as one or more of a grain cart, a harvest crop wagon, a fertilizer transporter, a water transporter, etc. The user device 1-1A traverses portions of a drive path 1 within the geographic region 1 in accordance with an agricultural prescription 1.

The computing system is operable to determine crop harvesting yield. In an example of operation of the determining of the crop harvesting yield, the application unit 16 (e.g., the application processing module 34 of the application unit 16) obtains data records 1 for the geographic region 1 where the agricultural prescription 1 is being executed by the harvest apparatus set 490, and where the application unit generates the agricultural prescription 1 based on guidance 72 from the device 14 (e.g., a primary user device). The obtaining includes at least one of receiving sensor data 1 from the harvest apparatus set 490 and receiving the data records 1 from the storage unit 36. For example, the user device 1-1C sends the sensor data 1, transmitting wireless communication signals 42 via the wireless location network 1, and via the network 24, to the storage unit 36 for storage in the memory 58 where the storage unit 36 aggregates the sensor data 1 and historical summaries (e.g., similar previously stored sensor data for the geographic region 1) to produce the data records 1, and where the storage unit 36 sends the data records 1, via the network 24, to the application unit 16.

The sensor data 1 includes one or more of moisture data 1 (e.g., a moisture level for each of a plurality of locations), unloading auger data 1 (e.g., location information associated with auger activation, time duration of auger activation, auger revolutions per minute (RPM), estimated number of wet bushels unloaded per unit of time), and auxiliary data 1 (e.g., an auxiliary resource identifier, an auxiliary resource weight and timestamp). The data records 1 includes one or more of the unloading auger data, the moisture data, the auxiliary data, and historical summaries (e.g., a calibration of previous augur data and actual crop yield data). Having obtained the data records 1, the application unit 16 generates intermediate estimated yield data based on one or more of the data records 1 and guidance 72 from the user device 14 (e.g., desired yield data type, desired yield data units, etc.). For example, the application unit 16 determines an estimated number of wet bushels harvested per acre based on one or more of an amount of auger time of the unloading auger data and gross weight of a crop wagon extracted from the auxiliary data.

Having generated the intermediate estimated yield data, the application unit 16 generates yield data 1 (e.g., bushels of crops per acre) based on the intermediate estimated yield data and one or more of the moisture data and the historical summaries. For example, the application unit 16 extracts the calibration from the historical summaries and utilizes the moisture data to update the estimated wet bushels to determine the yield data 1 based on the updated estimated wet bushels and the historical summaries for resulting non-wet bushels.

Having generated the yield data 1, the application unit 16 sends the yield data 1 to one or more of a primary user device (e.g., user device 14) and the harvest apparatus set 490. For example, the application unit sends, via the network 24 and the wireless communication network 1, the yield data 1 to the user device 1-1C for transfer to the harvest apparatus set 490 for further processing and/or visualization by at least one of the user device 1-1A and the user device 1-1C. For instance, the user device 1-1C displays a map of the geographic region 1 where the map overlays the yield data (e.g., varying colors represent varying levels of yield).

Having issued the yield data, the application unit 16 updates the agricultural prescription based on the yield data to produce another agricultural prescription 1 (e.g., an updated agricultural prescription 1), where the updated agricultural prescription 1 includes modifications to steps of the agricultural prescription to optimize harvesting based on the yield data. For instance, the modifications to the steps include updated control information for the harvest actuator set 1A. Having updated the agricultural prescription, the application unit sends, via the network and the wireless communication network 1, the updated agricultural prescription to one or more of the harvest apparatus set and the primary user device.

FIG. 23B is a flowchart illustrating an example of determining crop harvesting yield. The method begins or continues at step 500 where a processing module (e.g., an application processing module of at least one of an application unit and a user device), for an agricultural prescription of a geographic region, obtains data records associated with harvesting steps of the agricultural prescription, where the data records includes unloading auger data as a result of a harvesting step. The obtaining includes at least one of receiving the data records directly from a user device and recovering the data records from a storage unit. The data records include one or more of unloading auger data, moisture data, auxiliary data, and historical summaries.

The method continues at step 502 where the processing module generates intermediate estimated yield data based on the data records. For example, the processing module, for a given portion of the geographic region, multiplies a number of seconds of unloading auger activation time by a number of wet bushels per second factor to generate the intermediate estimated yield data. The factor may be verified based on the auxiliary data that includes gross weight changes of harvested crops for the given portion of the geographic region.

The method continues at step 504 where the processing module generates yield data based on the intermediate estimated yield data and one or more of moisture data and historical summaries. For example, the processing module, for the given portion of the geographic region, extracts a calibration from the historical summaries and multiplies the calibration by the number of wet bushels to produce the yield the data of non-wet bushels per acre.

The method continues at step 506 where the processing module sends the yield data to one or more of a primary user device and a user device associated with the harvesting steps. For example, the processing module sends the yield data to a user device associated with the harvesting steps for operator display.

The method continues at step 508 where the processing module updates the agricultural prescription based on the yield data to produce an updated agricultural prescription. For example, the processing module analyzes the yield data to update one or more steps of the agricultural prescription to favorably improve the yield data for subsequent determinations. The method continues at step 510 where the processing module facilitates execution of the updated agricultural prescription. For example, the processing module sends the updated prescription to a user device associated with execution of one or more agricultural prescriptions within the geographic region.

FIG. 24A is a schematic block diagram of another embodiment of a computing system that includes the geographic region 1 of FIG. 1, the wireless communication network 1 of FIG. 1, the network 24 of FIG. 1, the user device 14 of FIG. 5, the application unit 16 of FIG. 5, and the storage unit 36 of FIG. 5. The geographic region 1 includes harvest apparatus sets 1-2 and user device 1-1C and 1-2C of FIG. 1. Each harvest apparatus set includes the user device 1-1A or 1-2A of FIG. 1, a sensors set 1A or 2A, a harvest actuator set 1A or 2A, and an auxiliary resource 1A or 2A. The geographic region 1 may further include a user device 1-1B and/or 1-2B to provide one or more of communication, processing, and discovery of other like proximal user devices, where the communication includes transfer of information between the user device 1-1C and the user device 1-1A over the user device 1-2C and the user device 1-2A in a similar fashion as user device 2-1B provides processing and communication between user devices 2-1C and 2-1A of FIG. 12A.

The user devices 1-1A and 1-2A includes the application processing module 34 of FIG. 4 and the wireless communication modem 1 of FIG. 4. The sensors sets 1A and 2A include at least some of the sensors 1-7 of FIG. 7. The harvest actuator sets 1A and 2A includes one or more actuators associated with at least one of a combine and any crop harvesting machine. The auxiliary resources 1A and 2A includes any other agricultural resource that may be associated with the harvest apparatus set such as one or more of a grain cart, a harvest crop wagon, a fertilizer transporter, a water transporter, etc. The user device 1-1A traverses portions of a drive path 1 within the geographic region 1 in accordance with an agricultural prescription 1 and the user device 1-2A traverses portions of a drive path 2 within the geographic region 1 in accordance with an agricultural prescription 2.

The computing system is operable to optimize crop harvesting yield. In an example of operation of the optimizing of the crop harvesting yield, the application unit 16 (e.g., the application processing module 34 of the application unit 16) obtains harvest data records for a geographic region where one or more agricultural prescriptions are being executed by a plurality of harvest apparatus sets, and where the application unit 16 generates the one or more agricultural prescriptions (e.g., agricultural prescriptions 1-2) based on guidance 72 from the user device 14 (e.g., a primary user device). The obtaining includes at least one of receiving the harvest data records from the harvest apparatus sets 1-2 and receiving the harvest data records from the storage unit 36. For example, the user device 1-1C sends harvest sensor data 1, transmitting wireless communication signals 42 via the wireless location network 1, and via the network 24, to the storage unit 36 for storage in the memory 58 where the storage unit 36 aggregates the harvest data 1, harvest data 2 (e.g., from the harvest apparatus set 2) and the historical summaries (e.g., similar previously stored sensor data for the geographic region 1) to produce data records 1, 2, and where the storage unit 36 sends the data records 1, 2 via the network 24, to the application unit 16.

The harvest data includes one or more of moisture data (e.g., a moisture level for each of a plurality of locations), unloading auger data (e.g., location information associated with auger activation, time duration of auger activation, auger revolutions per minute (RPM), estimated number of wet bushels unloaded per unit of time), and auxiliary data (e.g., an auxiliary resource identifier, an auxiliary resource weight and timestamp). The data records 1, 2 includes one or more of the unloading auger data, the moisture data, the auxiliary data, and historical summaries (e.g., a calibration of previous augur data and actual crop yield data).

Having obtained the data records 1, 2, the application unit 16 generates, for each harvest apparatus set, yield data based on the data records 1, 2. For example, the application unit 16 determines an estimated wet bushels harvested per acre based on one or more of an amount of auger time of the unloading auger data 1 and gross weight of a crop wagon (e.g., aux resource 1A) extracted from auxiliary data 1 and generates non-wet bushels per acre harvested as yield data 1 based on a calibration for wet bushels harvested.

Having generated the yield data 1, 2, the application unit 16 sends, for each harvest apparatus set, corresponding yield data to one or more of the primary user device 14 and the harvest apparatus set. For example, the application unit 16 sends, via the network 24 and the wireless communication network 1, the yield data 1 to the user device 1-1C for transfer to the harvest apparatus set 1 or further processing and/or visualization by at least one of the user device 1-1A and the user device 1-1C. For instance, the user device 1-1A displays a map of the geographic region 1 where the map overlays the yield data 1 (e.g., varying colors represent varying levels of yield). Similarly, user device 1-2C displays the map of the geographic region 1 where the map overlays the yield data 2 having received the yield data 2 from the application unit.

Having sent the yield data, the application unit 16, for one or more of the agricultural prescriptions, updates the agricultural prescription based on all yield data to produce another agricultural prescription (e.g., an updated agricultural prescription), where the updated agricultural prescription includes modifications to steps of the agricultural prescription to optimize harvesting based on all of the yield data. For instance, the modifications to the steps of updated prescriptions 1-2 includes updated control information for the harvest actuator sets 1A and 2A. Having updated the agricultural prescription, the application unit 16 sends, via the network 24 and the wireless communication network 1, the updated agricultural prescriptions 1-2 to the harvest apparatus sets 1-2 and the primary user device 14.

FIG. 24B is a flowchart illustrating an example of optimizing crop harvesting yield. The method begins or continues at step 520 where a processing module (e.g., an application processing module of at least one of an application unit and a user device), for one or more agricultural prescriptions of a geographic region, obtains harvest data records associated with harvesting steps executed by a plurality of harvest apparatus sets. The obtaining includes at least one of receiving directly from a user device and recovering from a storage unit. The harvest data records include one or more of unloading auger data, moisture data, auxiliary data, and historical summaries.

For each harvest apparatus set, the method continues at step 522 where the processing module generates corresponding yield data based on associated harvest data records. For example, for a given portion of the geographic region, the processing module multiplies a number of seconds of unloading auger activation by a number of wet bushels per second factor to estimate a number of wet bushels, and multiplies the number of estimated wet bushels by a calibration from historical summaries to produce non-wet bushels per acre harvested as the yield data.

For each harvest apparatus set, the method continues at step 524 where the processing module sends the corresponding yield data to one or more of the harvest apparatus set and a primary user device. For example, the processing module sends the yield data to a user device associated with the harvesting steps for operator display to facilitate optimizing operation of the harvest apparatus set.

For one or more of the agricultural prescriptions, the method continues at step 526 where the processing module updates the agricultural prescription based on all yield the data to produce one or more updated agricultural prescriptions. For example, the processing module compares harvest steps and corresponding yield data to identify harvest steps associated with favorable yield data and modifies a corresponding agricultural prescription to include the harvest steps associated with the favorable yield data. The method continues at step 528 where the processing module facilitates execution of any updated agricultural prescription. For example, the processing module sends the updated prescription to a user device to implement steps of the updated prescription with regards to achieving improved yields.

FIG. 25A is a schematic block diagram of another embodiment of a computing system that includes the geographic region 1 of FIG. 1, the wireless communication network 1 of FIG. 1, the network 24 of FIG. 1, the user device 14 of FIG. 5, the application unit 16 of FIG. 5, and the storage unit 36 of FIG. 5. The geographic region 1 includes a harvest apparatus set 1 and user device 1-1C of FIG. 1. The harvest apparatus set 1 includes the user device 1-1A of FIG. 1, sensors set 1A of FIG. 23A, the harvest actuator set 1A of FIG. 23A, and the auxiliary resource 1A of FIG. 23A. The geographic region 1 may further include a user device 1-1B to provide one or more of communication, processing, and discovery of other like proximal user devices, where the communication includes transfer of information between the user device 1-1C and the user device 1-1A in a similar fashion as user device 2-1B provides processing and communication between user devices 2-1C and 2-1A of FIG. 12A.

The user device 1-1A includes the application processing module 34 of FIG. 4 and the wireless communication modem 1 of FIG. 4. The sensors set 1A include at least some of the sensors 1-7 of FIG. 7. The harvest actuator set 1A includes one or more actuators associated with at least one of a combine and any crop harvesting machine. The auxiliary resource 1A includes any other agricultural resource that may be associated with the harvest apparatus set such as one or more of a grain cart, a harvested crop wagon, a fertilizer transporter, a water transporter, etc. The user device 1-1A traverses portions of a drive path 1_1 in a traversal direction within the geographic region 1 and traverses portions of a drive path 1_2 in an opposite traversal direction (e.g., adjacent to and in parallel with right path 1_1 but traversed in the opposite traversal direction) in accordance with an agricultural prescription 1.

The computing system is operable to improve accuracy of crop harvesting sensor data from the harvest apparatus set 1. In an example of operation of the improving of the accuracy of the crop harvesting sensor data, at least one of the application unit 16 (e.g., the application processing module 34 of the application unit 16) and a user device (e.g., the user device 1-1A, the user device 1-1C) obtains harvest data records for at least two adjacent traversals of a portion of the geographic region 1 by the harvest apparatus set 1, where the harvest data records includes one or more of, by each of the plurality of locations within the portion of the geographic region (e.g., as indicated by location information), crop flow rate, crop moisture data, the auxiliary data, historical summaries, and an accuracy estimate (e.g., a confidence interval for a particular distance or time metric value). The historical summaries may include a calibration of previous auger data and actual yield data. For example, the application unit 16 receives data records 1 from the storage unit 36, where the storage unit 36 aggregates received harvest data 1_1, 1_2 (e.g., received via wireless communication signals 42 over the wireless location network 1 and via the network 24), and historical summaries retrieved from the memory 58 to produce the data records 1, and where the harvest apparatus set 1 issues the harvest data 1_1 to the storage unit 36 for storage in the memory 58 and the harvest apparatus set 2 issues the harvest data 1_2 to the storage unit 36.

Having obtained the harvest data records, the application unit 16 updates the harvest data records to correct locations of sensor data measurements based on one or more of the guidance 72 from user device 14 and the harvest data records for the at least two adjacent traversals to produce corrected harvest data records. For example, the application unit 16 determines a time and/or distance-based adjustment factor that accounts for delays within harvesting equipment associated with the harvest actuator set and/or sensors set between a time of ingestion of a crop for harvesting and measuring of a particular metric of the harvest data. For example, a measurement of crop flow rate may be delayed by five seconds. As another example, a measurement of harvested crop moisture levels may be delayed by as much as 10 seconds. The updating of the harvest data records to correct locations of sensor data measurements is discussed in greater detail with reference to FIG. 25B.

Having produced the corrected harvest data records, the application unit 16 generates calibration data 1 based on the adjustment factor of the updating of the harvest data records.

For example, the application unit determines a distance adjustment factor as the calibration data 1. As another example, the application unit determines a time adjustment factor as the calibration data 1. Having generated the calibration data 1, the application unit sends the calibration data 1 to the harvest apparatus set 1 to facilitate obtaining of improve accuracy harvest data records.

FIG. 25B is a diagram illustrating an example of correcting sensor data where measured sensor data magnitude 540 for a traversal direction 546 and an opposite traversal direction 548 is displayed by linear position 542 (e.g., along the traversal). In an example of the correcting of the sensor data, a data point from each of two or more measured sensor data (e.g., crop flow level) is identified that maximizes a likelihood of correlation to a common location area of a portion of a geographic region. For example, identifying matching data points 1 and 2 of the traversal direction curve and the opposite traversal direction curve. For each of the identified data points, associated positions corresponding to locations of the measured sensor data are identified (e.g., at two distances along the linear position).

For each data point, an actual position is identified based on one or more of the identified positions of the data points, linear velocity of a sensor array measuring the sensor data while traversing the identified positions, and a relative processing speed associated with ingestion of a harvested crop (e.g., revolutions per minute (RPM) of a combine that draws the crop from the ground past one or more sensors such as a flowmeter and a moisture meter. For example, an actual position 1 is identified as corresponding to the position 1 and an actual position 2 is identified as corresponding to the position 2. In an instance, actual positions 1 and 2 may be substantially a common position along the linear position 542 when RPM levels and velocities associated with each of the traversals are substantially the same.

Having identified the actual positions, a distance adjustment factor is determined for each traversal based on the identified actual position and an associate identified data point. For example, the distance adjustment factor associated with the opposite traversal direction is a difference between the actual position 1 and the position 1. Having determined the distance adjustment factor, the measured sensor data is updated for the portion of the geographic region based on the distance adjustment factors to produce corrected sensor data magnitude 544, where indicated linear positions correspond to actual positions rather than positions of the sensor array when the measurement was produced.

FIG. 25C is a flowchart illustrating an example of improving accuracy of crop harvesting sensor data. The method begins or continues at step 560 where a processing module (e.g., an application processing module of at least one of an application unit and a user device) obtains harvest data records for at least two adjacent traversals of a portion of a geographic region by a harvest apparatus set. The obtaining includes at least one of receiving the harvest data directly from a user device of the harvest apparatus set and recovering the harvest data records from a storage unit. The harvest data records includes one or more of crop flow rate, crop moisture data, auxiliary data, and historical summaries.

The method continues at step 562 where the processing module identifies data points from the at least two adjacent traversals correlated to a common location area. For example, the processing module identifies data points associated with uncorrected location information that is within the common location area with substantially the same sensor data. For each identified data point, the method continues at step 564 where the processing module identifies associated positions corresponding to locations of measured sensor data. For example, the processing module extracts uncorrected location information associated with the measured sensor data.

The method continues at step 566 where the processing module determines an actual position of the common location area based on one or more of the identified positions of the data points, linear velocity of the harvest apparatus set, and a relative processing speed metric associated with ingestion of a harvested crop. The determining includes calculating an actual position between two data points. For example, the processing module determines the position to be in the middle of two data points when the velocities of opposite traversals are substantially the same.

The method continues at step 568 where the processing module determines a distance adjustment factor based on the identified actual position of the common location area and an associated identified data point. For example, the processing module determines a distance from a data point to the middle of the two data points when the velocities are substantially the same.

The method continues at step 570 where the processing module updates the measured sensor data of the portion of the geographic region based on the distance adjustment factor to produce corrected harvest data records. For example, the processing module adjusts the uncorrected the location information by the amount of the distance adjustment factor to produce corrected location information of the corrected harvest data records.

The method continues at step 572 where the processing module generates crop yield data based on the corrected harvest data records. For example, the processing module interprets the corrected harvest data records to produce the crop yield data. The method continues at step 574 where the processing module generates calibration data based on the distance adjustment factor. For example, the processing module includes the distance adjustment factor in the calibration data. The method continues at step 576 where the processing module sends the calibration data to the harvest apparatus set to facilitate obtaining of subsequent harvest data records that includes improved accuracy sensor data. For example, the processing module includes the calibration data and instructions to utilize the calibration data to produce subsequent harvest data records with corrected location information and an indicator that the location information has been corrected.

FIG. 26A is a schematic block diagram of another embodiment of a computing system that includes the geographic region 1 of FIG. 1, the wireless communication network 1 of FIG. 1, the network 24 of FIG. 1, the user device 14 of FIG. 5, the application unit 16 of FIG. 5, and the storage unit 36 of FIG. 5. The geographic region 1 includes harvest apparatus sets 1-2 and user devices 1-1C and 1-2C of FIG. 1. Each harvest apparatus set includes the user device 1-1A or 1-2A of FIG. 1, the sensors set 1A or 2A of FIG. 24A, the harvest actuator set 1A or 2A of FIG. 24A, and the auxiliary resource 1A or 2A of FIG. 24A. The geographic region 1 may further include a user device 1-1B and/or 1-2B to provide one or more of communication, processing, and discovery of other like proximal user devices, where the communication includes transfer of information between the user device 1-1C and the user device 1-1A over the user device 1-2C and the user device 1-2A in a similar fashion as user device 2-1B provides processing and communication between user devices 2-1C and 2-1A of FIG. 12A.

The user devices 1-1A and 1-2A includes the application processing module 34 of FIG. 4 and the wireless communication modem 1 of FIG. 4. The sensors sets 1A and 2A include at least some of the sensors 1-7 of FIG. 7. The harvest actuator sets 1A and 2A includes one or more actuators associated with at least one of a combine and any crop harvesting machine. The auxiliary resources 1A and 2A includes any other agricultural resource that may be associated with the harvest apparatus set such as one or more of a grain cart, a harvest crop wagon, a fertilizer transporter, a water transporter, etc. The user device 1-1A traverses portions of a drive path 1 within the geographic region 1 in accordance with a first agricultural prescription and the user device 1-2A traverses portions of a drive path 2 within the geographic region 1 in accordance with one or more of a second agricultural prescription and the first agricultural prescription.

The computing system is operable to improve accuracy of crop yield data. In an example of operation of the improving of the accuracy of the crop yield data, the application processing module 34 of at least one of the application unit 16 and any user device obtains data records 1 for harvesting of a portion of the geographic region 1 by the harvest apparatus set 1. The harvesting may be carried out in accordance with a prescription based on guidance 72 from a primary user device (e.g., the user device 14). The data records 1 includes sensor data 1 obtained by at least one of receiving the sensor data 1 from the harvest apparatus set 1 (e.g., via wireless communication signals 42 over the wireless location network 1 and the network 24) and retrieving the sensor data 1 from the memory of the storage unit. The sensor data 1 includes one or more of a fuel flow rate, a combine revolutions per minute (RPM), a combine torque level, a combine velocity, a combine pitch, a combine yaw, a combine heading bearing, a combine roll, a combine altitude, and a terrain gradient.

Having obtained the data records 1 for the harvesting, the application unit 16 obtains yield data that corresponds to the data records. The obtaining includes at least one of determining and retrieving. The yield data includes at least one of an estimated crop yield level and an actual crop yield level. For example, the application unit 16 recovers the actual crop yield data from the storage unit subsequent to the storage unit receiving the crop yield data.

Having obtained the yield data, the application unit 16 determines correlation data 1 that associates the data records 1 to the yield data for the portion of the geographic region. For example, the application unit 16 identifies an amount of crop yielded for levels of consumed fuel, applied torque, and average velocity to produce the correlation data 1.

Having produced the correlation data 1, the application unit 16 sends, via the network 24 and the wireless communication network 1, the correlation data 1 to the harvest apparatus set 2, where the harvest apparatus set 2 generates harvest information 2 based on the sensor data of the harvest apparatus set 2 and the correlation data 1. The harvest information 2 includes at least one of an estimated crop flow rate, a corrected crop flow rate, an estimated crop yield level (e.g., bushels per acre), and a corrected crop yield level. For example, the user device 1-2A (e.g., or user device 1-2B, or user device 1-2C) applies a correction function to the sensor data 2 in accordance with the correlation data 1 to produce the harvest information 2. Alternatively, or in addition to, the application unit 16 sends the correlation data 1 to the harvest apparatus set 1 such that the harvest apparatus set 1 applies the correction function to subsequently obtained sensor data 1 in accordance with the correlation data 1 to produce harvest information 1.

Having sent the correlation data 1 to the harvest apparatus set 2, the application unit 16 obtains the harvest information 2. The obtaining includes at least one of receiving the harvest information 2 directly from the harvest apparatus set 2 (e.g., via wireless communication signals 42 over the wireless communication network 1 and the network 24) and extracting the harvest information 2 from the data records 2 retrieved from the storage unit 36.

FIG. 26B is a flowchart illustrating an example of improving accuracy of crop yield data. The method begins or continues at step 590 where a processing module (e.g., an application processing module of at least one of an application unit and a user device), for an agricultural prescription of a geographic region, obtains data records associated with harvesting of a portion of a geographic region by a first harvest apparatus set. The obtaining includes receiving the data records directly from the first harvest apparatus set and retrieving the data records from a storage unit. The data records includes sensor data associated with the harvesting including one or more of a fuel flow rate, an RPM, a torque level, a velocity level, a pitch level, a yaw level, a bearing, a roll level, an altitude, a terrain gradient and historical summaries of previously collected data records associated with the portion of the geographic region.

The method continues at step 592 where the processing module obtains yield data that corresponds to the data records. The yield data includes estimated and/or actual yield statistics with regards to a rate of crops harvested as a function of area and/or linear distance (e.g., bushels per acre, bushels per linear harvest distance). The obtaining includes at least one of determining, receiving, and retrieving from the storage unit.

The method continues at step 594 where the processing module determines correlation data that correlates the data records to the yield data for the portion of the geographic region. For example, the processing module solves for a linear equation of factors of the data records that results in an acceptable estimation of the yield data, extracts coefficients of the linear equations, and generates the correlation data to include a model of the linear equation that includes the extracted coefficients.

The method continues at step 596 where the processing module sends the correlation data to at least a second harvest apparatus set, where the second harvest apparatus set generates harvest information and/or yield data based on sensor data of the second harvest apparatus set and the correlation data. For example, the second harvest apparatus set utilizes the linear equation and extracted coefficients on the sensor data of the second harvest apparatus set to produce the yield information.

The method continues at step 598 where the processing module receives the harvest information from the second harvest apparatus set. For example, the second harvest apparatus set sends the harvest information to one or more of an application unit, a storage unit, a primary user device, and one or more other of the harvest apparatus sets. The second harvest apparatus set may further display the yield data to an operator of the second harvest apparatus set to facilitate optimization of settings of one or more elements of the second harvest apparatus set to provide further yield efficiencies.

FIG. 27A is a schematic block diagram of another embodiment of a computing system that includes the geographic region 1 of FIG. 1, the wireless communication network 1 of FIG. 1, the network 24 of FIG. 1, the user device 14 of FIG. 5, the application unit 16 of FIG. 5, and the storage unit 36 of FIG. 5. The geographic region 1 includes harvest apparatus sets 1-2 and user devices 1-1C and 1-2C of FIG. 1. Each harvest apparatus set includes the user device 1-1A or 1-2A of FIG. 1, the sensors set 1A or 2A of FIG. 24A, the harvest actuator set 1A or 2A of FIG. 24A, and the auxiliary resource 1A or 2A of FIG. 24A. The geographic region 1 may further include a user device 1-1B and/or 1-2B to provide one or more of communication, processing, and discovery of other like proximal user devices, where the communication includes transfer of information between the user device 1-1C and the user device 1-1A over the user device 1-2C and the user device 1-2A in a similar fashion as user device 2-1B provides processing and communication between user devices 2-1C and 2-1A of FIG. 12A.

The user devices 1-1A and 1-2A includes the application processing module 34 of FIG. 4 and the wireless communication modem 1 of FIG. 4. The sensors sets 1A and 2A include at least some of the sensors 1-7 of FIG. 7. The harvest actuator sets 1A and 2A includes one or more actuators associated with at least one of a combine and any crop harvesting machine. The auxiliary resources 1A and 2A includes any other agricultural resource that may be associated with the harvest apparatus set such as one or more of a grain cart, a harvest crop wagon, a fertilizer transporter, a water transporter, etc. The user device 1-1A traverses a drive path 1_1 and a drive path 1_2 within the geographic region 1 in accordance with a first agricultural prescription, where the drive paths 1_1 and 1_2 are substantially adjacent paths (e.g., in the same or opposite directions). The user device 1-2A traverses portions of a drive path 2 within the geographic region 1 in accordance with one or more of a second agricultural prescription and the first agricultural prescription.

The computing system is operable to improve accuracy of crop yield data. In an example of operation of the improving of the accuracy of the crop yield data, the application processing module 34 of at least one of the application unit 16 and any user device obtains data records for two or more traversals of harvesting of a portion of the geographic region 1 by the harvest apparatus set 1. For example, the application unit retrieves data records 1 from the storage unit 36, where the data records 1 includes sensor data 1_1 associated with the drive path 1_1 and sensor data 1_2 associated with the drive path 1_2, received via wireless communication signals 42 over the wireless location network 1 and the network 24 by the storage unit 36. The harvesting may be carried out in accordance with the first prescription based on guidance 72 from the user device 14 (e.g., a primary user device). The data records 1_1 and 1_2 includes sensor data produced by the harvest apparatus set. The sensor data includes one or more of a fuel flow rate, a combine revolutions per minute (RPM), a combine torque level, a combine velocity, a combine pitch, a combine yaw, a combine bearing, a combine roll, a combine altitude, and a terrain gradient.

Having obtained the data records 1 for the two or more traversals of the harvesting, the application unit 16 obtains yield data that corresponds to the data records 1. The obtaining includes at least one of determining and retrieving. The yield data includes at least one of an estimated crop yield level and an actual crop yield level. For example, the application unit 16 recovers the actual crop yield data from the storage unit subsequent to the storage unit receiving the crop yield data.

Having obtained the yield data, the application unit 16 determines correlation data 1 that associates the data records 1 for the two or more traversals, with regards to terrain changes, to the yield data for the portion of the geographic region. For example, the application unit 16 identifies an amount of crop yielded for a range of a terrain gradient for adjacent drive paths, levels of consumed fuel, applied torque, and average velocity to produce the correlation data 1.

Having produced the correlation data 1, the application unit 16 sends, via the network 24 and the wireless communication network 1 via further wireless communication signals 42, the correlation data 1 to the harvest apparatus set 2, where the harvest apparatus set 2 generates harvest information 2 based on sensor data, including a terrain gradient, of the harvest apparatus set 2 and the correlation data 1. The harvest information 2 includes at least one of an estimated crop flow rate, a corrected crop flow rate, an estimated crop yield level (e.g., bushels per acre), and a corrected crop yield level. For example, the user device 1-2A (e.g., or user device 1-2B, or user device 1-2C) applies a correction function to sensor data 2 in accordance with the correlation data 1 to produce the harvest information 2. Alternatively, or in addition to, the application unit 16 sends the correlation data 1 to the harvest apparatus set 1 such that the harvest apparatus set 1 applies the correction function to subsequently obtained sensor data $1\_x$ in accordance with the correlation data 1 to produce harvest information 1.

Having sent the correlation data 1 to the harvest apparatus set 2, the application unit 16 obtains the harvest information 2. The obtaining includes at least one of receiving the harvest information 2 directly from the harvest apparatus set 2 (e.g., via the wireless communication network 1 and the network 24) and extracting the harvest information 2 from the data records 2 retrieved from the storage unit 36.

FIG. 27B is a flowchart illustrating another example of improving accuracy of crop yield data, which include similar steps to FIG. 26B. The method begins or continues at step 610 where a processing module (e.g., an application processing module of at least one of an application unit and a user device), for an agricultural prescription of a geographic region, obtains data records associated with two or more traversals of harvesting a portion of a geographic region by a first harvest apparatus set, where the portion is associated with a terrain gradient greater than a terrain gradient threshold level. The obtaining includes at least one of receiving the data records directly from the first harvest apparatus set and retrieving the data records from a storage unit.

The method continues at step 612 where the processing module obtains yield data that corresponds to the data records for each of the two or more traversals. The obtaining includes at least one of determining the yield data and retrieving the yield data from the storage unit. The yield data includes one or more of estimated and actual yield statistics (e.g., actual bushels per acre).

The method continues at step 614 where the processing module determines correlation data that correlates the data records for each of the two or more traversals to the yield data for the portion of the geographic region. For example, the processing module solves for a linear equation of factors of the data records that results in an acceptable estimation of the yield data, extracts coefficients of the linear equations for all the traversals, and generates the correlation data to include a model of the linear equation that includes the extracted coefficients.

The method continues with the steps 596-598 of FIG. 26B where the processing module sends the correlation data to at least a second harvest apparatus set, where the second harvest apparatus set generates the harvest information and/or yield data based on sensor data of the second harvest apparatus set and the correlation data, and the processing module receives the harvest information from the second harvest apparatus set.

FIG. 28A is a schematic block diagram of another embodiment of a computing system that includes the geographic region 1 of FIG. 1, the wireless communication network 1 of FIG. 1, the network 24 of FIG. 1, the user device 14 of FIG. 5, the application unit 16 of FIG. 5, and the storage unit 36 of FIG. 5. The geographic region 1 includes a planting apparatus set 620, a harvesting apparatus set 622, a transport apparatus set 624, and user devices 1-1C, 1-2C, and 1-3C of FIG. 1.

The planting apparatus set 620 includes the user device 1-1A of FIG. 1, the sensors set 1A of FIG. 24A, a planting actuator set 1A, and the auxiliary resource 1A of FIG. 24A. The planting actuator set 1A includes any apparatus to plant seeds. For instance, the planting actuator set 1A includes a planter and the auxiliary resource 1A includes a seed bin.

The harvesting apparatus set 622 includes the user device 1-2A of FIG. 1, the sensors set 2A of FIG. 24A, the harvest actuator set 2A of FIG. 24A, and the auxiliary resource 2A of FIG. 24A. For instance, the harvest actuator set 2A includes a combine and the auxiliary resource 2A includes a crop cart.

The transport apparatus set 624 includes the user device 1-3A of FIG. 1, a sensors set 3A associated with the user device 1-3A, a transport actuator set 2A, and an auxiliary resource 3A. For instance, the user device 1-3A includes a truck, the sensors set 3A includes sensors associated with the truck, the transport actuator set 3A includes actuators for moving and transporting harvested crops (e.g., others, chute gates, liftgates, etc.), and the auxiliary resource 3A includes a shipping container for harvested crops. Alternatively, or in addition to, two or more transport apparatus sets 624 may be utilized to transport the harvested crops. A common auxiliary resource may be utilized when the two or more transport apparatus sets 624 are utilized. For example, the auxiliary resource 3A may be disassociated with a first transport apparatus set 624 and associated with a second transport apparatus set 624 in the course of transporting the harvested crops. For instance, a trailer containing harvested crops is disconnected from a first tractor (e.g., user device 1-3A1) along a drive path 3 and is connected to a second tractor (e.g., user device 1-3A2) along the drive path 3 as the harvested crops are transported.

The geographic region 1 may further include a user device 1-1B, 1-2B, and/or 1-3B to provide one or more of communication, processing, and discovery of other like proximal user devices, where the communication includes transfer of information between the user devices 1-1C, 1-2C, and 1-3C and the user devices 1-1A, 1-2A, and 1-3A in a similar fashion as user device 2-1B provides processing and communication between user devices 2-1C and 2-1A of FIG. 12A.

The user devices 1-1A, 1-2A, and 1-3A includes the application processing module 34 of FIG. 4 and the wireless communication modem 1 of FIG. 4. The sensors sets 1A, 2A, and 3A include at least some of the sensors 1-7 of FIG. 7. The user device 1-1A traverses a drive path 1 within the geographic region 1 in accordance with a first agricultural prescription 1, the user device 1-2A traverses a drive path 2 within the geographic region 1 in accordance with a second agricultural prescription 2, and the user device 1-3A traverses the drive path 3 which may be partially in accordance with a third agricultural prescription 3.

The computing system is operable to track harvested crops utilizing a chain of custody approach. In an example of operation of the tracking of the harvested crops, the application unit 16 obtains data records 1 associated with execution of the agricultural prescription 1 by the planting apparatus set 620. The data records 1 includes data 1. The data 1 includes static and dynamic data associated with one or more of the user device 1-1A, the sensors set 1A, the planting actuator set 1A, and the auxiliary resource 1A. The static and dynamic data includes one or more of location information, timestamp information, sensor data, auxiliary data, and identifiers. The obtaining includes at least one of directly receiving, via wireless communication signals 42 over the wireless communication network 1 and the network, the data 1 from the planting apparatus set 620 and retrieving the data records 1 from the storage unit 36.

Having obtained the data records 1, the application unit 16 identifies a planting location of a lot (e.g., an identified portion of a larger production) and a seed hybrid associated with the planting apparatus set 620. For example, the application unit 16 identifies the auxiliary resource affiliated with the planting apparatus set 620, where the identified auxiliary resource has been previously associated with the lot of the seed hybrid. For instance, the application unit 16 interprets historical location information associated with the seed bin.

Having identified the lot and seed hybrid associated with the planting location, the application unit 16 obtains data records 2 associated with execution of the agricultural prescription 2 by the harvesting apparatus set 622. The data records 2 includes data 2. The data 2 includes static and dynamic data associated with one or more of the user device 1-2A, the sensors set 2A, the harvest actuator set 2A, and the auxiliary resource 2A. The obtaining includes at least one of directly receiving, via further wireless communication signals 42 over the wireless communication network 1 and the network, the data 2 from the harvesting apparatus set 622 and retrieving the data records 2 from the storage unit 36.

For a harvested crop associated with the planting location, the application unit 16 identifies the lot and seed hybrid. For example, the application unit 16 performs a lookup of the lot and seed hybrid based on location information of the data records 2. Having identified the lot and the seed hybrid, the application unit 16 identifies the auxiliary resource 2A of the harvesting apparatus set 622 that is associated with the harvested crops. For example, the application unit 16 extracts an identifier of the auxiliary resource 2A, that holds the harvested crops, from the data records 2.

Having identified the auxiliary resource 2A, the application unit 16 identifies subsequent auxiliary resources associated with transport of the harvested crop in accordance with the agricultural prescription 3 and/or guidance 72 from user device 14. For example, the application unit 16 obtains data records 3, where the data records 3 includes data 3, interprets data records 3 and data records 2 to detect one or more of substantially similar location information, loading and/or unloading and transfer of crops, and proximal location by discovery of short range wireless communication signals (e.g., between two or more of the user device 1-2B and user device 1-3B). For a final auxiliary resource 3A of the transport of the harvested crops, the application unit identifies (e.g., look up of records from the above identification steps) the lot and seed hybrid as the harvested crops arrive at a final destination associated with the transporting.

FIG. 28B is a flowchart illustrating an example of chain of custody crop tracking. The method begins or continues at step 630 where a processing module (e.g., an application processing module of at least one of an application unit and a user device), obtains first data records associated with execution of a first agricultural prescription by a planting apparatus set. The obtaining includes at least one of receiving the first data records directly from the planting apparatus set and retrieving the first data records from a storage unit.

The method continues at step 632 where the processing module identifies a planting location of a lot and a seed hybrid associated with the planting apparatus set. For example, the processing module determines an identifier of an auxiliary resource associated with the first data records by utilizing short range wireless discovery, identifies the lot and seed hybrid associated with the identified auxiliary resource (e.g., a lookup), and utilizes location information of the auxiliary resource (e.g., from the first data records) to produce the planting location associated with the identified lot and seed hybrid. The processing module may store a record that includes one or more of the planting location, the identified lot, the identified seed hybrid, and the identified auxiliary resource.

The method continues at step 634 where the processing module obtains second data records associated with execution of a second prescription by a harvesting apparatus set. The obtaining includes at least one of receiving the second data records directly from the harvesting apparatus set and retrieving the second data records from the storage unit. The second data records includes one or more of identifiers of elements of the harvesting apparatus set and location information associated with harvesting crops to produce location information of harvested crops.

For a harvested crop associated with the planting location, the method continues at step 636 where the processing module identifies the lot and the seed hybrid based on the second data records. For example, the processing module identifies a location information of the second data records that is substantially the same as the planting location, performs a lookup of the lot and seed hybrid identifiers corresponding to the planting location, and associates harvested crops with the lot and seed hybrid identifiers. The associating may include storing a new record and/or updating the stored record to include the identified location information of the harvested crops, planting location, the identified lot, and the identified seed hybrid.

The method continues at step 638 where the processing module identifies an auxiliary resource of the harvesting apparatus set that is associated with the harvested crop. For example, the processing module interprets the second data records to extract an identifier of the auxiliary resource associated with temporary storage of the harvested crops, where the location information (e.g., GPS coordinates) is compared or short range wireless discovery is interpreted to identify a proximal auxiliary resource as the auxiliary resource.

The method continues at step 640 where the processing module identifies subsequent auxiliary resources associated with transport of the harvested crop in accordance with execution of a third agricultural prescription. For example, the processing module interprets third data records from a transport apparatus set to extract an identifier of one or more subsequent auxiliary resources associated with transport of the harvested crop, where the location information is compared or short range wireless discovery is interpreted to identify further proximal auxiliary resources as the identified subsequent auxiliary resources.

The method continues at step 642 where the processing module identifies the lot and the seed hybrid associated with a final step of harvested crop transport. For example, the processing module interprets further third data records to extract further identifiers of yet another auxiliary resource associated with the final step of transporting the harvested crop and performs a record lookup to identify the associated lot and seed hybrid, where location information is compared or short range wireless discovery is interpreted to identify and even further proximal auxiliary resource as the identified other auxiliary resource.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the FIGS. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A drive unit comprising:
a first interface operable to establish a first communication path with farm equipment;
a second interface operable to establish a second communication path with a portable computing device;
memory; and
a processing module operably coupled to the first interface, the second interface, and the memory, wherein the processing module is operable to:
receive, via the first interface, data from the farm equipment to produce agricultural data;
determine a filtering constraint based on one or more parameters selected from a plurality of lists of agricultural parameters;
filter the agricultural data based on the filtering constraint to produce filtered agricultural data;
receive, via the second interface, a previous agriculture prescription;
determine, based on the filtered agricultural data and the previous agriculture prescription, a modified agricultural prescription;
extract, from the modified agricultural prescription, control information; and
output the control information via the first interface to an actuator set of the farm equipment, resulting in performing an action using the farm equipment in accordance with the modified agricultural prescription.

2. The drive unit of claim 1, wherein the processing module is further operable to:
receive, via the second interface, an instruction to collect a particular type of data; and
select the one or more parameters based on the instruction.

3. The drive unit of claim 1, wherein the processing module is further operable to:
determine that the filtered agricultural data is to be processed by the drive unit for modifying an existing agricultural prescription;
modify the existing agricultural prescription in accordance with the filtered agricultural data to produce a modified agricultural prescription; and
output, via the first interface, the modified agricultural prescription.

4. The drive unit of claim 1, wherein the processing module is further operable to:
determine that the filtered agricultural data is to be processed by a host server;
output, via the second interface, the filtered agricultural data; receive, via the second interface, a new agricultural prescription or a modified agricultural prescription; and
extract, from the modified agricultural prescription, control information; and
output the control information via the first interface to an actuator set of the farm equipment, resulting in performing an action using the farm equipment in accordance with the modified agricultural prescription.

5. The drive unit of claim 1, wherein the plurality of lists of agricultural parameters comprises two or more of: a list of crop cycle parameters; a list of types of agricultural prescription parameters; and a list of types of farm equipment.

6. The drive unit of claim 5, further comprising:
the list of crop cycle parameters including one or more of a planting cycle, a harvesting cycle, a tending cycle, a fertilizing cycle, a watering cycle, and a weeding cycle;
the list of types of agricultural prescription parameters including one or more of a planting plan, a speed plan, a fertilizing plan, a watering plan, a weeding plan, and a harvesting plan; and
the list of types of farm equipment including one or more of planting equipment, a tractor, fertilizing equipment, watering equipment, weeding equipment, and harvesting equipment.

7. The drive unit of claim 1, wherein the processing module is further operable to:
receive, via the second interface, additional data from the portable computing device; and
integrate the additional data with the data to produce the agricultural data.

8. The drive unit of claim 1, wherein the processing module is further operable to:
receive, via the first interface, first location information from the farm equipment;
receive, via the second interface, second location information from the portable computing device; and
integrate the first and second location information into composite location information.

9. The drive unit of claim 1, wherein the agricultural data comprises one or more of: location information; timestamp information; terrain information; soil sampling information; accelerometer information; gyroscope information; velocity information; weather information; magnetic field information; imaging data; chemical detection; fluid flow volume; and execution phase of an agricultural prescription.

10. A non-transitory computer readable storage medium storing operational instructions which, when executed by one or more processing modules of a drive unit of farm equipment, cause the one or more processing modules to:

receive, via a first interface of the drive unit, data from the farm equipment to produce agricultural data;

determine a filtering constraint based on one or more parameters selected from a plurality of lists of agricultural parameters;

filter the agricultural data based on the filtering constraint to produce filtered agricultural data;

receive, via a second interface, a previous agriculture prescription;

determine, based on the filtered agricultural data and the previous agriculture prescription, a modified agricultural prescription;

extract, from the modified agricultural prescription, control information; and output the control information via the first interface to an actuator set of the farm equipment, resulting in performing an action using the farm equipment in accordance with the modified agricultural prescription.

11. The non-transitory computer readable storage medium of claim 10 further storing operational instructions which, when executed by the one or more processing modules of the drive unit of the farm equipment, cause the one or more processing modules to:

receive, via a second interface of the drive unit, an instruction to collect a particular type of data; and select the one or more parameters based on the instruction.

12. The non-transitory computer readable storage medium of claim 10 further storing operational instructions which, when executed by the one or more processing modules of the drive unit of the farm equipment, cause the one or more processing modules to:

determine that the filtered agricultural data is to be processed by the drive unit for modifying an existing agricultural prescription;

modify the existing agricultural prescription in accordance with the filtered agricultural data to produce a modified agricultural prescription; and output, via the first interface of the drive unit, the modified agricultural prescription.

13. The non-transitory computer readable storage medium of claim 10 further storing operational instructions which, when executed by the one or more processing modules of the drive unit of the farm equipment, cause the one or more processing modules to:

determine that the filtered agricultural data is to be processed by a host server;

output, via the second interface of the drive unit, the filtered agricultural data;

receive, via the second interface of the drive unit, a new agricultural prescription or a modified agricultural prescription; and output, via the first interface of the drive unit, the new agricultural prescription or the modified agricultural prescription.

14. The non-transitory computer readable storage medium of claim 10, wherein the plurality of lists of agricultural parameters comprises two or more of: a list of crop cycle parameters; a list of types of agricultural prescription parameters; and a list of types of farm equipment.

15. The non-transitory computer readable storage medium of claim 14, wherein the list of crop cycle parameters includes one or more of a planting cycle, a harvesting cycle, a tending cycle, a fertilizing cycle, a watering cycle, and a weeding cycle;

wherein the list of types of agricultural prescription parameters includes one or more of a planting plan, a speed plan, a fertilizing plan, a watering plan, a weeding plan, and a harvesting plan; and wherein the list of types of farm equipment includes one or more of planting equipment, a tractor, fertilizing equipment, watering equipment, weeding equipment, and harvesting equipment.

16. The non-transitory computer readable storage medium of claim 10 further storing operational instructions which, when executed by the one or more processing modules of the drive unit of the farm equipment, cause the one or more processing modules to:

receive, via the second interface of the drive unit, additional data from a portable computing device; and integrate the additional data with the data to produce the agricultural data.

17. The non-transitory computer readable storage medium of claim 10 further storing operational instructions which, when executed by the one or more processing modules of the drive unit of the farm equipment, cause the one or more processing modules to:

receive, via the first interface of the drive unit, first location information from the farm equipment;

receive, via the second interface of the drive unit, second location information from a portable computing device; and integrate the first and second location information into composite location information.

18. The non-transitory computer readable storage medium of claim 10, wherein the agricultural data comprises one or more of: location information; timestamp information; terrain information; soil sampling information; accelerometer information; gyroscope information; velocity information; weather information; magnetic field information; imaging data; chemical detection; fluid flow volume; and execution phase of an agricultural prescription.

* * * * *